(12) United States Patent
Deisher et al.

(10) Patent No.: US 10,949,736 B2
(45) Date of Patent: Mar. 16, 2021

(54) FLEXIBLE NEURAL NETWORK ACCELERATOR AND METHODS THEREFOR

(71) Applicant: INTEL CORPORATION, Santa Clara, CA (US)

(72) Inventors: Michael E Deisher, Hillsboro, OR (US); Ohad Falik, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 901 days.

(21) Appl. No.: 15/343,036

(22) Filed: Nov. 3, 2016

(65) Prior Publication Data

US 2018/0121796 A1 May 3, 2018

(51) Int. Cl.
*G10L 15/16* (2006.01)
*G06N 3/063* (2006.01)
*G06N 3/04* (2006.01)

(52) U.S. Cl.
CPC .......... *G06N 3/063* (2013.01); *G06N 3/0445* (2013.01); *G06N 3/0454* (2013.01); *G06N 3/0472* (2013.01); *G10L 15/16* (2013.01)

(58) Field of Classification Search
CPC .... G06N 3/063; G06N 3/0445; G06N 3/0454; G06N 3/0472; G10L 15/16
See application file for complete search history.

(56) References Cited

U.S. PATENT DOCUMENTS

| | | | | |
|---|---|---|---|---|
| 2014/0188470 | A1* | 7/2014 | Chang | G10L 15/14 704/236 |
| 2015/0199963 | A1* | 7/2015 | Maaninen | G10L 15/16 704/232 |
| 2016/0026912 | A1* | 1/2016 | Falcon | G06N 3/0454 706/25 |
| 2016/0203401 | A1* | 7/2016 | Duranton | G06N 3/063 706/41 |
| 2016/0351195 | A1 | 12/2016 | Falik et al. | |
| 2016/0358068 | A1* | 12/2016 | Brothers | G06N 3/082 |
| 2017/0357891 | A1* | 12/2017 | Judd | G06N 3/063 |
| 2018/0018936 | A1* | 1/2018 | Staudenmaier | G06F 9/451 |
| 2018/0365557 | A1* | 12/2018 | Kobayashi | G06N 3/0454 |

OTHER PUBLICATIONS

Zidong Du, Leveraging the Error Resilience of Neural Networks for Designing Highly Energy Efficient Accelerators, IEEE Transactions on Computer-Aided Design of Integrated Circuits and Systems, vol. 34, No. 8, Aug. 2015, pp. 1223-1235. (Year: 2015).*

Deisher, et al., "Novel CI-Backoff Scheme for Real-Time Embedded Speech Recognition", 2010 IEEE International Conference on Acoustics Speech and Signal Processing (ICASSP), Mar. 14-19, 2010, Dallas Texas, USA.

Gad, E.F. et al., "A new algorithm for learning in piecewise-linear neural networks", Neural Networks, vol. 13, Issues 4-5, Elsevier Science Ltd., Mar. 15, 2000, pp. 485-505.

(Continued)

*Primary Examiner* — Alexey Shmatov
*Assistant Examiner* — Ahsif A. Sheikh
(74) *Attorney, Agent, or Firm* — Green, Howard & Mughal LLP.

(57) ABSTRACT

Systems, apparatus and methods are described including operations for a flexible neural network accelerator.

28 Claims, 22 Drawing Sheets

(56) References Cited

OTHER PUBLICATIONS

Graves, Alex et al., "Speech Recognition with Deep Recurrent Neural Networks", 2013 IEEE International Conference on Acoustics, Speech and Signal Processing (ICASSP), May 26-31, 2013, Vancouver BC, Canada.

Povey, D et al., "The Kaldi Speech Recognition Toolkit", Microsoft Research, USA; Saarland University, Germany; Centre de Reserché Informatique de Montreal, Canada; Brno University of Technology, Czech Republic; SRI International, USA; Go-Vivace Inc., USA; IDIAP Research Institute, Switzerland, Sep. 24, 2015, 4 pages.

* cited by examiner

Piece wise Linear y = f(x) Activation Function

Groups

| | | | | | | | |
|---|---|---|---|---|---|---|---|
| A | 1 | 2 | 3 | 4 | 5 | ... | N |
| B | 1 | 2 | 3 | 4 | 5 | ... | N |
| C | 1 | 2 | 3 | 4 | 5 | ... | N |

Groups

| A | B | C |
|---|---|---|
| 1 | 1 | 1 |
| 2 | 2 | 2 |
| 3 | 3 | 3 |
| 4 | 4 | 4 |
| 5 | 5 | 5 |
| ... | ... | ... |
| N | N | N |

COMPUTE A VALUE OF A LAYER OF A NEURAL NETWORK BY USING A PLURALITY OF FIXED FUNCTION HARDWARE LOGIC BLOCKS THAT ARE SUBSTANTIALLY LOGICALLY PARALLEL SO THAT MULTIPLE ONES OF THE LOGIC BLOCKS HAVE SUBSTANTIALLY THE SAME ARRANGEMENT OF LOGIC ELEMENTS 602

↓

INPUT A WEIGHT HAVING A BIT LENGTH FROM AT LEAST TWO ALTERNATIVE BIT LENGTHS AVAILABLE TO INPUT WEIGHTS TO THE PLURALITY OF LOGIC BLOCKS WHEREIN THE AVAILABLE BIT LENGTHS COMPRISE AT LEAST A FIRST BIT LENGTH AND A SECOND BIT LENGTH 604

↓

APPLY A SCALE FACTOR TO WEIGHTS PROVIDED IN AT LEAST THE FIRST BIT LENGTH, AND TO OMIT THE SCALE FACTOR WHEN WEIGHTS ARE PROVIDED IN AT LEAST THE SECOND BIT LENGTH 606

FIG. 10B  (A) 1020

- STORE THE FINAL OUTPUT IN THE OUTPUT BUFFER 1048
- SEND FINAL OUTPUTS TO THE INPUT BUFFER ONCE CAPACITY EXISTS 1050
- REPEAT FOR NEXT LAYER UNTIL LAST OUTPUT LAYER OF THE NN IS PROCESSED 1052

FIG. 10C  1080

- PERFORM BINARY SEARCH TO PLACE SUM OUTPUT ON SEGMENT 1082
  - OBTAIN SEGMENT ARRAY OF LAYER 1084
  - SET OUTPUT OF LEFT MOST BASE AS FINAL OUTPUT WHEN INPUT IS OUT OF RANGE 1086
  - DETERMINE BASE INPUT OF MIDDLE SEGMENT WITHIN A RANGE OF AVAILABLE SEGMENTS 1088
  - COMPARE BASE INPUT TO SUM OUTPUT (ACTUAL INPUT) 1090
  - IF BASE INPUT IS GREATER THAN SUM OUTPUT, SET HIGHEST POSSIBLE SEGMENT AT MIDDLE SEGMENT, AND DETERMINE NEW MIDDLE SEGMENT OF NEW RANGE 1092
  - IF BASE INPUT IS LESS THAN SUM OUTPUT, SET LOWEST POSSIBLE SEGMENT AT MIDDLE SEGMENT, AND DETERMINE NEW MIDDLE SEGMENT OF NEW RANGE 1094
  - YES ← HIGH SEGMENT > LOW SEGMENT + 1? 1096
- NO ↓
- COMPUTE FINAL OUTPUT USING SELECTED SEGMENT AND LINEAR EQUATION 1098

FLEXIBLE NEURAL NETWORK ACCELERATOR AND METHODS THEREFOR

BACKGROUND

Automatic speech recognition (ASR) systems, or automatic speech recognizers, have become increasingly important as more and more computer-based devices use speech recognition to receive commands from a user in order to perform some action as well as to convert speech into text for dictation applications or even hold conversations with a user where information is exchanged in one or both directions. Such systems may be speaker-dependent, where the system is trained by having the user repeat words, or speaker-independent where anyone may provide immediately recognized words. Some systems also may be configured to understand a fixed set of single word commands or short phrases, such as for operating a mobile phone that understands the terms "call" or "answer". Other systems may have an extensive vocabulary such as for voice activated speech recognition interfaces for search engines such as those found on mobile devices. Due to these advantages, ASR is very desirable for wearables, smartphones, and other small devices.

To perform these functions, an ASR conventionally has a number of main components including a front end that identifies phoneme, an acoustic score unit that provides probabilities for each phoneme conventionally by using a Gaussian mixture model (GMM), and a decoder that often is a weighted finite state transducer (WFST) and that generates hypothesis utterances, words, or word sequences, and a score for each hypothesis. The WFST is often based on the use of Hidden Markov Models (HMMs) and/or GMMs as well. Finally, a language interpreter and execution unit (or interpretation engine) may be provided that determines the user intent and the final words from the results of the WFST. The decoder and interpretation engine may use neural networks to generate the final words, and therefore, can be very computationally heavy.

Since an ASR device or computer produces a large computational load while using neural networks, use of the device's processor to perform the neural network computations can cause an unacceptable latency noticeable by a user such as relatively long pauses from the time a user utters a word to the time an ASR device indicates recognition of the word either by having the device reply to a user's statement or perform some other action in response. These ASR neural computations also consume relatively large amounts of battery power and use a disproportionate amount of the processors time so that the operation of other applications may degrade. Also, many small devices with ASR systems, and especially those with large vocabularies, are server based such that the computations are performed remotely from the device which raises the risk of privacy and/or security breaches, or can result in even more delay. As yet another difficulty, many neural network propagation systems have software arranged to handle a certain type of neural network with layers in a certain format and arranged in certain orders. Such conventional systems offer little or no adaptability to use different types of neural networks or different types of neural network layers (such as a recurrent layer, a convolutional layer, etc.) with a variety of available formats and sequence orders, especially when fixed function hardware is used for neural network processing.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 6 is a flow chart of an example method of neural network processing using parallel logic blocks;

FIGS. 10A-10B are a detailed flow chart of a process of neural network propagation according to the implementations herein;

FIG. 10C is a flow chart of a process of using a piecewise linear activation function process according to the implementations herein;

FIG. 8 is a flow chart of an example method of neural network setup with flexible layer descriptor definitions;

FIG. 16 is a schematic of a de-interleaved input array according to the implementations herein;

FIG. 16-A is a schematic of an interleaved input array according to the implementations herein.

DETAILED DESCRIPTION

Figure 1:
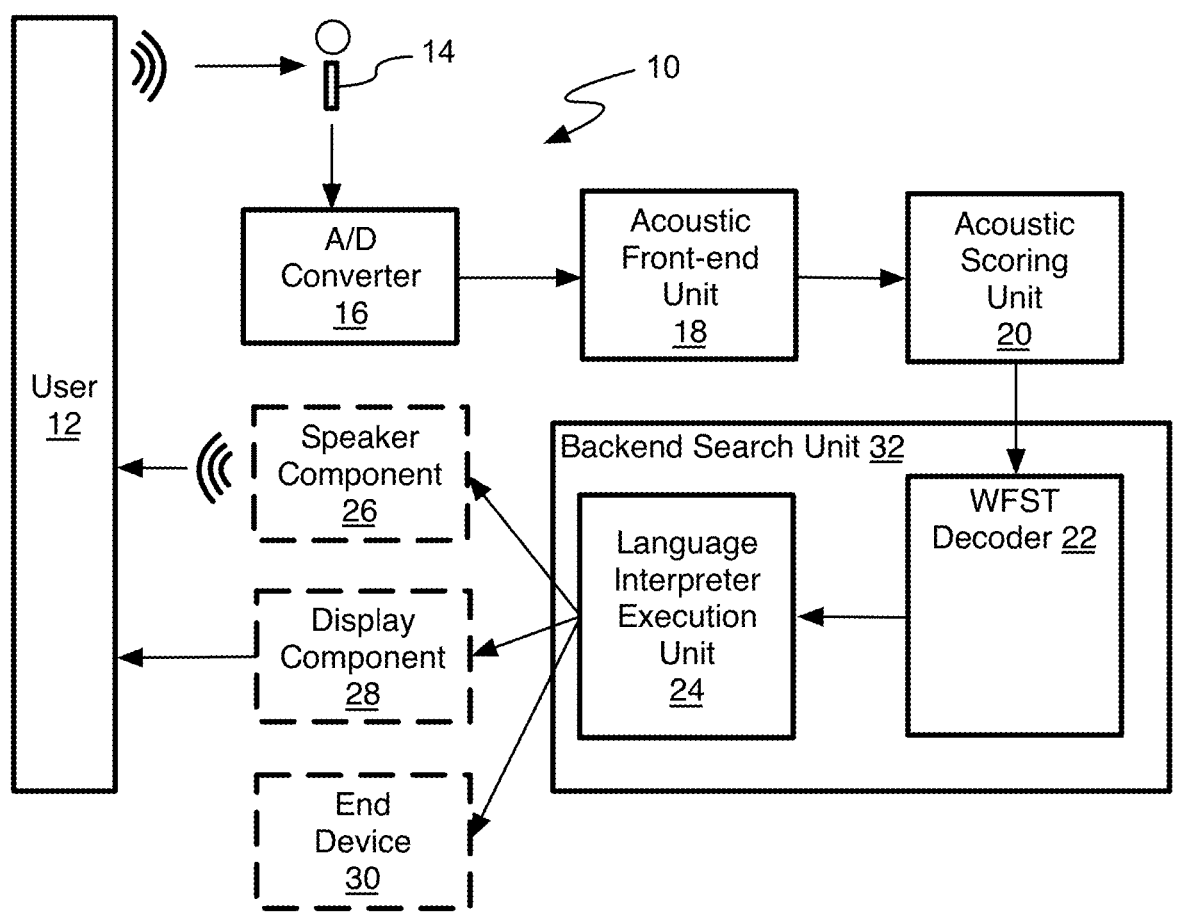
FIG. 1 is an illustrative diagram of a speech recognition device for use according to the implementations described herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in semiconductor architectures such as system-on-a-chip (SoC) architectures for example, other architecture techniques and arrangements may be provided for some of the implementations herein including a general purpose microprocessor, audio signal processor, or other device. Yet other implementations described herein are directed to a method of using layer descriptors that may be used with a neural network accelerator and particularly arranged to be performed by the architectures described herein, but are not necessarily always restricted to these particular architectures and may be implemented by other architectures and/or computing systems for similar purposes unless described otherwise herein. Various architectures employing, for example, multiple integrated circuit (IC) chips and/or packages, and/or various computing devices and/or consumer electronic (CE) devices such as tablets, smart phones, televisions, wearable devices such as smart glasses, watches, exercise bands, head phones, and the like, other appliances with internet of things technology, and so forth, may implement the techniques and/or arrangements described herein. Further, while the following description may set forth numerous specific details such as logic implementations, types and interrelationships of system components, logic partitioning/integration choices, etc., claimed subject matter may be practiced without such specific details depending on the implementation described herein. In other instances, some material such as, for example, control structures and full software instruction sequences, may not be shown in detail in order not to obscure the material disclosed herein.

Certain implementations described herein may use particular hardware, firmware, and/or software combinations as described below, while other material related to operations for performing neural networks, and in some examples particularly for automatic speech recognition, may be implemented in hardware, firmware, software, or any combination thereof. Some of the material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are provided for a flexible neural network accelerator.

Neural networks have replaced other acoustic modeling techniques for automatic speech recognition (ASR) and many other applications due to better classification accuracy. The neural network acoustic modeling may consume often 50% but up to 90% of the speech recognition application processing time due to the large computational load of the neural network modeling. Thus, a number of challenges exist in deploying neural network-based speech recognition (and other pattern recognition capabilities) on wearable devices and other client devices that have relatively small processor areas including: (1) the large amount of compute can lead to long latency on wearable and other small devices, (2) use of the applications processor (such as the central processing unit (CPU)) for these computations requires higher power (and in turn, shortens battery life), and (3) use of the ASR application's processor (or processor shared with other applications) also can degrade the other application's performance. Specifically, the neural network computations when part of ASR for example technically may be considered background or preliminary computations for other main applications such as a voice activated search engine on a mobile device. In these cases, the main application's accuracy may be reduced when the neural network computations consume a large amount of processor time and resources. Also, the large neural network computational loads often result in offloading speech recognition processing to off-device or off-client computers, such as the cloud or a server, and that may compromise privacy and may cause more unacceptable delay that lowers the quality of service (QoS).

To resolve these issues, a neural network accelerator and methods to be performed by the accelerator have been developed, and by one example, for use with ASR operations. The accelerator may be referred to herein as a neural network accelerator (NN accelerator or NNA). The NNA, however, also alternatively may perform operations for a Gaussian Mixture Model (GMM) as described below. Thus, one of the basic principles here is a flexible, configurable accelerator that provides highly parallel integer math logic that substantially reduces latency, processor usage, and power consumption such that the NNA enables the majority of high performance speech recognition compute to be performed on-board chips (such as on an SoC) on the small device or client rather than offloading the ASR operations to a remote location (such as a server or the cloud). To further increase the accuracy of the neural network outputs without substantially increasing power usage, processor usage, and latency, the NNA provides the option to use weights with reduced bit lengths but then provides a scaling factor to increase the weight's bit length during computations to compensate for dynamic range loss, and provides this within the highly parallel logic structure. The NNA also may provide partial (subset) output computation-supporting active state lists processing such that a selected portion of a layer that provides outputs for less than all of the nodes on a neural network layer may be processed when processing of the entire layer is not desired. This further reduces latency, processor usage, and power consumption.

Also, methods of using the highly parallel logic structure of the NNA as disclosed herein may include the use of flexible layer descriptor definitions that enable many complex neural networks with variations such as topologies, operations, and sizes to be defined as a set of supported predetermined primitive layer types that further increases the efficiency of the processing of the layers. The flexible layer descriptor definitions enable a very adaptable neural network accelerator that can be used for many different neural network types and layer sequence arrangements without making substantial changes to the neural network accelerator hardware and the firmware used by the accelerator.

Regarding the activation function, the speed and efficiency of the NN processing may be further increased by the use of a highly efficient piecewise linear activation function that can efficiently support many different activation function types by providing a very fast search for output approximations and by using vector multiplication for example. Also, placing an activation function unit in a pipeline after the parallel logic structure produces a relatively high processing rate since the parallel logic may be performing computations by multiplying an input vector by values in a weight matrix for one output of a layer while the activation function is simultaneously computing a final output using a weighted input sum output from a different output (or node) of the same layer (or different layer). Instead, many conventional methods use the activation function for computing the final outputs form sum outputs before inputting new input vectors to accelerator hardware to compute new sum outputs.

Thus, the NNA is a small, flexible, low-power hardware co-processor that runs neural network forward propagation in parallel with a host CPU (e.g., where the CPU is free to perform other operations or to enter low power sleep state for example). The CPU may be or may be polling for the completion of the NNA operation. The NNA uses matrices of configurable batching (or grouping) of multiple input vectors (each to provide a layer output) to provide data to the parallel logic and in order to re-use a single fetched input array multiple times which reduces the number of fetches from memory external to the die holding the NNA (or off-chip). Specifically, the use of concurrent (co-)processing by using the parallel logic coupled with memory streaming that uses the input matrices is one of the ways to process the neural network so that the acoustic modeling does not interfere with the application or cache. The details of these advantages as well as other advantages are provided below.

The resulting NN accelerator may be performed using a much smaller chip area than that used on known SoCs for neural network calculations which may save on chip-area costs. It also provides an order of magnitude lower power than a digital signal processor (DSP) or central processing unit (CPU) operations (in some examples, approximately 300 times less power consumed during compute), and lower power than other known neural network accelerators, especially for affine layers.

Referring to FIG. 1, an example ASR system (or acoustic signal processing engine) 10 that uses the NN accelerator is described. It will be understood that using the NNs to form outputs in automatic speech recognition is just one example specific application for the NNA but there may be many others including a number of different ways to use NN to perform different operations in an ASR process. Also, the NNA can be used for other NN tasks that are not ASR. The ASR system 10, such as a speech enabled human machine interface (HMI), may have an audio capture or receiving device 14, such as a microphone for example, to receive sound waves from a user 12, and that converts the waves into a raw electrical acoustical signal that may be recorded in a memory. The system 10 may have an analog/digital (A/D) converter 16 to convert samples of the raw audio analog signal into a digital acoustic signal and provided to an acoustic front-end unit 18. The acoustic front-end unit 18 may perform pre-processing which may include noise reduction, echo cancelling, beam forming, pre-emphasis filtration to flatten the signal, and/or voice activation detection (VAD) to identify the endpoints of utterances as well as linear prediction, mel-cepstrum, and/or additives such as energy measures, and delta and acceleration coefficients, and other processing operations such as weight functions, feature vector stacking and transformations, dimensionality reduction and normalization. The acoustic front-end unit 18 also may divide the acoustic signal into frames, by 10 ms frames by one example, and extracts acoustic features or feature vectors from the acoustic signal using Fourier transforms and so forth. The feature vector is a numerical representation of the frame or interval of speech input.

An acoustic scoring unit (also referred to as an acoustic model scoring or feature scoring unit or scoring block) 20 then determines a probability score for the phonemes that are to be identified, which may include context-dependent phonemes. This may be accomplished by using Gaussian mixture models (GMMs) to determine the scores. The acoustic scoring unit 20 may compute scores for sub-phonetic, context dependent units based on the feature vectors. The acoustic scoring unit 20 may use sum-of-weighted-differences-squared (SOWDS) logic and score selection logic. The SOWDS logic and score selection logic may be used to compute or otherwise obtain a GMM score corresponding to individual feature vectors. One example of the logic used to compute the SOWDS for the GMM computations was described in U.S. patent application Ser. No. 13/732,329, filed Dec. 31, 2012, published as U.S. Patent Publication No. 2014/0188470 on Jul. 3, 2014, which is incorporated herein in its entirety. When GMMs are used to determine acoustic scores, the NNA described herein may have the logic to alternatively perform the parallel computations of the GMM in addition to the neural network computations as described below. Thus, here parallel logic of the NNA also can be used by a backend search unit (or decoder unit or just search unit) 32 to perform the computations of the neural network when used for either decoding, final language interpretation, or both.

More specifically, the acoustic scores may be provided to the search unit 32, and the search unit 32 may use the acoustic scores as the basis for a search for text corresponding to the acoustic score or sequences of acoustic scores to transform acoustic scores from the acoustic scoring unit 20 into final recognized language. The search performed by search unit 32 may include a search of a locally stored language database. Search unit 32 also may initiate a remote search by wirelessly or otherwise transmitting GMM scores to a remotely located search engine. The search unit 32 may generate text output corresponding to the acoustic scores.

To accomplish this, the search unit 32 may have a decoder 22, which also may be a weighted finite state transducer (WFST) unit, and that uses the acoustic scores to identify one or more utterance hypotheses and compute their scores. Additionally, the WFST decoder 22 also may create a word lattice during decoding that provides confidence measures and/or alternative results. The WFST decoder 22 uses calculations that may be represented as a network of arcs and states that are referred to as WFSTs. The WFSTs may be deterministic or non-deterministic finite state transducers that may or may not have epsilon arcs. The WFSTs may have one or more final states that may or may not have individual weights, and the WFSTs may have one or more initial states.

In the most relevant example here, the WFST may use deep neural network (DNN) output state IDs as input symbols, and the parallel logic of the NNA may be used for this task. Otherwise, the WFST may be based on GMM densities or may be a lexicon WFST (L-WFST), a context-sensitivity lexicon WFST (CL-WFST), hidden Markov model (HMM) CL-WFST (or HCL-WFST) that may have HMM transitions, and HMM state IDs. Many other example algorithms are available for converting the acoustic scores to outputs of scored word sequence hypotheses.

By one form, the search unit 32 is implemented at least partially in software to identify a spoken utterance corresponding to a GMM score by recursively finding a most likely hidden Markov model (HMM) state trajectory through a series of HMMs in the form of the WFST. The back end search may, in some forms, map the log likelihoods from GMM scoring logic to HMM states that model context dependent phonemes. A maximum likelihood state trajectory may then be determined via a Viterbi algorithm. HMM to HMM transition weightings may be determined according to a pronunciation dictionary that defines a target vocabulary. The decoder results in the form of the weightings and text output then may be provided to the language interpreter and execution unit (or interpretation engine) 24.

The WFST may or may not be determinized, minimized, weight or label pushed or otherwise transformed (e. g. by sorting the arcs by weight, input or output symbol) in any order before being used for decoding. The WFST decoder 22 uses known specific rules, construction, operation, and properties for single-best or n-best speech decoding, and the details of these that are not relevant here are not explained further in order to provide a clear description of the arrangement of the new features described herein.

The interpretation engine 24 may determine word to word transition weightings according to a statistical language model. Eventually, a back trace of the most likely path may be provided to determine a set of N-best word sequences. This intent determination or spoken utterance classification may be based on deep neural networks (DNNs) as described herein. Such neural networks may be, or may have layers of, convolutional neural networks (CNNs) and/or recurrent neural networks (RNNs) to name a few examples, and may be a long short term memory (LSTM) neural network by one possible example. Neural networks that are based on affine transforms may use the NNA with highly parallel logic structure or logic blocks described below to perform the computations at individual layers by using the inputs to a node (in the form of a feature vector or input vector for example) to determine the output at the node of the NN layer. The components (logic elements) of individual or each logic block are arranged to give a programmer the option to use weights with different bit lengths and a scale factor may be applied to the weights depending on the bit length of the weights as explained herein. The logic of the NNA also may be arranged so that portions of a layer as indicated by a selected portion of an active list are analyzed when analysis of an entire layer of an NN is not necessary. By one form, the last layer of a network may be the one layer that is controlled in this way, and only part of the outputs of the layer are calculated. In one form described below, flexible layer descriptors are used when setting up the neural network to increase the efficiency of the neural networks as well, and also as explained below. By other options, intent determination or spoken utterance classification may be based on decision trees, form filling algorithms, or statistical classification using support-vector networks (SVNs) rather than the NNs. Thus, the highly parallel logic of the NNA may be used as long as at least one of the operations of the ASR system 10 mentioned above uses a GMM and/or an NN.

Once the user intent is determined for an utterance, the interpretation engine 24 may provide indication of the final intended language so that a speaker component 26 may be used to provide a response in audio form, or a display 28 may be used to provide a response in visual form as text or images for example. Otherwise, an action may be initiated to control another end device 30 (whether or not considered as part of, or within, the same device as the speech recognition system 10). For example, a user may state "call home" to activate a phone call on a telephonic device, the user may start a vehicle by stating words into a vehicle fob, or a voice mode on a smart phone may perform certain tasks on the smart phone. The end device 30 simply may be software instead of a physical device or hardware or any combination thereof, and is not particularly limited to anything except to have the ability to understand a command or request resulting from a speech recognition determination and to perform or initiate an action in light of that command or request, or otherwise to simply record the recognized speech.

Figure 2:
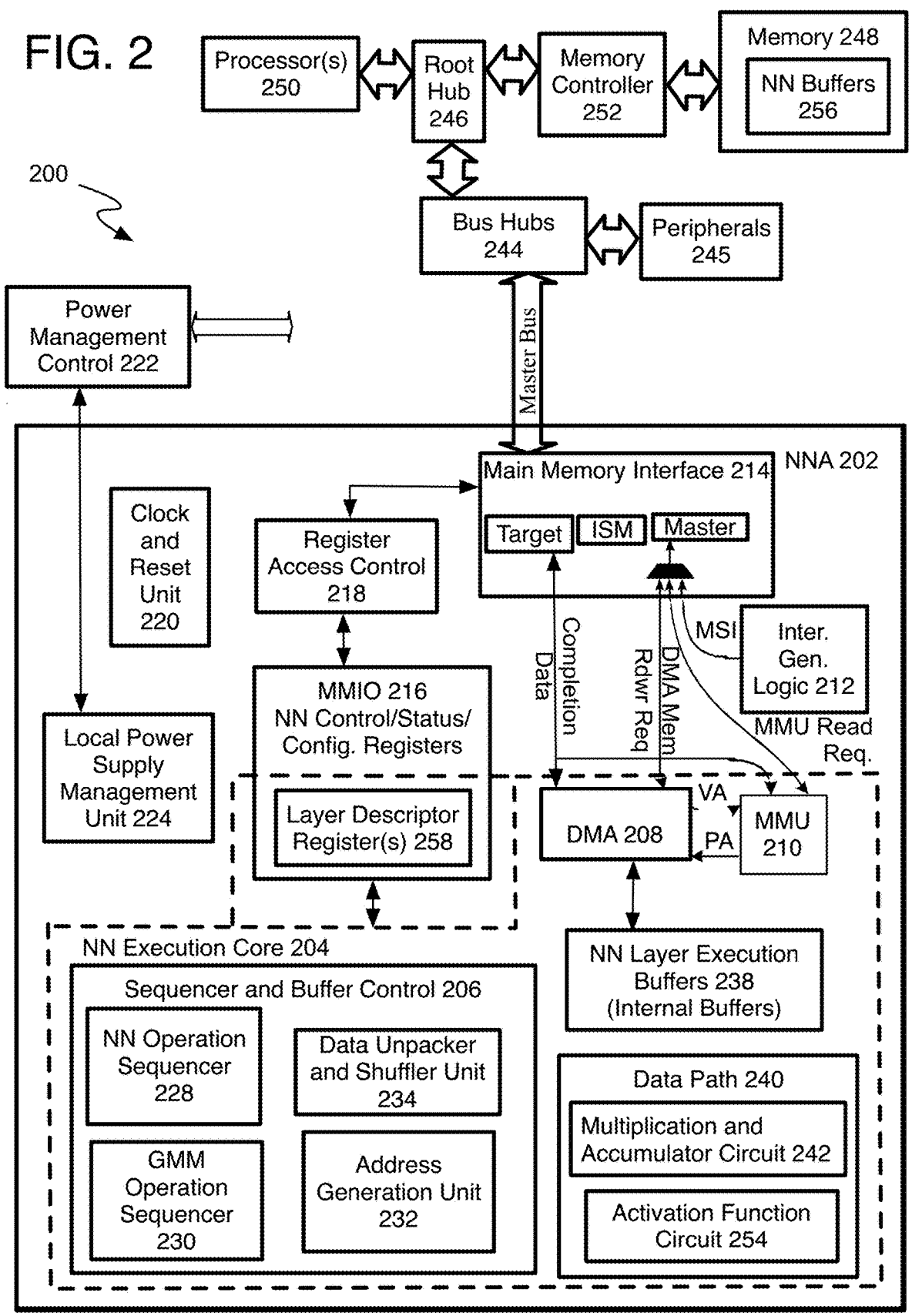
FIG. 2 is an illustrative diagram of an example neural network system.

Referring now to FIG. 2, an example NN system 200, is arranged in accordance with at least some implementations of the present disclosure. In one example form, NN system 200 may be a system on a chip (SoC) that has an NN Accelerator (NNA) 202. Such an NN system 200 may be formed as a module and uses high-speed serial computer expansion bus standards such as a peripheral component interconnect express (PCIe) environment. While the NN Accelerator 202 illustrated here is shown as an integrated product, it will be appreciated that non-integrated implementations also might be used in at least some implementations of the present disclosure.

The NN system 200 may have at least one processor 250 which may include co-processors, multiple processor cores, and one or more processor caches. The processor 250 may process instructions and may send data to, and receive data from, a volatile memory 248 which may be on-board, on-die or on-chip relative to the SoC, and may be RAM such as DRAM or SRAM and so forth. The processor 250 may control data flow with the memory 248 via a memory controller 252 and a bus unit (here called a root hub) 246. The processor 250 also may have data transmitted between the memory 248 and other components in the system including components on the NNA 202 as described below. Otherwise, the processor 250 may retrieve or transmit data to other external (off-die or off-chip) volatile memory (such as cache and/or RAM) or non-volatile memory whether as memory 248 or another memory communicating through the root hub and/or other bus hubs. The root hub 246 tunnels between other components and bus hubs 244 that provides communication with many different types of peripherals 245 as well as the NNA 202. The external memory 248 may be referred to as the more external memory (or just external memory) relative to internal or local memory buffers (or NN layer execution buffers) 238 described below and that may be on the same die as the NNA 202 but off of the NNA 202 itself. Thus, internal and external in this context refers to the NNA 202.

The external memory 248 may store data related to the neural network such as the layer descriptors in an array and, by one example, in an order on physical memory that depends on page mapping and page allocation schemes. The actual order of the layers is maintained at the logical and/or virtual space as described below such as within a layer descriptor or layer descriptor index. The external memory 248 also may have one or more pre-allocated NN buffers (or application buffers) 256 including buffers for a matrix of input values, weights, scale factors, bias values, and other constants. These NN buffers 256 initially hold the data for the neural network before running the neural network or at least before a layer associated with the data is being processed. Eventually, the data in the NN buffers 256 are read by the NNA 202 to be placed into the internal buffers 238 to be used to compute NN outputs as explained below. The data for each layer in the NN buffers 256, such as the input values, scale factors, weights, and other data, also may be pre-ordered in the NN buffers 256, such as in pre-ordered single or two dimensional arrays, so that the data simply needs to be retrieved in the set order for a layer (such as from a start to an end, raster order, or other pre-set order). While the NN buffers 256 are shown to be on-board the system 200 (such as with an SoC), and as a pre-allocated portion of external memory 248, the NN buffers 256 could be, or at least partially be, held external to the SoC 200 on volatile or involatile memory forming memory 248.

Turning to the NNA 202, the NNA 202 may have a DMA unit (or engine or just DMA) 208, memory management unit (MMU) 210, interrupt generation logic 212, and main memory interface 214 to move data among more external memory 248 and the other memories on the NNA 202. The DMA 208 performs data read/write operations to avoid using the CPU time while the MMU 210 assists with addressing the data in the memory and buffers so that paging schemes or other similar memory storage techniques can be used to increase memory transaction efficiency. The DMA engine(s) 208 may be used to monitor the fullness of internal buffers 238 and control the rate of obtaining data from the NN buffers 256 in external memory 248 for placement into the internal buffers 238 depending on the fullness of the internal buffers 238. The interrupt generation logic (or exception handler) 212 is provided for smooth and efficient operation by informing the host CPU 250 that the operation has finished and is ready for implementation of next steps when an NN data path 240 stops execution. Power consumption can be reduced by incorporating the DMA 208 and the MMU 210 by allowing independent operation of memory transactions while the application processor is asleep or performing other tasks for example. The details of these DMA, memory, and buffer operations are disclosed by U.S. patent application Ser. No. 14/722,489, filed May 27, 2015, which is incorporated herein in its entirety for all purposes.

The NNA 202 also may have memory mapped input output (MMIO) registers 216 that may provide NN control, status, and configuration registers that hold the data indicating the settings and parameters from the layer descriptor for a current layer to be processed or that is being processed. The layer descriptor data may be held in layer descriptor register(s) 258, and by one example, holds the parameters regarding the configuration and control for one layer descriptor at a time (but could be more). Thus, the registers 216 may be considered a state machine since it holds the current state (in the form of the layer descriptor) of the current layer being processed in the neural network. The registers 216 may hold the layer descriptor data in registers 258 in a fixed state while processing is being performed on the associated layer (or while the system is idle). The processor 250 may initiate the processing of the NN by having the DMA 208 place the first layer descriptor data from external memory 248 into the layer descriptor register 258, where the layer descriptors thereafter will be placed in the registers 216 one layer descriptor at a time, and in an order as found in the external memory 248 for the neural network. The registers 216 may be controlled by a register access control 218. It will be understood that the layer descriptor registers 258 may be part of the NN execution core 204 whether or not the layer descriptor registers 258 are a part of the register 216.

The NNA 202 also may have a sequencer and buffer control 206, as well as the NN layer execution buffers 238 and the data path 240, which generally and collectively may be referred to as an NN execution core 204 along with the DMA 208 and MMU 210 since these components can be considered active components that perform the main operations to run the neural network and may be run as a single power domain on the NNA 202. The sequencer and buffer control 206 has an NN operation sequencer 228, GMM operation sequencer 230, address generation unit 232, and data unpacker and shuffler unit 234. The NN operation sequencer 228 manages the data flow among the memories, registers, and the path way 240. Thus, the NN operation sequencer 228 reads the parameters of the layer descriptor in the layer descriptor register 258 including pointers to the pre-allocated NN buffers 256 in external memory 248 holding the input values, weights, scale factors, and other data. An address generation unit 232 is then used to determine the addresses of that data from the pointers and that are understood by the DMA 208. The DMA 208 then retrieves the indicated data (with the assistance of the MMU 210) from the NN buffers 256 at external memory 248 or other memory and places the data in the internal buffers 238.

To accomplish these tasks, the NN operation sequencer 228 informs the DMA which data to obtain, and when to obtain the data. The NN operation sequencer 228 also may perform many other data flow tasks many of which are related to the timing of the processing of a layer. For example, the sequencer also may determine which data is to be written to memory or internal buffers upon reading the status of intermediate results (outputs or sums) of a layer at internal buffers 238 before using those intermediate results to compute final outputs for the layer. In other words, intermediate results may be generated when internal buffers cannot hold all of the data for generating an output value. In this case, the intermediate results are saved to memory and later retrieved when the relevant data is made available within the internal memory to form further intermediate results to add to the earlier intermediate results. This save and re-load of intermediate results in some cases may reduce the total amount of memory that needs to be read and/or written. For example when the number of elements in an input is large and cannot be held in the internal buffer, it may still be read and/or written only once. Due to this control of data flow, the NN operation sequencer (also referred to simply as the sequencer), or more precisely the hardware forming the sequencer, also may be considered a state machine.

The data unpacker and shuffler unit 234 is provided to unpack data retrieved from the external memory 248 or other memory, and when that data is received in a format that is not compatible with the path way 240 such that the data needs to be placed in a certain order or format into the internal buffers 238 for efficient retrieval during execution. A shuffler portion of the unit 234 directs input data from an input buffer at internal buffer 238 to the path way 240. This may occur over a number of iterations where input values of an input array can be held in an input buffer in the internal buffer 238 and the input array can be re-used to compute different sums or outputs, and the shuffler can direct the input values to the correct place on the receptacles of the path way 240 for each iteration. By one example, a change in order of data from an array that is arranged as a two dimensional matrix with the input per iteration being a column in the matrix and in sequential order in memory, and the rows being one element per input, and changed to a structure arranged so that a set of inputs of the same iteration can be executed at once which is practically using a column of the matrix. This is performed for different numbers of columns in the matrix.

As mentioned, the NN layer execution buffers (or internal buffers) 238 hold data to be placed into the path way 240 including the input buffer to hold input values of a layer but also a weight buffer to hold weights of a layer, and a constant/bias buffer to hold constants or bias values of a layer. The internal buffers 238 also may have a sum buffer to accumulate intermediate or temporary sums that may be accumulated when placed into the sum buffer to compute a final sum (or sum output) to provide to an activation function circuit 254. For example, one sum for each iteration of the NN, or outputs of a convolution in CNN operation before operations such as poling and/or striding is performed. An activation function buffer that holds piecewise linear segment data to perform activation function operations may be held in the internal buffer as well. Also, an output buffer that receives outputs from the activation function circuit 254 also may be held in the internal buffers 238. The operations using these buffers are described in detail below with neural network system 300.

Figure 4:
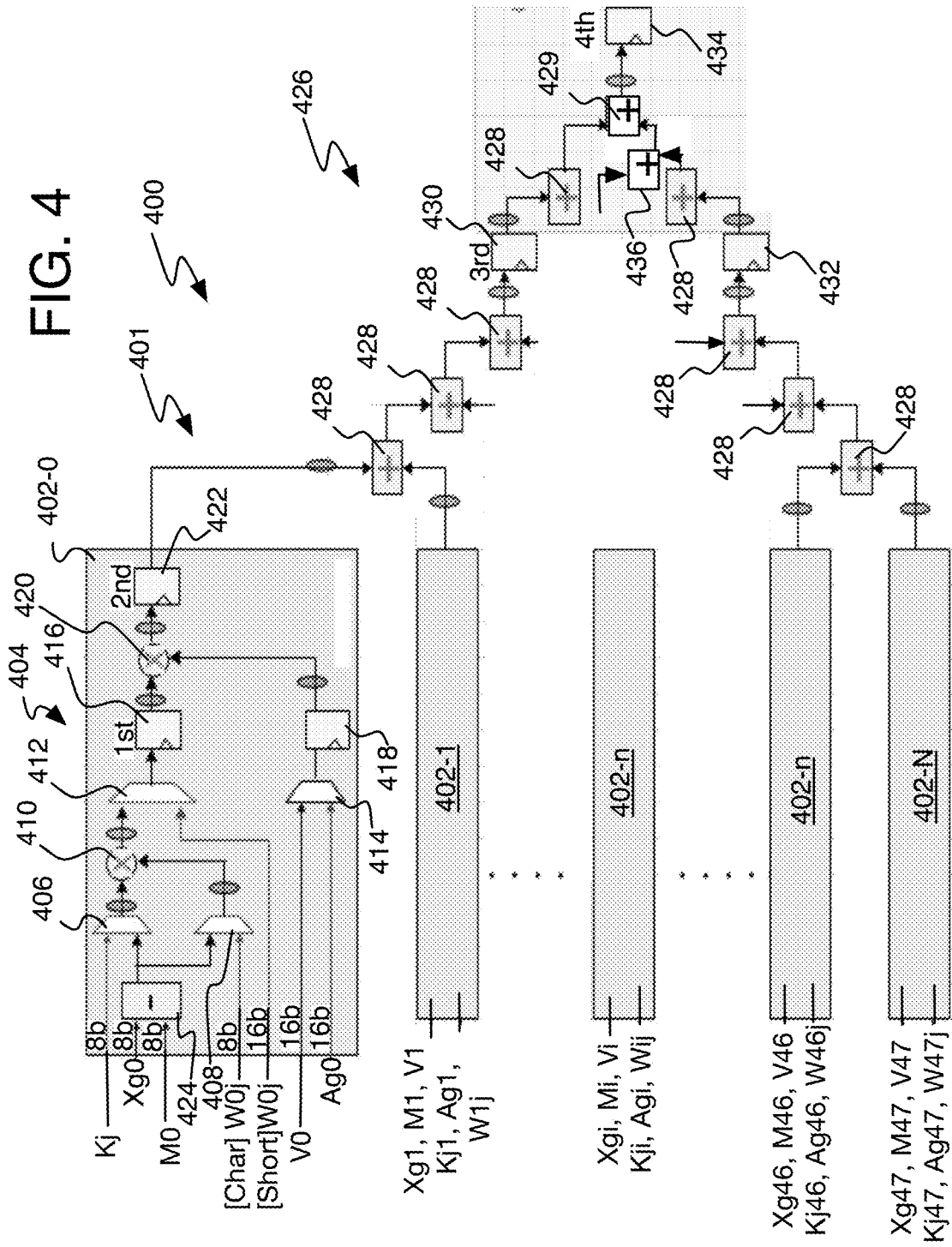
FIG. 4 is a diagram of a logic circuit with parallel logic blocks for processing a neural network according to the implementations herein.
Figure 5:
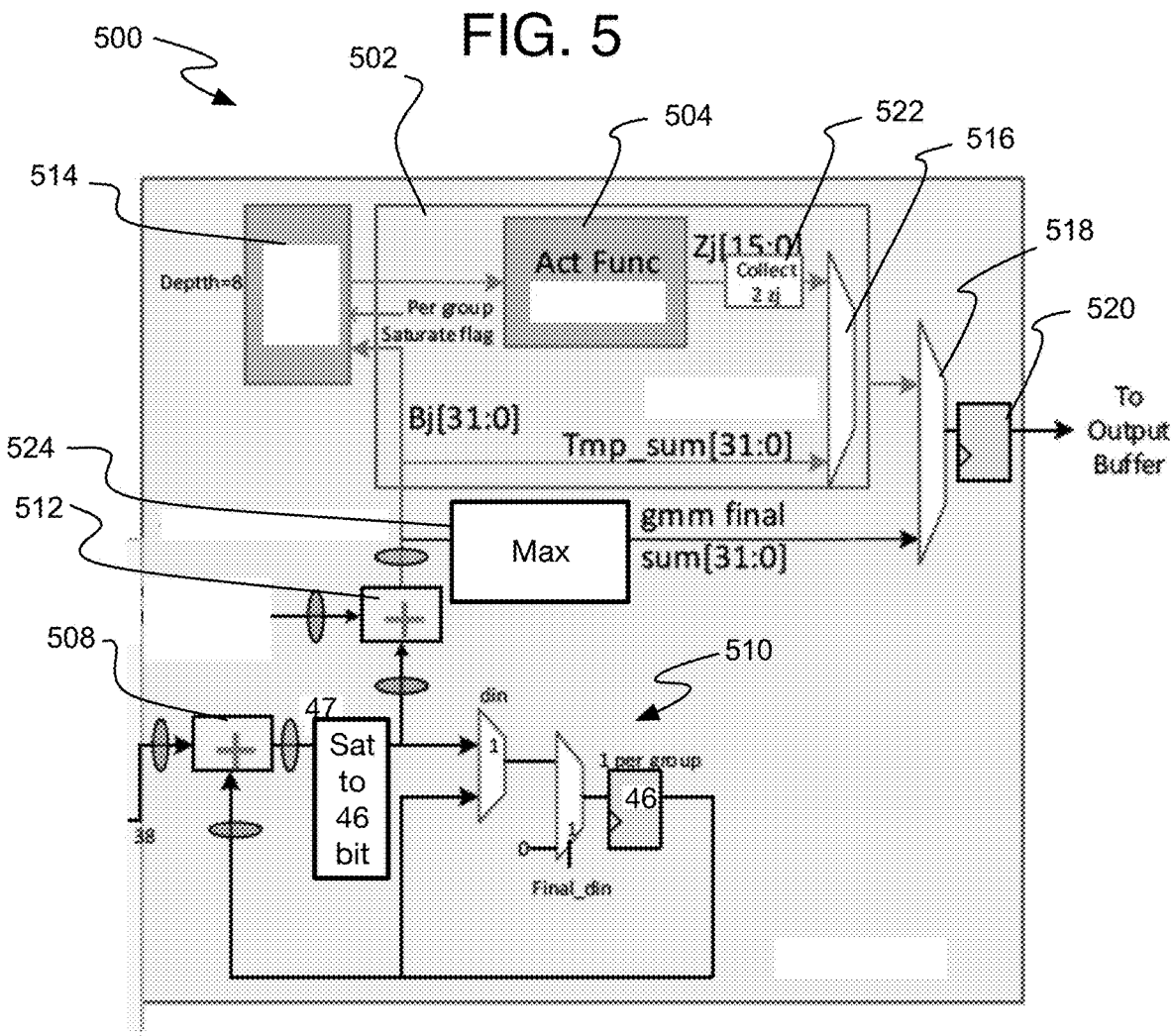
FIG. 5 is a diagram of further logic used for processing the neural network according to the implementations herein.

The path way 240 has the multiplication accumulator circuit (MAC) 242, and also may have the activation function circuit 254 that receives sums (or sum outputs), and by one form, a sum of weighted inputs, from the MAC 242 and provides a final output by applying an activation function (which may be a mathematical operation represented by a piece wise linear representation as explained below). The MAC 242 provides fixed function hardware parallel logic blocks that each compute a weighted input value that is provided to an accumulator to compute a sum of the weighted inputs to form a single output. The details are described with neural network system 300 (FIG. 3), path way 400 (FIG. 4), and activation function unit 500 (FIG. 5).

The sequencer and buffer control 206 also may have a Gaussian mixture model (GMM) operation sequencer 230 that alternatively reads the configuration, status, and control data from the registers 216 similar to the performance of the NN operation sequencer 228, and mostly uses the same hardware as the NN operation sequencer 228. The GMM operation sequencer, however, provides for retrieval and addressing of data for processing a GMM in a sequence that can be different from that used for the retrieval of data for the NN. In this case, the GMM sequencer 230 arranges retrieval of inputs, variances and mean values to be placed into the path way 240 to obtain a best score. The internal buffers 238 also may be used alternatively for NN or GMM data as needed. Also, it will be understood that the present system has the adaptability to analyze a single layer of an NN that is a GMM, or there may be a sequence of layers within a larger NN that are to be analyzed as a multi-layer GMM. Otherwise, the propagation of a GMM, no matter how many GMM layers are present, may be a completely separate operation from the propagation of the NN even though both operations share the same hardware and registers to compute node outputs or sums. The details for the operation of the GMM system is not described herein unless relevant to alternatively providing both NN and GMM operations with the same path way as described below. Note that the details and pointers of a GMM operation may be provided in registers 216 or in memory as a layer similar to a NN layer. A GMM system, however, is fully described in detail by U.S. Patent Publication No. 2014/0188470 cited above. Other details of the operation of the GMM is disclosed by U.S. patent application Ser. No. 14/722,489, cited above.

Otherwise a clock and reset unit 220 provides the clock for the NNA and may provide signals to control the timing of the NN circuit logic flow during propagation of states in the neural network. A local power supply and management unit 224 also may be provided on the NNA 202 to control power domains on the NNA 202 and may itself be controlled and/or communicate with a power management control 222 external to the NNA 202 but still on the system 200 by one example. The power management unit 224 and control 222 may control the opening and closing of power gates and switches on the system 200. Further, system 200 and NN Accelerator 202 may include additional items that have not been shown in FIG. 2 for the sake of clarity.

Figure 3:
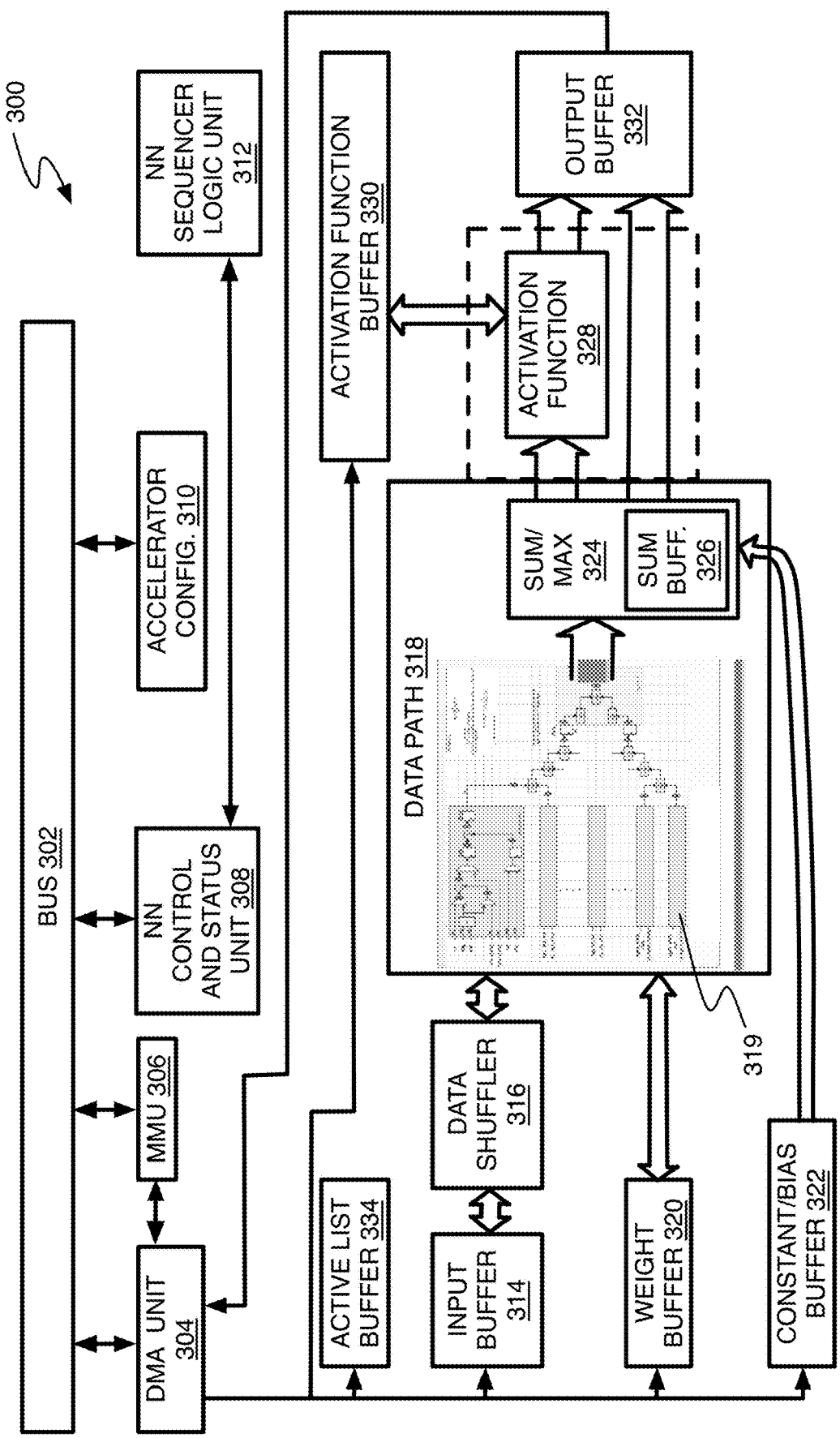
FIG. 3 is a schematic flow diagram of another example neural network system.

Referring to FIG. 3, an example neural network system 300 may be, or may include, a neural network accelerator. Thus, system 300 may be an integrated circuit or system on chip (SoC) as with the NNA 202 by one example. System 300 may include a bus 302 that may transfer data among components on the neural network accelerator as well as one or more memories and processor(s) external to the NNA but still on the SoC as with system 200. In other words, the bus 302 interfaces or provides pathways between the NNA 202 and the external memory for example, and gives access to the NNA registers by a host, and may be considered the equivalent of the main memory 214 plus some path to the internal components that control the internal data flow such as the register access control 218, interrupt generation logic 212, and so forth. Specifically here, a DMA 304 and MMU 306 may perform memory transactions as mentioned above, while an NN control and status unit 308 provides the registers that hold the layer descriptor, and particularly the parameters and state of the current layer being analyzed as well as the locations of the data for the layer as mentioned above for the registers 216. In addition to layer descriptor data described in detail below, the control and status unit 308 may provide a way to control the task start and stop, and indicate tasks and module's status including starting, stopping, in execution, or completed, errors, different modes of the layers such as active list mode, or GMM or NN mode, and so forth. An NN sequencer logic unit 312 instructs the DMA 304 to perform memory transactions to control the data flow from the external memory (such as memory 248) to internal buffers including an input buffer 314, weight buffer 320, constant/bias buffer 322, sum buffer 326, activation function buffer 330, output buffer 332, and active list buffer 334.

The NN sequencer logic unit 312 reads or receives information about the desired operation from the NN control and status unit 308, and schedules data retrievals by the DMA 304 to obtain layer data from NN buffers in on-board or other memory and to be placed in local or internal buffers to be used for the neural network computations and according to the order of layer descriptors placed in the NN control and status unit 308, and the order of the layer data within a layer as arranged in the memory. This may involve reading the order from the layer descriptor register 258 and retrieving the indicated data by using the DMA. An accelerator configuration unit 310 may hold information for operating the accelerator configuration unit 310 as a PCI/PCIe device the details of which are not directly relevant here.

Referring to FIG. 16, the input buffer 314 may hold a 2D input array, such as an array 1600, which may be grouped or batched data and that has 1 to N-elements in groups (here shown as A, B, or C) but could be up to eight groups. The input array may be obtained from external memory (or more external memory as explained above) and may have the same or similar arrangement as the input array is stored in external memory. Each group provides the input elements to compute a single final output that is provided to an activation function, and this could be many input elements (hundreds, thousands, or more for example). The input array may hold the data for up to eight final outputs of the same layer. The data shuffler 316 described below may provide the input elements from the input buffer 314 to the MAC or data path 318 effectively forming input sets, here in 48 elements each. Each input set (up to 48 elements in the current example) is used to compute a single final or intermediate output. This is repeated for each input set formed from other input elements in the same group. Implementations may have other grouping limitations such as grouping more or less than eight groups.

Also as explained below, the input array may be provided in a de-interleaved form or an interleaved form. In most cases, the input array will be provided in an interleaved form. When a neural network has an RNN layer, in this case, the de-interleaved form may be provided. In the de-interleaved form, and when the memory uses row-major storage, the input elements are divided into groups along rows, and as shown in FIG. 16, where input array 1600 is shown in de-interleaved form. In this case, the memory stores the groups group after group. Thus, when the input array is uploaded from external memory to the input buffer at internal memory 314, the data of a first group is loaded, or at least as much as will fit in the input buffer, and then the next group, and so on. Again, this may be used only in the case of an RNN layer where the order of the processing of the layers in the neural network is important, by one example.

Referring to FIG. 16-A, an input array held in memory, whether external memory or internal memory, is shown in interleaved form. In this form, the groups in the array 1602 may be arranged in columns (transposed from the row form shown for array 1600) where the input array 1602 is held in external memory so that during row-major storage, the input elements in the rows are read across the groups A, B, C (but could be up to eight groups) forming the input array. Thus, the first element '1' of each group A, B, C in the first row are read, then the second row, then third row, and so on. The result is that data of multiple groups is placed in the input buffer. This permits the data path 318 to be loaded input set after input set (where the input elements within an input set is from the same group), but where the same weight matrix is used from group to group. Thus, this loads corresponding input elements from different groups into the input buffer that may be using the same weight values. Initially storing the input array in the more external memory for loading into the input buffer also is considered easier and less time consuming because the loading of the array permits the loading of data blocks, where data of the same element but used with various groups become adjacent in the main or more external memory when forming the input array such that it can be loaded into the input buffer as convenient data blocks. The result is a substantial reduction in the use of memory transactions and bandwidth to upload the same weight matrix multiple times for different groups.

It also is mentioned below that a transpose layer exists so that when an input array is provided in one arrangement (interleave or de-interleaved), it can be transposed to the other arrangement when needed. A copy layer is also provided and as discussed below to concatenate input elements into groups when desired. The details are provided below.

When an entire input array in external memory does not fit within the input buffer, chunks or portions of the input array that do fit into the input array may be placed in the input array one at a time. Each such portion of the input array that fits into the input buffer is referred to as an iteration. Each iteration is processed to form an intermediate sum, which is then subsequently added to other intermediate sums to form a final single output for a group. It should be noted that there are two levels of intermediate outputs. One set of intermediate sums by the iterations, but as mentioned, another level of intermediate sums that are added together occurs when there are more input elements in a group in the input buffer than the number of fixed function parallel blocks in the data path 318. Thus, one set of intermediate sums may be added together to form a sum for the data in the input buffer (for a single iteration), and the iteration intermediate sums then total all of the input buffer iterations used and the data is saved in main memory between iterations.

Thus, it can be considered that the system provides another level of parallel processing by providing the option to arrange the input array 1602 in an interleaved form (FIG. 16-A). The NN pathway 318 is still loaded by group though so that all input elements placed into the parallel fixed function blocks to be summed together are from the same group so that an intermediate sum (or final sum) of a single group is obtain by the MAC 319 at a single time. The input elements may be a 16-bit signed integer, and the input array should start at a 64B aligned address. The number of elements in the input array should be a multiple of eight (or alternatively, some other desired/efficient number of groups), and a maximum of eight groups may be placed in the input array by one example form. These parameters including the number of elements and groups (or group level of a current layer) in the array may be obtained from the layer descriptor array as explained below.

As mentioned, the data shuffler 316 may extract input elements in the order of the input vectors (or groups) from the input buffer 314 and places the input elements at the correct logic block of the MAC 319 forming the data path 318. This is performed group by group (or row by row), when the input array is in the de-interleaved form, but in the interleaved form, the shuffler may construct input sets on the fly and where consecutive input sets are not from the same group. This way, the input elements could be selected so that the same weight matrix may be used multiple times. For example, the input elements 1 to 48 may be used from a first group, then elements 1 to 48 of the second group, and so on, where each such input set uses the same weights, before moving to input elements 49 to 96 of the first group, then the second group, and so on in the input buffer. The input elements in the input vector are to be inputted to the data path 318 with a maximum number of elements loaded equaling the number of parallel logic blocks in the MAC 319, which is the same or similar to MAC circuit data 242 (FIG. 2) or 401 (FIG. 4). Thus, when 48 logic blocks are present by one possible example, the data shuffler 316 may obtain up to 48 input elements or values from the input vector at a time. It will extract less than 48 input elements when the input vector (or group) for a single output has less than 48 input elements. When an input vector for a single final output has more than 48 input elements, the data shuffler 314 may load a number of sets of 48 input elements from the same input vector and to the MAC 319. In such a case, there may be a last remainder load less than 48 input elements left in the input vector and loaded to the MAC 319.

The input elements may be loaded from the NN buffers (248) to internal input buffer 314 by the DMA 304 for example after which they are placed on the MAC 319 as mentioned above, and iteration by iteration when the input array is larger than the input vector. This is repeated for each group (or each output) of a layer as described above. When the internal buffer does not have the capacity to hold the entire input array from the NN buffers in external memory (NN buffers 256 on memory 248 by one example), and another iteration is necessary, the sequencer may direct that another iteration (also referred to as a chunk or portion) of the input array from external memory may be brought to the internal memory an iteration at a time where input values or elements of the input array may be processed an iteration at a time. In this case, temporary or intermediate sum outputs may be accumulated in the sum buffer 326. The intermediate sum stored in the sum buffer 326 is saved to memory as an intermediate sum to allow handling of additional outputs. The intermediate sums in the sum buffer may be either the iteration intermediate sums or the input set intermediate sums when multiple input sets are inserted from the input buffer in the same iteration, or both. For processing the next set of inputs, the intermediate sum is re-loaded and to the sum buffer 326 using constant/bias buffer 322. The details of this feature are also described below.

A weight buffer 320 also is provided and may hold a weight matrix of weight values that are alternatively in different bit lengths. By one example, the weight matrix has either 8 bit signed integer weights (that are to be scaled by the logic blocks) or 16 bit signed integer weights although it will be appreciated that different and/or more weight bit-size options could be provided. Also, the use of other data formats than signed integer may be used for any component herein, not just the weighted buffer, and such as floating point, sign and magnitude, fix point or non-signed integers. This selection depends on the developer and the desire to emphasize efficiency with the 8-bit weights or accuracy with the 16-bit weights. One weight matrix may be provided for each layer. In some implementations, the array should start at a 64B aligned address to simplify its addressing. The number of weight elements (or number of columns by one example) should be a multiple of eight by one example where one row of the matrix is provided to the data path 318 at a time.

The weight matrix held at the weight buffer 320 may represent slightly different values depending on the type of layer that is being processed. For affine and recurrent layers, the weight matrix may have one row for each input to a layer and column for each output (or node) of the layer that is to be obtained. This assumes row major organization of memory. It is possible to use the transverse with a column major organization instead. This may be kept consistent for any of the arrays that provide a row or column major option. This is based on the network connections where each output (or node in the current layer) may receive a different weight from the same input node on the previous layer (such values are established in the setup of the NN and are not computed here when running the NN). The weight array is indexed by an output index. When operating with an active-output list (pruned outputs) such as with AL-affine layers described below, the indexing remains unchanged and the weight array is accessed according to obtain weights for the outputs actually used.

During diagonal (matrix) affine layer operation, the weight matrix may be a 1-D matrix with one element per row of the matrix. During CNN layer operation, the weight matrix defines the convolution filters. By one form, the weight matrix may be a 2-D matrix in this case with one row for each filter and one column for each filter element. By another format, a large 1D convolution is implemented where typically the stride is adjusted to jump colors if required.

For ASR applications, the weights may represent a probability of an input being a recognized word or part of a word for a number of different steps along the speech recognition process such that the weights may be acoustic scores for decoding in a WFST for example, or could be subsequent hypothesis scores for the language and interpretation engine. Many different examples are possible. The use of the parallel logic blocks and its related features for ASR provides a number of advantages. For example, when convolution layers are limited to one dimension (1D) as mentioned below with the discussion of the neural network layers, the size of the system can be made much smaller and in turn, much more power-efficient. In addition, the active list feature is particularly well suited to speech applications where NN outputs correspond to HMM states, and not all states are active at once. Also, no matter the application (whether ASR or another application), the parallel compute increases throughput in a simple way.

A constant/bias buffer 322 is provided to hold values that are applied to the weighted input sums. By one example, this may include holding bias values organized as a dense array, and by one example, as 32 bit signed integer values. The bias values may be constant at least for a single output (or node). By other examples, the bias value may be constant for all outputs on a layer. Thus, a bias value may be added to the weighted inputs in a number of different ways. For instance, an individual bias value may be applied to the sum before the weighted inputs are added to the bias value. Alternatively, the bias may be added to the sum of the weighted inputs after the accumulation step. The constant/bias array may be a single dimensional array, with one weight per output.

By another option, the constant/bias array in the constant buffer 322 may be a rich constant array that holds more than one value related to a single output. This may include both the bias value(s) as described for the dense array, but also the scale factor (or scalar) Kj (FIG. 4) that may be applied to 8 bit weights when the 8-bit weight mode is used and in individual or each parallel logic block described herein. The scale factor may be an 8-bit unsigned value or other size as mentioned above, and the constant array may be indexed by an output index. When operating with active-output list (pruned outputs) as described below, the indexing remains unchanged and the constant array may be accessed according to the outputs that are actually used according to the active list. By one example, the constant array should start at a 64B aligned address.

An active list buffer 334 provides an index of active list of the outputs that are to be computed when less than all of the outputs of a layer are to be computed. The use of the active list buffer 334 may be determined by entering a non-sequential mode or depending on the layer type being analyzed where only those outputs indicated are computed using the input buffer. The non-sequential mode may be indicated by the layer descriptor as explained in greater detail below. Instead, when a sequential mode is being used, the input buffer is used to compute all of the outputs of a layer.

When the active list buffer is being used, however, the data path reads the weights, bias and intermediate sum of the outputs actually indexed and skips those outputs (or nodes) that are not indexed on the active list in the active list buffer. It should be noted that the same input buffer is used whether or not sequential mode is used. This may be used to save computational load, power, and processing time when it is known that only certain outputs are needed. For example, as with ASR applications, when it is clear certain sounds or words could not possibly be part of the final output for the ASR.

The data path 318 receives the data from the buffers and is then used for neural network operations. This includes the use of parallel logic blocks of the MAC 319 that first receive the layer data to compute individual weighted inputs for each input value to be used for a single final output or node. Then, the weighted inputs are computed in parallel, and are provided to an accumulator section of the MAC 319 to provide a single weighted input sum (also referred to as a sum output (or more likely a partial sum when more than one input set is included in an input vector (group) or more than one iteration is provided)). These two sections form the MAC circuit 319 and performs an affine transform type of equation as described in detail below. The weighted input sum is provided to a sum unit 324 (or max/sum unit when GMM capable). The MAC 319 has a limit to the number of inputs it can handle at the same time (and by one example 48 inputs), and as explained above, the sum output may be an intermediate sum output placed in the sum buffer 326 where all of the sum outputs for a single output can be accumulated until a final total sum output is determined. By one form, this sum buffer may hold 48-bit sums. The additional bits in the summation are used to reduce errors associated with large intermediate results. The final total or sum output is then provided to an activation function unit 328 when being used but otherwise may be provided to the output buffer 332 for layers that do not include an activation function computation. Note that during the summation operation, saturation logic is applied to avoid overflow. Also, the summation operation is performed for an input set of one group at a time, with the sum unit 326 holding the sum value for multiple groups, this gives the interleave mechanism (shuffler) 316 time to perform its operation which requires multiple data reads from the input buffer 314.

Since the final weighted input (sum output) of the MAC circuit 319 may be described as being the result of an affine transform, the sum output then can be provided to the activation function unit 328 to compute a final output for a node of the NN. The sum provided may be saturated to a smaller number of bits than used during the accumulation, for example 32 instead of 48, or represented in a different way such as floating point. Thus, the activation function unit 328 may be considered as part of the data path 318 (as shown by the dashed line), and is explained in greater detail with activation function unit 500 (FIG. 5). The result of this structure is that data path 318 provides a pipeline where the activation function can simultaneously perform calculations to determine final outputs on output sums from the MAC 319 while the MAC 319 is computing sum outputs for another output. This significantly reduces the time for performing these processes since the time periods can overlap rather than the MAC 319 only accepting new input values when the activation function has completed computation of a final output for other output. By one form, this reduces the time to about 10 cycles which is the computation duration for the MAC 319, for an input with 480 nodes, such that the about 5-9 cycles used by the activation function is used during those 10 cycles rather than after the 10 cycles, thereby reducing the time period for the data path 318 in about half in some cases.

The activation function 328 may be different from layer to layer when being used, and may include piecewise linear (PwL) activation function computations that approximate the output of many different activation function types such as sigmoid, tan h, rectifier linear unit (ReLU), or other algorithms to name a few examples. The particular activation functions are divided into pre-determined PwL segments (see FIG. 17) by methods mentioned below. An activation function buffer 330 may hold the segment data of the layer being processed and for use by the activation function. The segment data may include an array having an input base, an output base, and a slope for each or individual segments up to 128 segments for a layer by one example. Other activation function data that could be held by the buffer 330 includes activation function scale factors, constants, and so forth. In one implementation, the activation function performs a highly efficient binary-type search to identify the segment which the inputted sum output belongs to (i.e., the output is between the base of this segment and that of the next segment), and then performs a linear calculation to compute a corresponding final output value for that inputted sum output. The details of the activation function unit 328 are provided below.

The outputs of a layer are then collected in the output buffer 332. As mentioned, this may include an output value from the activation function unit 328. Alternatively, however, the final sum output may be provided to the output buffer as the output for a layer when no activation function is used for the layer. When the output sum is provided directly, saturation may be applied to limit the number of bits output for example from 48 to 32 bit. This may be a final sum output that is used by other parts of an application (such as ASR). Otherwise, when insufficient capacity exists in the input buffer for a very large input vector, temporary sum outputs may be provided and held in the output buffer 332 as well when the sums are to be used as initial values for the next iteration of inputs in the input buffer and the accumulation of new products of input and weights will be added to it. The DMA may transfer data in and out of the buffers, and the values in the output buffer 332 are written to main memory once a block of 64B is collected. The outputs saved from the output buffer 332 then may be used as inputs for the next layer unless the last (output) layer of the NN was processed. In these cases, the output is chained as the input for another layer via correctly assigning the memory buffer saved as the input for the next layer. In some embodiments, the number of output elements should at least be a multiple of eight as well. As mentioned, the MAC 319 operation may generate a 32-bit signed integer result, but the final result may be larger when a partial sum is generated to be accumulated with other partial sums. The activation function also may provide a 16 or 32-bit signed integer result. The output buffer may have an output array that may be organized as interleaved or non-interleaved in the same way that the input array is set. In some implementations, the array should start at a 64B aligned address. It will be appreciated that the term final sum output (from the MAC 319) and final output (from the activation function unit 328) merely refers to the completion of processing by those units on the most recent run, and does not indicate that all processing of those final outputs or final sum outputs is complete (activation still may need to be applied).

Referring to FIG. 4, a multiplication addition circuit (MAC) 401 for a neural network (NN) data path (or circuit)

400 is described and that may be the same or similar to the data path 240 and 318 described with systems 200 and 300. The data path 400 is used to perform forward propagation of a neural network to determine node outputs but also may have logic elements that can alternatively be used to determine best scores for a GMM. More specifically, an MAC 401 is shown to determine a dot product (or sum output) of the weights and input values for a single node or output of a layer of a neural network. The MAC 401 may have mathematically and/or logically parallel logic blocks 402-0 to 402-N (or generally referred to as logic blocks 402), and by one example, 48 logic blocks are provided but more or less may be provided. The logic blocks 402 are fixed function hardware logic blocks formed of well understood transistors or other semiconductor components. Fixed function here refers to the use of an MAC 401 with particular logic components or elements in an arrangement that does not change.

The parallel logic blocks 402 form a parallel logic section 404 of the MAC 401 and that receive a vector of input data (input set) and a vector of weights from the internal buffers (or other memory) mentioned above, and compute a weighted input for each logic block 402. The weighted inputs are then summed in an accumulator section 426 of the MAC 401 formed of an adder tree and has sufficient time-wise adder operations so that a single weighted input sum (or sum output) which may be final or intermediate is obtained from the accumulator section 426. In case there is a shortage in time, the process may be pipelined using instream pipeline registers noted as $1^{st}$ (416), 2ed (422), 3ed (430) and $4^{th}$ (443) which allows the MAC operation to be done with a throughput of 1 output for one set of inputs per clock cycle.

For this example NN operation, the MAC 401 performs an affine transform:

$$\Sigma(Wij)(Agi)+B \quad (1)$$

where B is the bias added to the sum of weighted inputs. Thus, for neural network propagation, the input to the MAC 401 may include an input set or feature vector from the input buffer and from the input array as explained above, a weight vector from the weight buffer, and a scale factor. These are all used to compute a single output (for a single node). One corresponding element from each of the vectors and the scale factor may be inputted into one of the logic blocks 402. Here, input values are referred to as $A_{gi}$ where i=0 to 47 for 48 logic blocks, weight values are referred to as $W_{ij}$ where j refers to the output that the weight is used for. The weights may be provided as an 8 bit value (C language char data) or a 16 bit value (C language short data), however, it will be appreciated that other sizes or more sizes could be used. A scale factor $K_j$ also may be provided.

As mentioned, the MAC 401 could alternatively be used for GMM operations to compute best scores. Thus, the logic block may alternatively receive input value $X_{gi}$ as one input from a feature vector, mean value $M_i$, and variance value $V_i$, which acts as the weight. Thus, the blocks either all receive NN values $A_{gi}$, $W_{ij}$, $k_j$ or GMM values $X_{gi}$, $M_i$, $V_i$.

The MAC 401 includes resources to receive the NN values or GMM values in parallel and includes a four-stage pipeline (the NN data path has five stages including the activation function circuit). The MAC 401 performs either sum of weighted inputs for NN operations until a final weighted input sum is produced or fed to an activation function to compute an output, or for GMM, a sum-of-weighted-differences-squared values in a pair-wise fashion until a final weighted sum of differences squared value is produced. The number of elements in a single input vector or other data vector (or in other words, in a group) is not limited by the MAC 401. If the number of vector elements exceeds the number of vector component inputs that the logic blocks 402 can accommodate, the MAC 401 may require multiple clock cycles to receive an entire input vector over multiple input sets. On the other hand, if less than 48 elements are included in an input and weight vector, an entire input vector and an entire corresponding weight vector is received in each clock cycle and either the inputs or the weights of the non-used elements are forced to zero so they will not impact the sum result.

As to the NN operation of the logic block 402, the scale factor $K_j$ is present only when 8-bit or some other specified weights are used. In this case, the scale factor $K_j$ is provided to a MUX 406 while an 8-bit weight is provided to a MUX 408. These MUX alternatively handle GMM values. Since no GMM values are present at the MUX during NN operation, the scale factor $K_j$ and the 8-bit weight is passed on to a multiplier 410 to scale the 8-bit weight. As mentioned herein, use of the 8-bit weight provides substantial memory savings. During MAC operations, however, it has been found to be advantageous to scale the weight in order to compensate for dynamic range loss (to provide weights with a range from 0 to 65,535 rather than merely 0 to 255) to increase accuracy by using the dynamic range of the output and/or activation function. The scale weight is then provided to a MUX 412.

When 16 bit weights are used, the weight value is provided directly to MUX 412 so that whichever weight is present, the 16 bit weight or the scaled 8-bit weight that also now is 16 bits, is passed on to a flip-flop 416 that defines the end of the first stage of the NN data path (indicated by the "$1^{st}$" above the flip-flop 416).

The inputs Agi are provided to a MUX 414 which alternatively may provide a GMM variance value. The input Agi may be passed to a flip-flop 418 that aligns with flip-flop 416 also to define the end of the first stage of the MAC data path. The flip-flops control the timing of the data path and provide clock synchronized flow through the data path. By one form, the flip-flops used by the NN data path are D-flip-flops. It will be understood that the flip-flops are not necessarily single separate flip-flops, and may be a pipeline register that has one flip-flop for each of the bits in the word (depending on the width of the data at that point).

In the second stage, the input Agi and the weight (whether scaled or not) are multiplied at multiplier 420 so that a weighted input is then passed to flip-flop 422 before entering the accumulator section 426. This same process occurs for different elements of the input and weight vectors at multiple or each logic block 402.

The accumulator section 426 provides a tree of adders 428 with one branch starting at each of the logic blocks 402 and receiving a weighted input value from a corresponding logic block. Then in the accumulator section 426, each adjacent pair of weighted inputs is summed together in tree or bracket like fashion. By one example, after three addition operations, flip-flops 430 and 432 are shown (there are actually 6 such flip flops for 48 logic blocks) to define the end of the $3^{rd}$ stage and synchronize the logic flow. The accumulation continues for another adder operation, and then an adder 436 is provided before the sums up to this point are provided to a final adder 429. The weighted input sum output (or sum output) from adder 429 is provided to a flip-flop 434 as the end of the $4^{th}$ stage. When an input vector has more than 48 inputs for a single output, the sum output may be an intermediate or temporary sum output and is provided to the sum/max buffer 326 or 514 (FIG. 5) to be accumulated with other intermediate weighted input sums until a final sum output is determined. The sum output(s) also may be placed into the sum buffer to add a bias value B to the final sum output. The final sum output then may be provided to the activation function unit which may be considered a 5th stage of the NN path way 400 pipeline, and/or directly to the output buffer when no activation function is used on the layer as described herein. Multiple sums may be stored by an accumulator 510 to allow alternating execution among groups in an interleaved input array as described above.

While the NN path way 400 depicts logic as being implemented in five pipeline stages, the number of stages is an implementation detail influenced by the number of input components, i.e., the number of elements in an input vector, as well as the speed of the logic elements and the desired operation frequency. For example, MAC 401 represents stages 3 and 4 as being able to complete three consecutive summations in a single clock cycle, but other implementations may be capable of more or less than three consecutive summations per clock cycle, and the number of stages required may change accordingly.

Turning now to using the NN circuit 400 to operate GMM scoring instead of NN propagation, the logic block 402 may receive an input Xgi and mean Mi that is differenced at a subtractor 424. The difference may be provided to both the OR gate 406 and the OR gate 408, which both pass the difference values through since no NN values will be present during this operation. The two difference values are then multiplied by each other at multiplier 410 in order to square the difference (squared difference). The squared difference value is then passed through OR gate 412 to flip-flop 416. Meanwhile, variance value Vi is passed through OR gate 414 to flip-flop 418. The flip-flops 418 and 416 pass on the squared difference value and the variance to multiplier 420 to obtain a weighted square difference from each logic block 402. The accumulator is then used, as with the weighted inputs for NN, to obtain a sum of weighted differences squared (SOWDS). The flip-flop 434 then provides the SOWDS to the NN activation function unit that may also act as a score selection block for the GMM.

Referring to FIG. 5, an output management unit 501 may have an example activation function unit 500 capable of providing the output of a node for a neural network, and a max unit 524 to output a best score for a GMM. The activation function unit 500 may be considered as part of the NN pathway 400 since it receives sum outputs from the MAC 401 as inputs to the activation function (shown as MAC outputs 434). An accumulator 510 also is provided and that expands the accumulation of the MAC 401 to all input elements when more than 48 elements are provided, and not just the 48 of a single input set or even single iteration. This handles the pipeline of the grouping which provides time for the read from the buffers to the data path. The accumulator may be considered as part of the MAC 401. As mentioned above, the MAC 401 and activation function unit 500 form a fast pipeline since the MAC 401 may be generating a sum output based on one group simultaneously to the activation function unit 500 computing a final output based on another group, thereby overlapping these operations rather than waiting for the activation function to finish computing a final output before the MAC 401 beings processing on a new set of inputs.

The activation function unit 500 has at least an activation function block 502 for NN operations as well as a sum buffer 514. A separate max unit 524 is provided for GMM operations. Whether NN or GMM operations, the sum from the MAC 401 is provided to an additional accumulation step that is used to accumulate sums when the input vector or group is greater than 48 elements. The step includes an adder with 47 bits that allows accumulation of up to 512 partial sums without the loss of accuracy, and the saturation logic reduces the sum to 46 bits and prevents overflow effects when the sum is of a larger set of numbers. The result is stored in the accumulator 510 between iterations.

The sum value is then passed to the accumulator 512 where the bias may be added to the first input or loaded to the sum buffer 510 before the first input is accumulated as part of the preparations for the next output calculation. Otherwise, a bias value may be added to the NN sum output (the same bias as already mentioned above), or GMM constants or a partial sum that may be a result of a previous iteration when all of the NN inputs of an input array can't be contained in the input buffer and multiple iterations are in use. The NN sum output then may be placed in the sum buffer 514 as mentioned before with sum buffer 326 (FIG. 3) to await application of the activation function. The sum buffer 514 may be formatted to only accept sums with up to 32 or 46 bits after saturation is applied. The sum-buffer may hold for example 8 sums one for each group executed in interleaved mode. This allows the accumulation to generate an output every cycle despite the fact that the activation function may take several cycles to be performed, as it will be discussed below.

Otherwise, when the activation function will not be used for an NN layer, or multiple iterations are required due to the size of the input, the NN sum (referred to as a Tmp_sum) may bypass the activation function 504 and may be provided through an multiplexer 516 and 518, and a flip-flop 520 used as a buffer before storing the results to memory (322).

Figure 17:
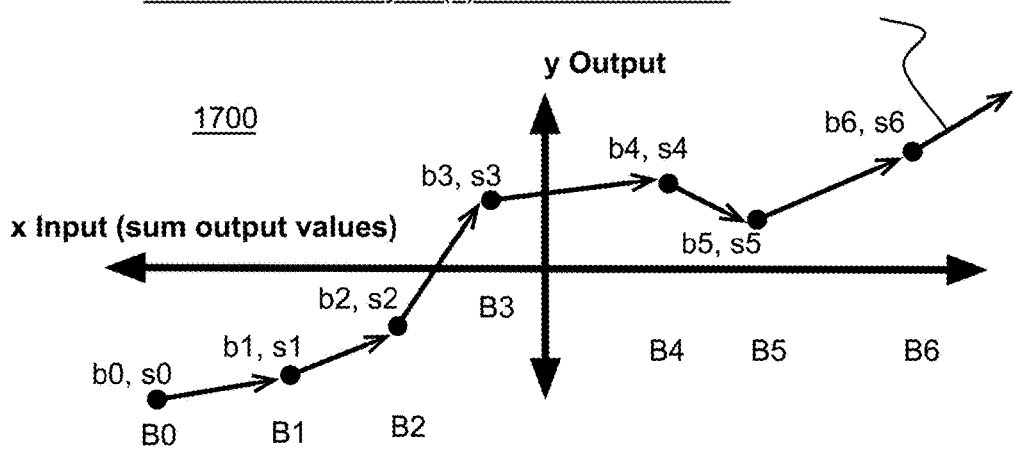
FIG. 17 is a chart of a piecewise linear activation function used for implementations herein.

Alternatively, and while referring to FIG. 17, a final NN sum output may be provided to the activation function 504, and as mentioned herein, the activation function is a piece-wise linear (PwL) function that uses pre-determined segments to approximate the output for any one of a variety of possible activation function algorithms. Basically, an NN developer determines an activation function algorithm to be used on a layer, and then uses known PwL techniques to determine a function line of segments for a supported activation function algorithm as shown by function 1702 on chart 1700 (explained in detail below). The supported activation functions may include sigmoid, tan h, ReLU, and so forth as already mentioned, or approximations of these functions. The data of the segments are then stored in an array and fetched from external memory to be placed in internal buffer when the layer is being processed. The data may be based on a certain point of each segment such as the lower x-point of each segment (left end, or base), but could be another point. By one form, the segment data includes the base input (sum output values), the base activation function or final output, and the slope of each segment. The activation function unit performs a binary search described in detail below to efficiently and quickly determine which segment an input (or sum output from the MAC) falls on. A linear equation with the data from that segment is then used to compute the final output for the input. The details of these equations and pseudo code for performing the search are provided below. The activation function unit 504 itself also is formed of fixed function hardware but may be other forms such as software, firmware, or any desired combination of these.

The resulting 16 bit $Z_j$ output value from the activation function unit may be provided through mux 516, mux 518, and flip-flop 520 to the output buffer. A collect 2 $Z_j$ 522 is gathering two consecutive final outputs to a 32 bit value to simplify the data collection in the output buffer.

AS to GMM operations, a modified SOWDS outputted from adder 512 may be directed to the max unit 524 to compute a GMM final sum (or score) that also is then provided through mux 518 and flip-flop 520 to an output buffer.

Referring to FIG. 6, a process 600 is provided for a computer-implemented method of neural network propagation. In the illustrated implementation, process 600 may include one or more operations, functions or actions 602 to 606 numbered evenly. By way of non-limiting example, process 600 may be described herein with reference to example neural network processing systems, path ways, or circuits 100 to 500 (FIGS. 1-5) or system 1300 of FIG. 13, and where relevant.

The process 600 may include "compute a value of a layer of a neural network by using a plurality of fixed function hardware logic blocks that are substantially logically parallel so that multiple ones of the logic blocks have substantially the same arrangement of logic elements" 602. Thus, dedicated parallel logic blocks may be provided to perform at least neural network propagation.

The process 600 may include "input a weight having a bit length from at least two alternative bit lengths available to input weights to the plurality of logic blocks wherein the available bit lengths comprise at least a first bit length and a second bit length" 604. As described in detail herein, each or individual ones of the logic blocks have hardware logic elements arranged to alternatively use either 8-bit weights or 16-bit weights providing a NN developer flexibility to use the 16-bit weights for better quality results or alternatively to use the 8-bit weights for more efficiency, e.g. less computational load, faster processing, and so forth. Other or more weight bit sizes could be used as well.

The process 600 may include "applying a scale factor to weights provided in at least the first bit length, and to omit the scale factor when weights are provided in at least the second bit length" 606. Thus, to compensate for dynamic range loss, the hardware logic elements are arranged to apply a scale factor to the smaller weights, here the 8-bit weights, so that a much greater range of values for the weights is available (0 to 65,535) while calculating neural network value, which in this case may be a weighted input sum of an affine transform to be provided to an activation function to thereby determine a final output for a node by one example.

The system here also may provide other features to use with the parallel logic blocks. For example, an activation function unit may be in the same pipeline as the logic blocks to receive a sum output from an accumulator of the weighted inputs from the logic blocks as an input. This arrangement permits the logic blocks to use one input vector of one group while the activation function unit determines a final output for a different input vector(s) (or different group(s)) rather than forcing the logic blocks to wait until the activation function is finished before starting with a new input vector (or new group). When the activation function is a PwL function that supports a variety of activation function algorithms (or layer types), the pipeline is very flexible to process a variety of layer types in a variety of sequences. As to other features, an input buffer may receive input values in an input array in the form of input vectors held in groups for multiple outputs of a layer. An interleaved mode may be provided so that input sets of different groups are processed by the logic blocks of the input array across the groups instead of finishing one group before going to the next group. An active list feature permits the use of an active list buffer that holds an index of selected outputs to be used for NN propagation so that those rows in the input array that hold data for an omitted output from the active list are also omitted from processing. In addition, state machines may be used to hold the data of a layer descriptor, monitor the status of a current layer being processed, and control data flow between external and internal buffers. The pipeline also can be arranged to alternatively process a GMM. These features can save a tremendous amount of processing time and power consumption and significantly reduce processor load. The details of these features and others are provided elsewhere herein.

Figure 7A:
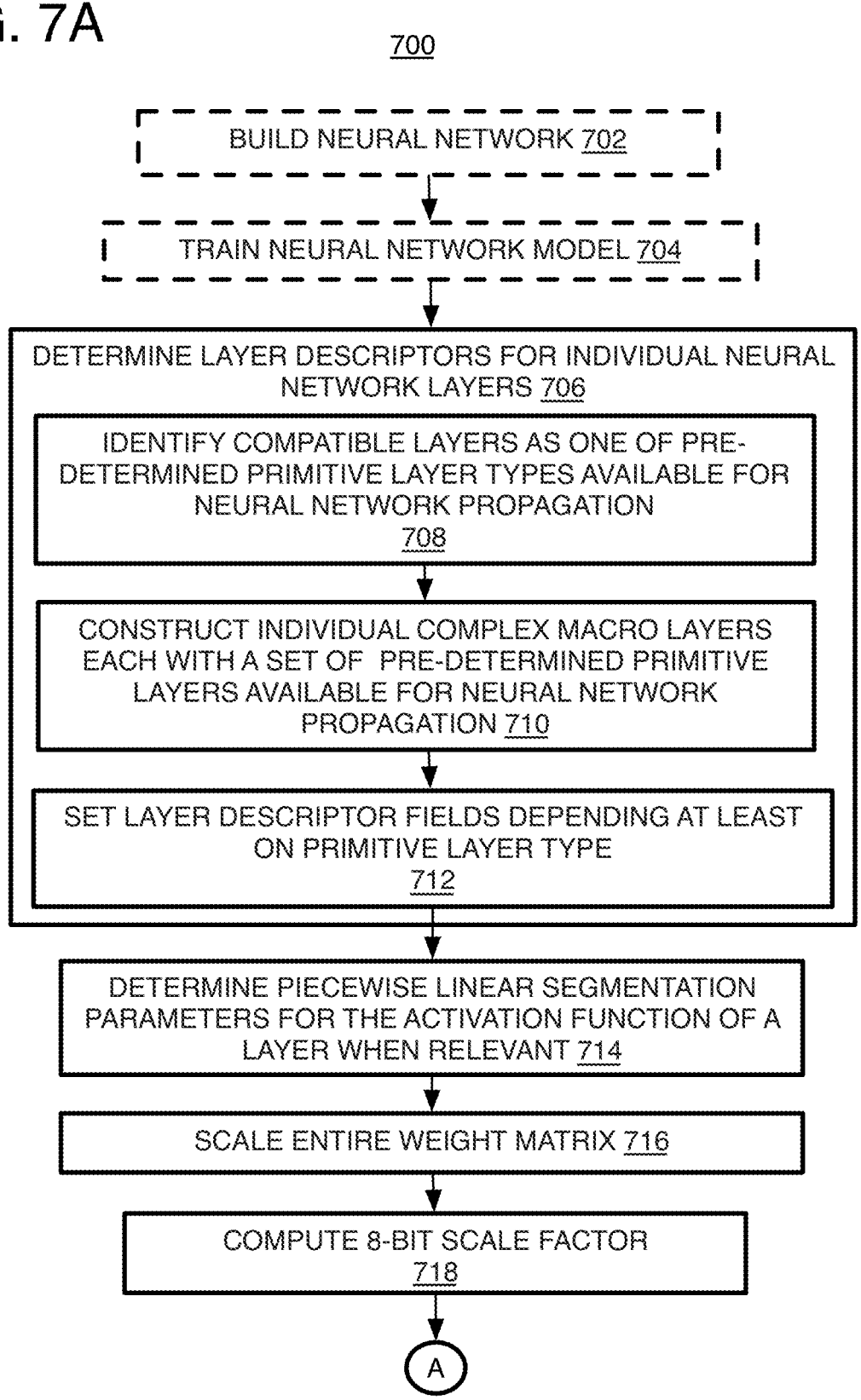
FIGS. 7A-7B is a detailed flow chart of an example method of neural network layer descriptor chain setup according to the implementations herein.
Figure 7B:
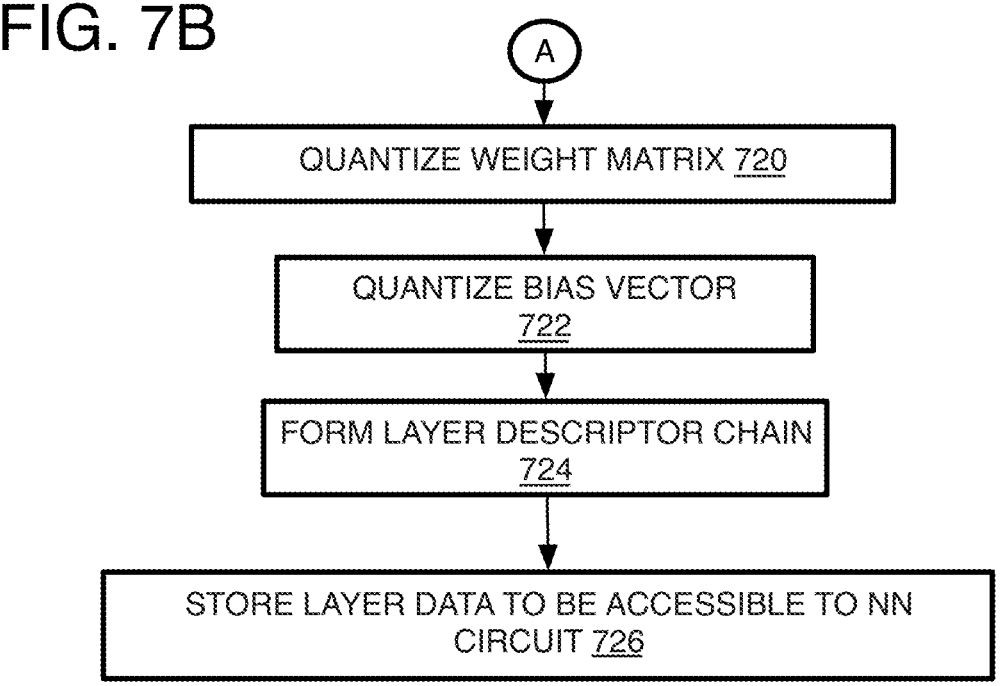

Referring to FIGS. 7A-7B, a process 700 provides a method for neural network layer descriptor chain setup, and is an overview process of the setup of the neural network that can be used on the fixed function hardware of the NNA disclosed herein or other systems. Process 900 below provides a detailed method of developing the layer descriptor chains for the setup. In the illustrated implementation, process 700 may include one or more operations, functions or actions 702 to 728 generally numbered evenly. By way of non-limiting example, process 700 may be described herein with reference to example neural network processing systems or circuits 100 to 500 (FIGS. 1-5) and system 1300 of FIG. 13, and where relevant.

The process 700 may include "build neural network" 702. This may include a number of operations that may be performed by an NN developer (or engineer or programmer) using known NN building toolkits such as Kaldhi, Theano, CuDNN, and other similar programs. The operation may include selecting the number, initial type, and location of inputs, layers, connections, biases, activation functions, initial weight values, and so forth.

The process 700 then may include "train neural network model" 704, and by one form using stochastic gradient descent, or other methods, to iteratively refine the values of the neural network parameters (weights, biases, etc.) given training data and desired outputs. Both the building (or design) and training of the neural network are shown in dashed line since they are considered preliminary operations out of the scope of the layer descriptor scheme described herein, although some operations for setting up the layer descriptors described below could be performed during a design phase of the neural network.

By one approach, the process 700 then may include "determine layer descriptors for individual neural network layers" 706. Specifically, this includes an NN refinement and layer descriptor chain forming process also to be performed by a NN developer using a toolkit but could be performed automatically. The layer descriptor chain is formed to make the layers of the NN to be compatible with the application and hardware that will run the neural network to obtain desired output from a set of real world inputs. Thus, the process of modifying a neural network into compatible layers defined by a chain of layer descriptors and an application to run the neural network may be considered to be a process that is separate from, and subsequent to, the design and training phases of the neural network.

More specifically, a system provides an NNA that supports a relatively small number of pre-determined primitive layer types. Thus, the NNA such as that disclosed above may perform propagation for many different types of neural network layers including artificial or complex macro layers that cannot themselves be considered a primitive layer but can be constructed by a set of the supported primitive layers by one example. To accomplish this, the layer descriptors are extremely flexible in that each layer descriptor can indicate the type of primitive layer to be used and can be used in many different orders in order to define many types of neural networks. Thus, the input to the NNA to perform neural network propagation may be the data of the flexible layer descriptors that define the operations in each layer and may include pointers to pre-allocated memory buffers that hold the layer data for that layer indicated by the layer descriptor, and where the specified operations result in a set of outputs for the layer. When temporary storage buffers are used, these may be specified as part of the descriptor as well. A detailed process 900 (FIGS. 9A-9E) is provided below as an example process for a NN developer to construct a layer descriptor chain to be input to an NNA or other NN processing device. The following are some of the operations of this process.

Accordingly, the process 700 may include "identify compatible layers as one of pre-determined primitive layer types available for neural network propagation" 708. Thus, by one example, the system may provide a pre-determined set of primitive layer types that include layers such as an affine layer, an AL (active list)—affine layer, diagonal affine layer, recurrent layer, CNN layer, transpose layers, and a copy layer. Other layers could be used. The NN developer may define initial layers from the NN framework as one these primitive layers as described in detail below. The description of these layer types are also provided below.

The process 700 may include "construct individual complex macro layers each with a set of pre-determined primitive layers available for neural network propagation" 710. For initial or artificial complex layers that cannot be immediately defined as a single primitive layer, and is therefore considered a macro layer, the complex layer may be constructed by (or expanded to) a sub-chain of the supported primitive layers. Thus, a single initial complex layer could be expanded to multiple primitive layers. The details are provided below.

Figure 8:
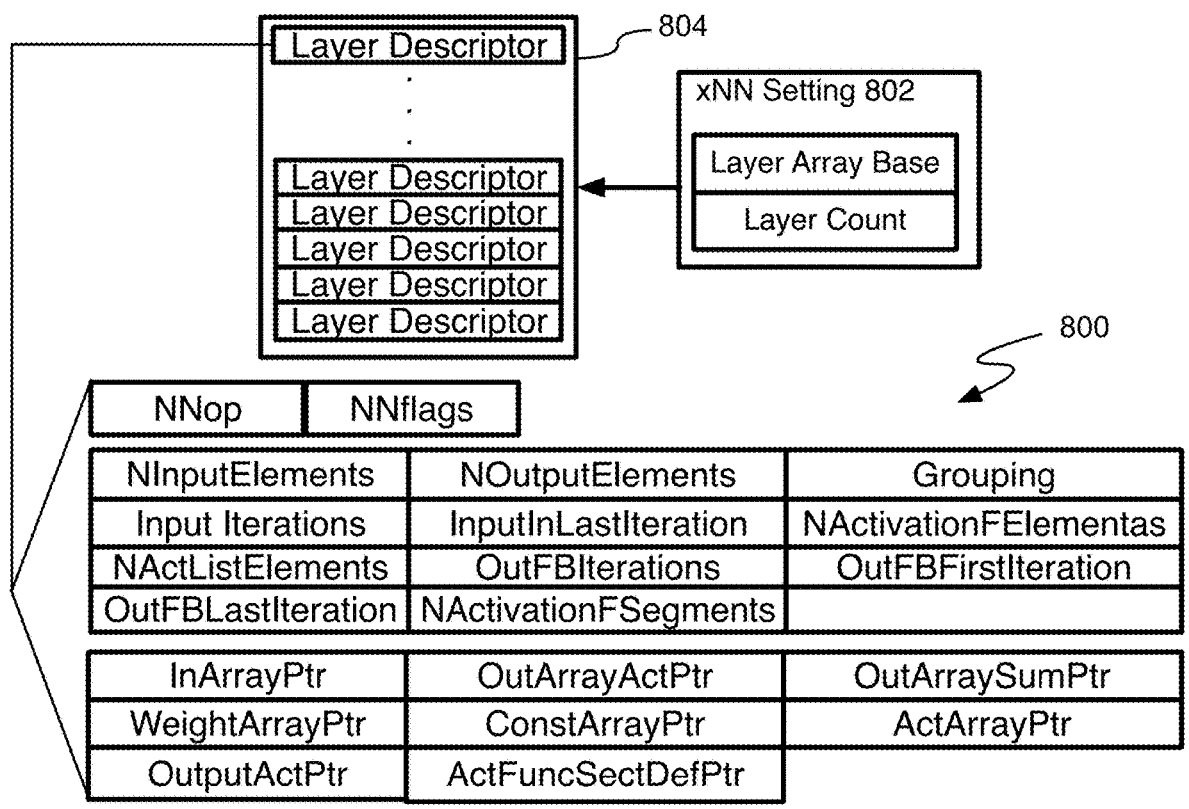
FIG. 8 is a schematic diagram of a layer descriptor array.
Figure 9A:
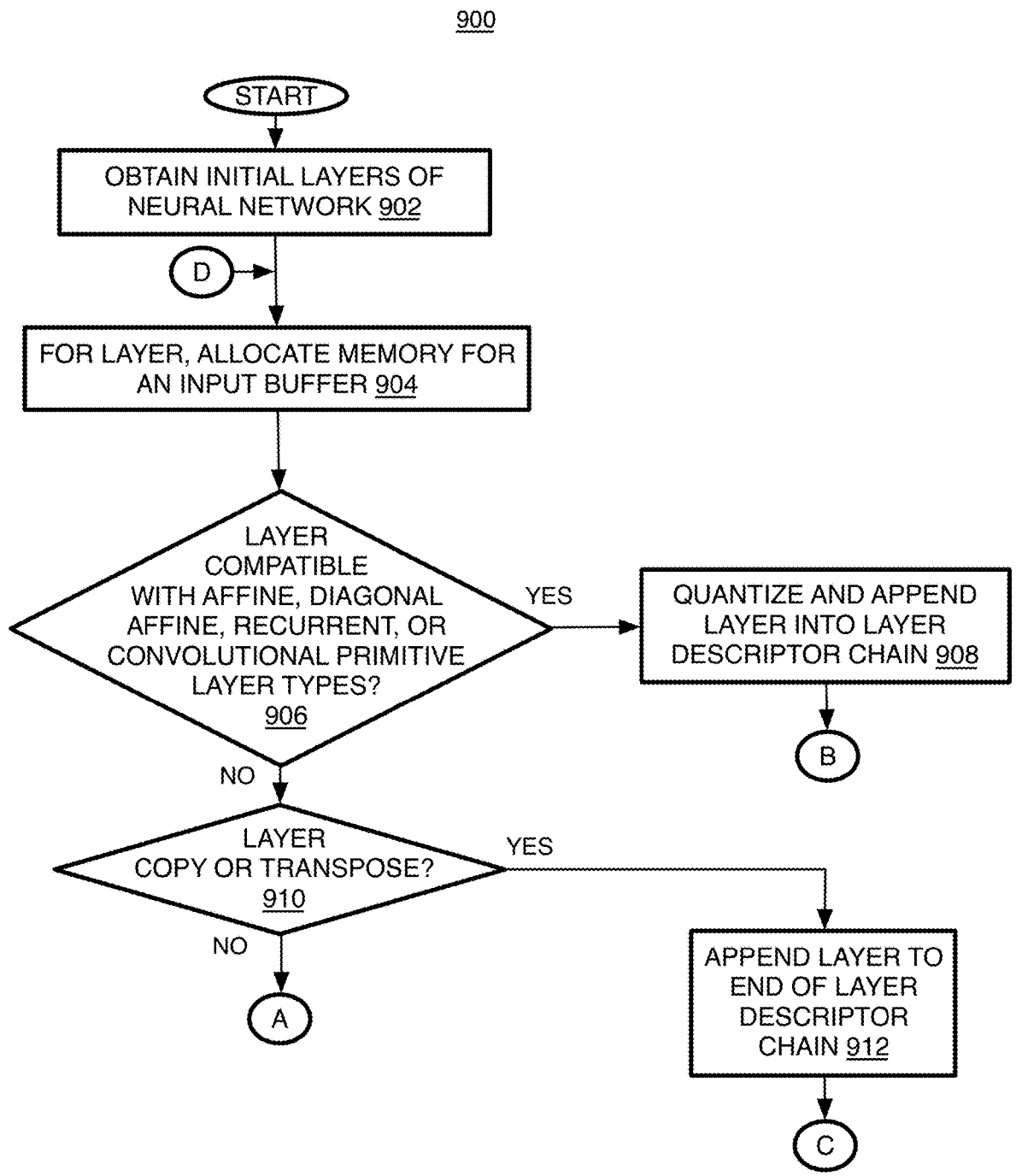
FIGS. 9A-9E is a flow chart of an example detailed method of setting up a layer descriptor chain for the neural network using flexible layer descriptor definitions.
Figure 9B:
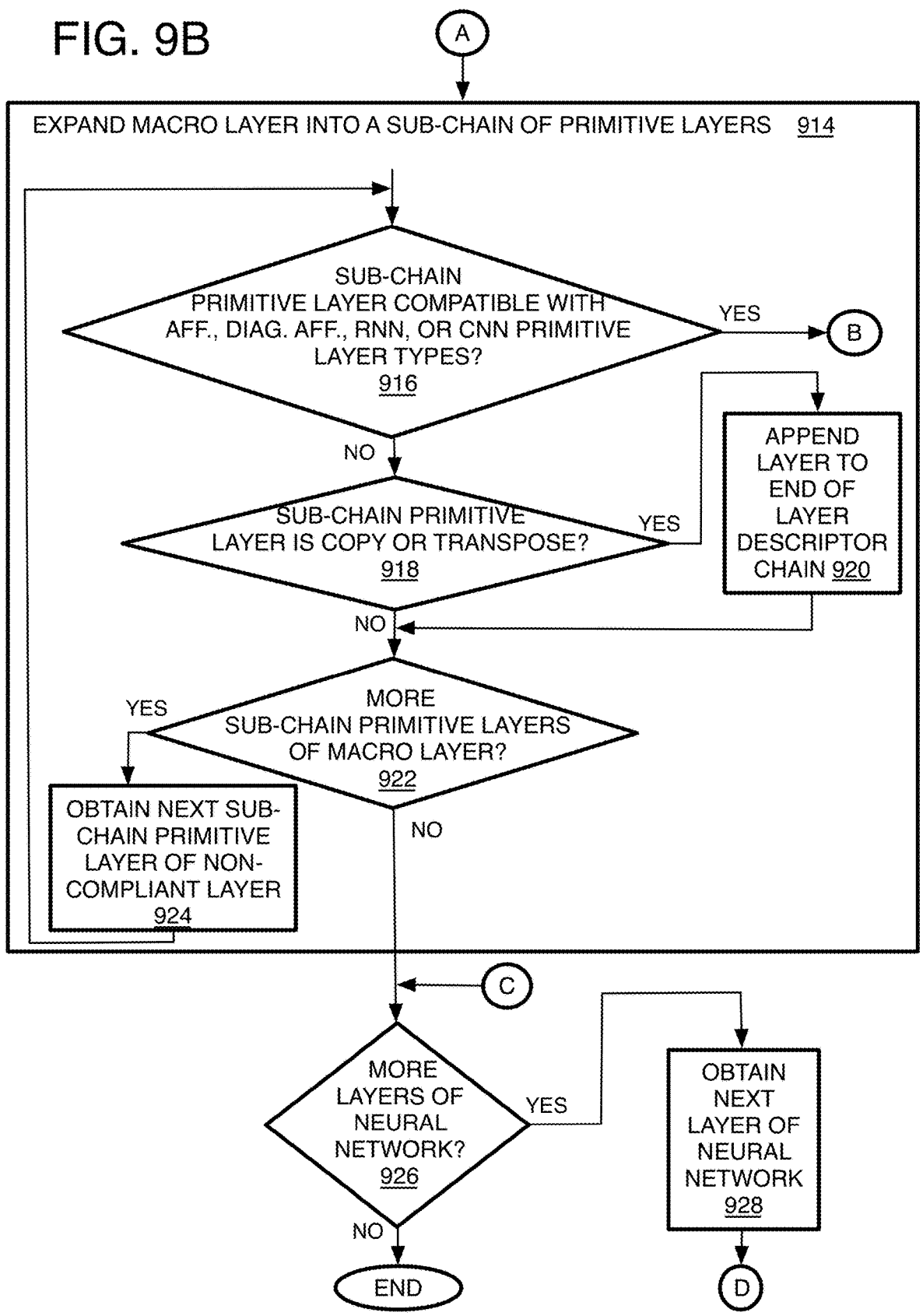
Figure 9C:
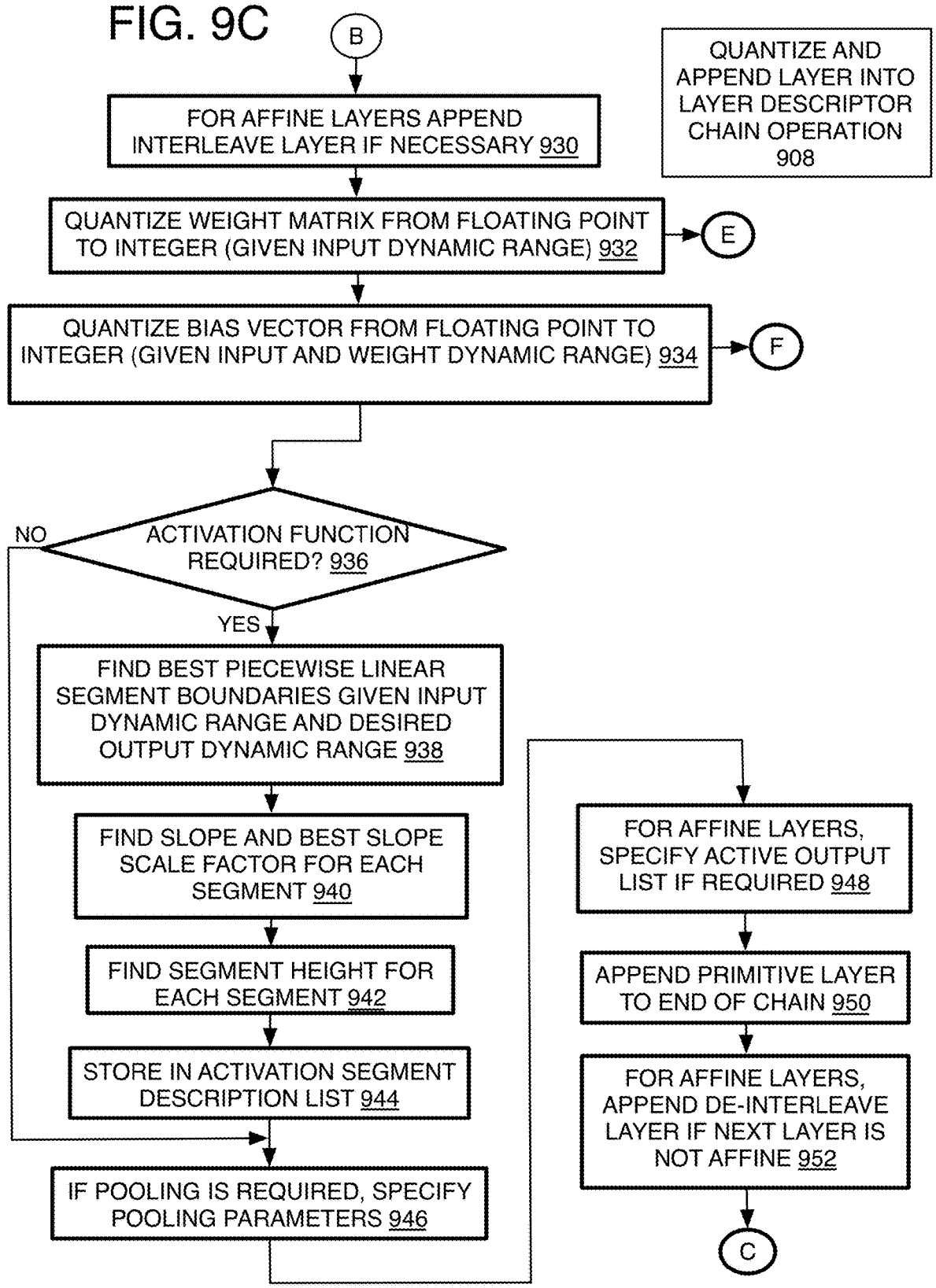
Figure 9D:
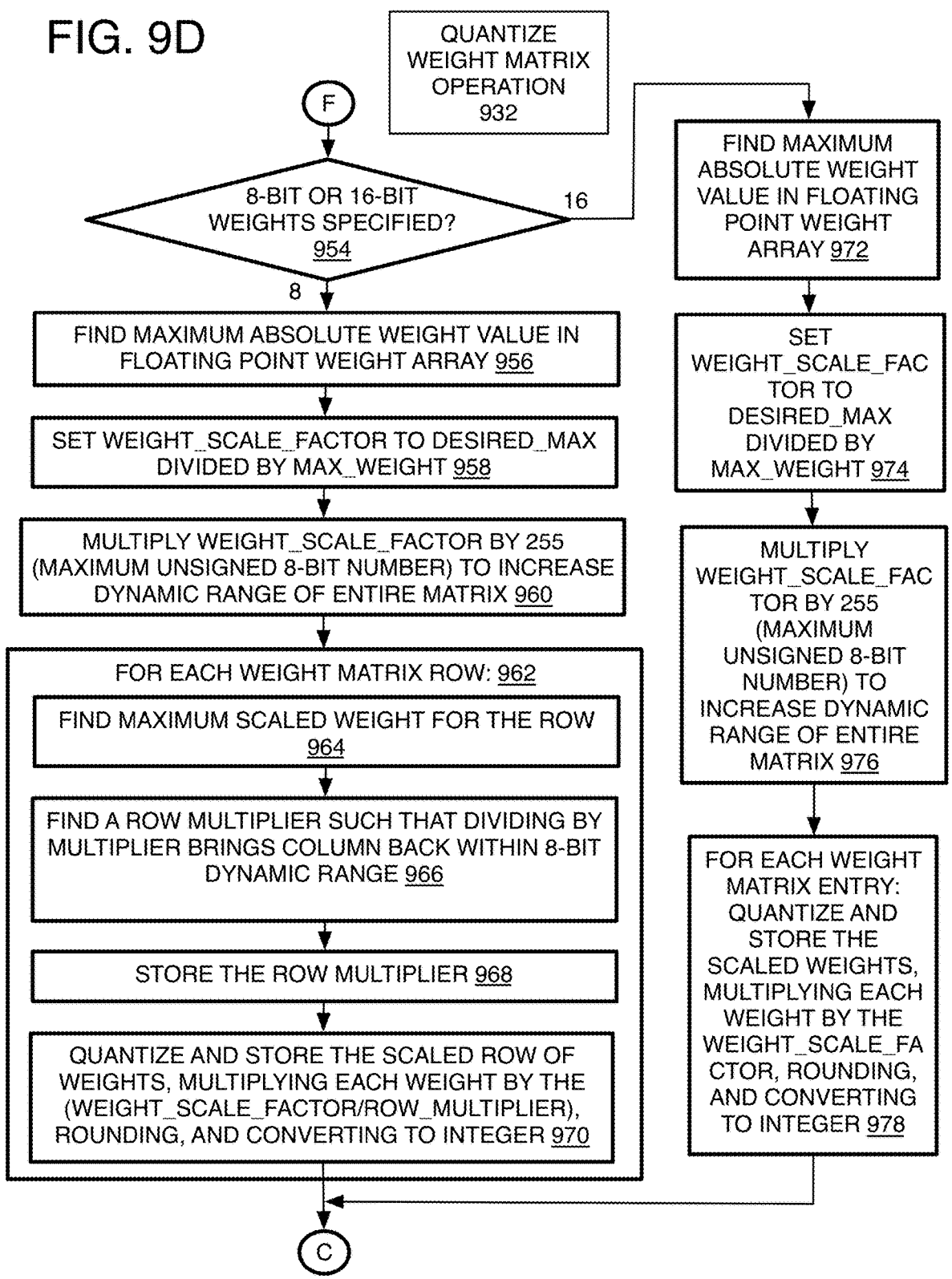
Figure 9E:
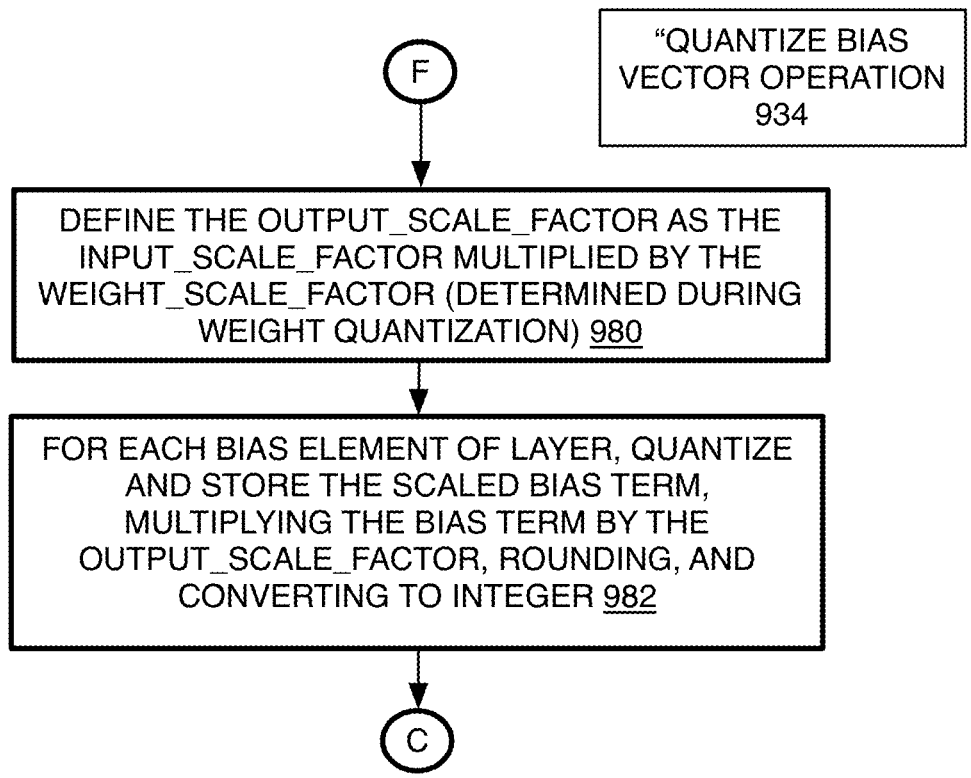

The process 700 may include "set layer descriptor fields depending at least on primitive layer type" 712, and as mentioned, and will be explained in detail below, each layer descriptor has a layer descriptor array with fields that each indicate a property of the layer. One of those fields indicate the primitive layer type, which in turn may control some of the other fields also as explained below with example layer descriptor array 800 (FIG. 8).

The process 700 may include "determine piecewise linear segmentation parameters for the activation function of a layer when relevant" 714, and as explained in detail below with process 900, to obtain the piecewise linear (PwL) parameters for those layers that have an activation function. Basically, one reason the activation function in the data path pipeline is very flexible is that it can handle layers with a variety of different activation functions. This is performed by using PwL to approximate an output from the variety of activation functions. During development, once the developer determines which activation function to use on a layer, PwL algorithms are applied to determined PwL segmentation for that activation function. Then data such as the input and output of the function at a point on each segment as well as the slope of each segment may be stored as an array to be used by the activation function during running of the neural network. The details are provided below.

The process 700 may include "scale entire weight matrix" 716. Here, the entire weight matrix is scaled for both weight sizes to increase the dynamic range of the entire matrix. This is separate from determining the 8-bit scale factor for scaling the weights inputted to the parallel logic blocks as follows (see operation 976 below).

The process 700 may include "compute 8-bit scale factor" 718, and scale factors to input to the MAC for 8-bit weights. One example pseudo code is provided below to compute the scale factor (also referred to as the row multiplier) for 8-bit weights. A flow chart for the scale factor computation is provided below with process 900 as well. Note that the application of the scale factors is similar to a diagonal matrix to be multiplied by the weight matrix in the affine transform equation (1) or (2) recited herein as it is related to a host structuring the operations while building the scaling factors. The use of scaling factors during scoring operation may improve numerical accuracy and scale within the numerical dynamic range.

```
// For 8 bit weights quantize as follows:
// 1. adjust scale factor to increase dynamic range of entire matrix by max multiplier
// 2. find maximum scaled weight for each row
// 3. find multiplier such that dividing by the multiplier brings row back within 8-bit
dynamic range
// 4. quantize and store scaled row
*ptr_weight_scale_factor = MAX_OUT_MULTIPLIER * *ptr_weight_scale_factor; //
increase dynamic range by max multiplier
for (uint32_t row = 0; row < num_rows; row++) {
float scaled_row_max = 0;
float rounding_value, value;
for (uint32_t col = 0; col < num_columns; col++) {
value = ptr_float_weights[row*num_columns + col] * *ptr_weight_scale_factor;
if (fabs(value) > scaled_row_max) {
scaled_row_max = fabs(value);
        }
    }
    value = scaled_row_max / (float)MAX_VAL_1B_WEIGHT;
    ptr_int_biases[row].multiplier = (uint8_t)(value + 0.5);
    for (uint32_t col = 0; col < num_columns; col++) {
        int8_t *ptr_weight_8 = ptr_int_weights + (row*num_columns + col);
        rounding_value = (ptr_float_weights[row*num_columns + col]>0) ? 0.5f :
-0.5f;
        value = ptr_float_weights[row*num_columns + col] *
(*ptr_weight_scale_factor / ptr_int_biases[row].multiplier) + rounding_value;
        if (value > 127.0) {
            *ptr_weight_8 = 127;
            num_saturate++;
        }
        else if (value < -128.0) {
```

```
            *ptr_weight_8 = -128;
            num_saturate++;
        }
        else {
            *ptr_weight_8 = (int8_t)value;
        }
    }
}
```

The process 700 may include "quantize weight matrix" 720, where the weights are quantized by converting the weights from floating point to integer. Then, the process 700 may include "quantize bias vector" 722, and this operation may include determining scaled bias values for the vector and converting the scaled bias values from floating point values to integers as well.

The process 700 may include "form layer descriptor chain" 724, where generally, the layers may remain in the order of the initial framework of the neural network when a single layer defines a layer with a single primitive layer type. As mentioned, some initial complex or macro (or artificial) layers may be expanded into chains of primitive layers. Also, the layer descriptors for certain format or arrangement layers may be inserted into the layer descriptor chain. This may include transpose layers that orient grouped (multiple output) data so that the data of individual outputs of a layer extends along a row of an input array for example when row by row processing is desired, or vice-versa when processing across multiple groups is desired. These are respectively referred to as de-interleave and interleave layers described below. A copy layer also may be inserted to copy layer data from one memory address location to another while concatenating multiple input vectors from different layers. When a layer is labeled as one of the primitive layers, then the layer descriptor, and in turn its layer, is added to the layer descriptor chain by indexing the layer descriptor with the other layer descriptors. The details are provided below with layer descriptor array 800.

The process 700 may include "store layer data to be accessible to NN circuit" 726. This may include initially storing the layer descriptor chain on a memory that is external to the NNA or other application that will run the neural network according to the layer descriptor chain. This also may include storing the input values, weights, scale factors, and bias values in NN buffers in the external memory. Also, a PwL segmentation array for the activation function unit as well as an active output list for the active list buffer may be stored for each layer. Later, the layer descriptor may be placed in registers where it can be read by a sequencer to establish the state of the current layer being processed, and the layer data may be fetched and placed into internal buffers when needed as explained herein.

It will be appreciated that although the primitive layers and flexible layer descriptors are particularly suited to operate with the NNA and the MAC and fixed function parallel logic hardware for NN processing as described herein, the flexible layer descriptor process need not always be limited to such hardware structure, and may work with other fixed function hardware structures that perform NN processing, or may work with hardware, firmware, and/or software that does not have or use the structure of the NNA disclosed herein.

Referring to FIG. 8, one possible example basic NN setting 802 is provided by the present methods and NNA with the configuration expected by the sequencer and buffer control unit of the NNA. The NN setting parameters and expected configuration may be revealed to a user (NN developer) through an NN toolkit or other NN building application for example so that the user can format a NN for NNA processing by defining the NN layers with layer descriptors compatible to the NNA and create an index of the layers descriptors.

For the basic NN setting 802, the NN layers are organized in a layer descriptor chain or list 804 of layer descriptor arrays 800 which may be pointed to within a layer array base field. The size of each element or parameter in the array may be fixed, and the LayerCount field may indicate the number of layers to be handled. The size of each layer descriptor array 800 also may be fixed (such as at 128B), and its size may be aligned to 64B. Some of the fields may take different meaning depending on the type of layer used in which case the different parameter name is indicated with a '/'. The parameter fields of the layer descriptor are defined as follows:

NNop provides the code for the NN layer type to be used (or NN operation to be scored). Thus, there is a different code for affine, AL-affine, diagonal affine, recurrent, convolutional, de-interleave, interleave, and copy, each of which is described in detail below.

NNFlags is a 1B structure that holds a list of flags that define certain kinds of NN operations that are to be executed by the layer. The flags may include:
  WeightElementSize:
    00: Weight array holds a 16-bit element (scalar not used) and the Const array uses the Dens Const format.
    01: Weight array holds a 8-bit elements (scalar in use) and the const array uses the Rich Const format.
  ActivationFunctionEn:
    0: Activation function is disabled
    1: Activation function use is enabled
  PoolParam: Applicable in CNN layers only.
    00: PoolingDisabled. (ActivationFunctionEn determines if the AF is executed)
    01: MaxPool (must set: ActivationFunctionEn=1) . . . .
    0.10: AvaragePool (must set: ActivationFunctionEn=1)
The remaining layer descriptor parameters may be described as follows:

| Name | Description |
| --- | --- |
| NInputElements | Total number of input elements (per group) |
| NOutputElements | Number of output elements (per group) |
| | For CNN layer: Number of output elements (per filter) |

| Name | Description |
| --- | --- |
| Grouping/<br>NFiltersInLastIteration | Number of Input groups used where each group may form a different final output<br>For CNN layer: Number of Filters in buffer in the last iteration |
| InputIterations/<br>PoolStride | Blocking size used to fit size of input buffer<br>For CNN layer: Pool Stride |
| InputInLastIteration/<br>InputConvStride | Number of input elements in last iteration per group<br>For CNN layer: Input Stride |
| OutFBIterations/<br>NPoolElements | Number of iterations in feedback stage<br>CNN: Size of Pooling window |
| OutFBFirstIteration/<br>NConvFilters | Number of elements in first feedback iteration<br>For CNN layer: Number of Convolution Filters |
| OutFBLastIteration/<br>FilterIterations | Number of elements in last feedback iteration<br>For CNN layer: Number of Iterations to process through all the filters |
| NActivationFSegments | Number of Activation Function Segments |
| NActListElements/<br>NCopyElements/<br>NConvFilterElements | Number of output elements in Output Active List Enabled mode<br>For Copy layer: Number of Elements Copied<br>CNN: Number of filter elements (per filter) |
| NFiltersInIteration | CNN: Number of Filters in the Input Buffer in a full iterations |
| NConvOutputElements | CNN: Number of output elements (per filter) after convolution (before pooling) |
| SizeOfFilterBufferIteration | CNN: Number of Bytes that filters occupy for non last iteration |
| SizeOfFilterBufferLastIteration | CNN: Number of Filters in the Input Buffer in full iterations |
| InArrayPtr | Pointer to Input Array |
| OutArrayActPtr | Pointer to Output Array |
| OutArraySumPtr | Pointer to Output Sum Array |
| OutFBArrayActPtr | Pointer to Output FB Array |
| WeightArrayPtr/<br>FilterArrayPtr | Pointer to weights Array/<br>Pointer to Filter Array (CNN) |
| ConstArrayPtr | Pointer to Const and Weight Scale Array |
| ActOutputsListPtr | Active Outputs List Pointer |
| ActFuncSectDefPtr | Pointer to array that holds the Activation Function section definition |

The NN may use an input buffer with a size (InBufferSize) which is 24 KB or other sizes as long as the parameters are set to be compatible with the size of the buffer, and may be used to calculate different parameter values.

The supported primitive layer types and some of their features are as follows:

Fully Connect Layer (Affine Layer):

A fully connected layer (or Affine layer) is any layer (input, output, or hidden layer) where the weight matrix for that layer is mostly populated (referring to at least more than half) with non-zero values so that any output for nodes on that layer is impacted by a significant amount of the inputs. Such a layer operation is described as an activation function of an affine transform such as:

$$y(t)=f(Ws(t)+B) \quad (2)$$

which is similar to equation (1) above. Here, W is a weight matrix (or vector) that defines the layer connectivity, s(t) is the layer's input vector at time (frame) t, y(t) is the output vector at time (frame) t, B is a bias vector if present, and f( ) is the activation function for the layer. As mentioned, the present system uses a piecewise linear (PWL) activation function for this affine layer to approximate a number of activation functions (or types) such as sigmoid, tan h, ReLU, and so forth.

The fully connected layer has a phase in which the input array is read from memory using a function noted as ReadInputBuffer( ). This function is reading a portion of the input array into the internal Input buffer and allows its reuse for calculation of all output elements. During this read, the grouping level is used and the interleaved organization is assumed, so that the data can be re-organized internally in a correct way.

The structure of the const array depends on the mode of operation defined by the WeightElementSize field.

Since in some cases, the internal buffer is too small for the size of the InputArray, the input buffer is chucked to portions which are loaded one at a time as noted by InputIterrations. A side impact of this is the need to save and later restore the partial sum value on each block of the inputs. The save and restore use the OutputSumArray for this purpose (even though this value is not required as an output).

During the accumulation phase, the system adds guard bits to preserve accuracy of the accumulation even with long inputs. The accumulation uses a 46-bit accumulator and will saturate the value before a save to OutputArraySum[ ] or before performing the activation function. Note that this saturation may result during the accumulate operation when multiple input buffers are in use. This accumulation and saturation rule may be applied during all NN operations that involve accumulation.

The Activation Function segments are defined in an ActFunct[ ] array, which is loaded upon the start of the layer handling. The ActFunct[ ] array may include 8 byte structure that defines each segment.

Saturation refers to the case when a number is saved to a lower range number, and when the original number cannot fit the new range, the max-int or min-int are used as the result for a larger positive or larger negative number, respectively. For Example: when a 32-bit value is to be scaled to a 16-bit value, if the value is positive and any of bits 30 to 16 of the value is other than zero, then use all 0x7FFF as a response (max 16-bit int), and (2) if the value is negative and any of bits 30 to 16 is other than '1', then use 0x8000 as a response (min 16-bit int).

Fully Connected Layer with Active Output List (AL-Affine):

Fully connected layers are operating on an interleaved array, where multiple groups of data (each group from a different output) are interleaved to improve efficiency of memory bandwidth via re-use of the weight matrix read for all groups. Note that both input, output and OutputSum arrays are used. As explained above, the active list array defines which of the outputs is calculated and an index of the outputs is placed in the active list buffer where each output indicates a list of its inputs that are to be obtained to compute the output. By one form, the output array is set up as a dense array including only the active outputs.

Recurrent Layer:

A recurrent layer is a layer in which the output of one frame processing is fed as input (to the same layer) as part of the next frame input. This creates a memory effect and by one possible example can be viewed as:

$$s(t)=f(Uw(t)+Ws(t-1)) \quad (3)$$

where U and W are weight matrices, f( ) may be a function such as sigmoid, and w(t) also is an input vector. The feedback uses the full output of the previous iteration, and in case only part of the inputs are required, W should include zeros at the appropriate parts. Other example forms of recurrent layer such as:

$$s(t)=f(Ux(t)+Ws(t-1)+Ff(t)) \quad (4)$$

where x(t) may be an input vector and F is a matrix of connection weights, and the terms are otherwise defined as above. This can be implemented as a combination of the basic recurrent layer and proper setting and/or concatenation of vectors.

For one example recurrent layer structure, the input and output are handled as de-interleaved arrays. The pointers use the flow rules. The input array can be located anywhere in memory (size M with possible grouping of 1 through 8). The output array and Out_FB (output feedback) array should be skewed by 'n' groups for an 'n' groups delay in the feedback (typically n=1). (Size of output N, grouping of 1 to 8 is allowed and should match input array setup). The number of outputs is a multiplier of 32 to maintain a 64B alignment of the Out_FB array for subsequent iterations. For K frames delays, the Out_FB of iteration K should match the pointer of Out[0,0], where in many cases K=1 but other K values are allowed. The weight matrix for the recurrent layer is an (N+M)×N matrix. The output has a 16-bit format (with activation function) only. Outputs may be grouped in de-interleaved manner. When there is more than one iteration of compute (InputInLastIteration+OutFBfirstIteration is greater than 1), an OutputArraySum must be supported for intermediate results storage by one form.

Convolutional Layer:

Convolutional layers correlate the input to the layer with a specific correlation filter. Optionally a "Pooling" algorithm is used to reduce the size of the output by combining multiple interim outputs via either a MAX or Average operations. The NNA supports a 1-D CNN which is shown to be useful in speech recognition, with a 1-D Pooling algorithm. The convolution operation is done in multiple nested loops. The same operation is iterated for multiple filters. Some parameters settings are as follows:

Grouping should be set to 1.

WeightElementSize is set to 16-bit.

Const array has one value per filter and is always at a dense format by one example.

The filter size (NConvFilterSize) should be a multiple of 8 inputs and should have a minimal size of 8 elements in it. Filter elements should be 16-bits. The number of filters should be a multiple of 4. The number of filters in the buffer depends on the size of each filter and the size of the buffer is specified by NuOfFilterInBuff and should be 4, 8 12 or 16. In some forms, just one of the output arrays is used depending on the type of output. In all cases when OutputArrayAct should be used, output element size may be 32- or 16-bit depending on the activation function operation.

When Pooling is available but disabled, the number of output elements (J) is $$NOutputElements=NConvOutputs=(NInputElements-NConvFilterSize)/NConvFilterStride+1 \quad (5)$$

When Pooling is enabled, the number of output elements (F) is NInputElements $$NOutputElements=(NConvOutputs-PoolSize)/PoolStride+1 \quad (6)$$

NOutputElements should be set in the layer setting and match the other parameters setup. NConvOutputs is used for explanation only. Note that the system may or may not auto-pad arrays. In case the number of elements does not divide exactly into a whole number, the last element of output is not generated.

The MaxPool operation is done on the output of the activation function. The MaxPooling has a 1-D structure on the filter outputs (rows of the output array). The Max Pooling has several parameters defined in the output array:

PoolSize: number of elements being handled

PoolStride: The MaxPool output is calculated once for every PoolStride elements of the input.

MaxPoolType: Either Max or Average operations are supported. Average operation is implemented as a 'sum' of inputs and the activation function should include the proper scaling according to the number of elements summarized.

Diagonal (Matrix) Affine Layer:

A diagonal matrix is used as an intermediate operation in various processes. In the diagonal matrix layer, the weight values that do not occupy a space on the main diagonal of the matrix are all zeros. Thus, the operation is reduced to a Wij matrix being an array with one element for each point in the diagonal. For the use of the diagonal matrix layer, the input and output arrays should have the same size.

Transpose Layer (Interleave or De-Interleave Layer):

These layers are used for re-structuring the data structure from being 'un-grouped' to 'grouped' and vice versa. More specifically, the neural network layer input can be viewed as a 2D matrix. One of the dimensions is the input vector length and the other dimension is the grouping factor (i.e., batch size) where each group forms a different output of a layer. Thus, the transpose layer groups input data from multiple groups into a single array so that this array can be fetched from memory together thereby reducing the number of memory transactions. This also applies to the output in a similar output array. The transpose layers (interleave, de-interleave) perform a matrix transpose operation on the input matrix, writing the transposed matrix to the output as follows:

The Interleave layer takes as input an array which is in the de-interleave format (as shown on FIG. 16) and transposes it to the interleave structure 1602 (FIG. 16-A). For example, each column of the interleave matrix or array 1602 may be one or more input vectors for an output of a layer, while the number of rows then indicate the number of inputs in the group. Different grouping values may have different performance for the array transpose operation. Oppositely, the de-Interleave layer takes as input an array which is in the interleave format and transposes it to the de-interleave structure (1600 on FIG. 16). These operations may be done on input and/or output arrays with 16-bit data elements by one example.

This data transposition may be used as a preliminary operation to the execution of recurrent layers for example, and in some cases may be used after these layers are processed as preparation for additional fully connected layers. Note that the interleave operation may be used as part of construction of the input array when the inputs are collected for each frame and the interleave operation can create the interleaved array to be used as input to the NN operations.

Data Copy Layer (or Concatenate Layer or Just Copy Layer):

A copy layer is a layer that takes two vectors and concatenates them to a single larger vector. This operation is used during preparation of inputs for one group from parts of the input or output of other layers. The copy layer may be a native layer that copies data stored at one memory address location to another place in memory. By one form, the copy operation is intended to manipulate de-interleaved arrays with a specific grouping setup. Multiple copy operations may be used to concatenate portions of such arrays. The parameters that a copy operation receives may be:

Source array start: InArrayPtr
Destination Array Start: OutArrayActPtr
Size of src array (number of elements in a row): NInputElements
Size of dst array (number of elements in a row): NOutputElements
Number of Groups in both src and dst: GrpNum
Number of elements to copy in a row: NCopyElements The operation is done on 16-bit data elements. It is possible to copy arrays with 32-bit or 64-bit elements by properly scaling the number of elements and handling each 32-bit or 64-bit elements as two or four 16-bit elements, respectively.

Example pseudo code may be as follows:

The number of elements in each group (NCopyElements) should be a multiplier of eight. Concatenation of interleaved arrays can be done via pointer manipulation. The copy operation may be used for copying such arrays by use of group setting of 1 and proper, respective setting of the length parameter.

Referring to FIGS. 9A-9E, a process 900 of setting up a layer descriptor chain is provided. In the illustrated implementation, process 900 may include one or more operations, functions or actions 902 to 982 numbered evenly. By way of non-limiting example, process 900 may be described herein with reference to example neural network processing systems, data paths, or circuits 100 to 500 (FIGS. 1-5) or system 1300 of FIG. 13, and where relevant.

Process 900 may include "obtain initial layers of neural network" 902, and as mentioned above the layer descriptor process disclosed herein is a process used after a neural network has been structured and trained thereby providing refined weight values and other parameters. The layer descriptors are used to format the initial layers into one or more of the pre-determined set of primitive layers supported by the NNA. The process may be performed by an NN developer using a toolkit for entering the data such as Intel® GNA library. The following is one example process for forming the layer descriptor chain but many variations are possible.

Process 900 may include "for layer, allocate memory for an input buffer" 904, and this may include forming an input buffer on a memory that can hold all of the parameters as well as all of the layer data for a layer (or more than one layer). The layer data (inputs, weights, scale factors) in contrast to the parameter data (as that on the layer descriptor array 800 above) may or may not be considered as part of the layer descriptor. The operation may be performed here layer by layer, and the layer descriptor chain may be stored in the input buffer and appended to as the NN developer defines the layers as explained below.

Process 900 may include "layer compatible with affine, diagonal affine, recurrent, or convolutional primitive layers?" 906. Thus, the developer may match the initial (or artificial or design) layers to the main primitive layer types. When a single initial or artificial layer of the neural network matches a primitive layer type, process 900 may include "quantize and append layer into descriptor chain" 908 which may be considered its own sub-process and may lead to an explanation for determining activation function segmentation parameters. This is described in detail below.

When the initial or artificial layer is a complex macro layer that cannot be characterized as one of the primitive layer types, process 900 may include is "layer copy or transpose?" 910 which are also layer types described above.

```
Void COPY_NonInt_Array( )
{
    // input in the form of In[GrpNum,InNum] assume the has NInputElements in a row
    // output in the form of Out[GrpNum,OutSize] assume that the output array has
    // NOutputElements in a row
    // The first NCopyElements of each group are copied from the Input to the output
array to the respective group at the output
    // Number of elements copied must divide by 8. Elements are copied in a
    // streaming manner.
        for (IntGrpCtr=0; IntGrpCtr< LD.Grouping; IntGrpCtr++)
            for (i=0; i< NCopyElements ; i++)
            LD.OutArrayActPtr[IntGrpCtr,i] = LD.InArrayPtr[IntGrpCtr,i];
}
```

If so, process 900 may include "append layer to end of layer descriptor chain" 912. When an initial layer is a copy layer to concatenate input vectors into a single layer for example, or an interleave or de-interleave layer to place an array in a correct arrangement for row by row processing, these layers are added to the end of the descriptor chain being built for the NN.

Process 900 may include "expand macro layer into sub-chain of primitive layers" 914. When it is determined a layer is not a primitive layer type (such that the layer does not have the characteristics of a single primitive layer, one example of such a complex layer is a long short-term memory (LSTM) layer), this type of layer may be referred to as a macro layer of the artificial (or developer) neural network, and the macro layer may be constructed by a set of the primitive layer types instead. A macro layer may be referred to herein as an artificial, design, complex, or incompatible layer as well. Thus, process 900 may include "sub-chain primitive layer compatible with aff., diag. aff., recurrent, or convolutional primitive layer types?" 916, to perform the same check on parts of a layer as performed on whole layers in operation 906. If the sub-chain layer can be described as one of these primitive layers, then the process continues with quantizing and appending the layer to the layer descriptor chain at operation 930, described below.

If not, process 900 may include a check "sub-chain primitive layer is a copy or transpose layer?" 918. As with operation 912 above, when a copy layer, interleave layer, and de-interleave layer is needed at locations in the chain to form a transition between layers as described above, the NN developer should then "append layer to end of layer descriptor chain" 920.

Process 900 may include "more sub-chain primitive layers of non-compliant layer?" 922. If so, process 900 may include "obtain next sub-chain primitive layer of macro layer" 924, and loops to analyze the next potential sub-chain layer with operations 916 to 922 as just mentioned. If not, the NN developer may check for more NN layers 926. If more layer exist, process 900 may include "obtain next layer of neural network" 928, and the process loops to operation 904 to analyze the next layer. If the last layer was analyzed, the process is ended, and the layer descriptor chain can be uploaded to the NNA for running the NN.

As mentioned, the process 900 has a number of sub-routines or sub-processes. One of the branches of process 900 is a sub-process 908 to quantize and append a layer into the layer descriptor chain (operations 930 to 952). This process may include two other sub-routines: weight quantization 932 (operations 954 to 978) and bias quantization 934 (operations 980 and 982). The quantization and appending sub-process 908 also includes determining activation function segmentation data to be used for a layer as well as other settings for the layer descriptor chain. The weight-process 932 also may include determining scale factors for the weights as well as other features. The details of these sub-processes or sub-routines are provided below.

Starting with sub-process 908, process 900 may include "for affine layers append interleave layer if necessary" 930. Thus, an interleave layer may be added before an affine layer so that layer data is placed in interleaved form so that the layers extend in columns when processing is performed row by row resulting in the layer data being analyzed across multiple groups, in order to reduce memory transactions as described above.

As an aside, it will be understood that appending layers to the layer descriptor chain also includes the calculation of hardware related values which may be placed in the layer descriptors as described above, and that may relate to buffer streaming. This may include, for example, the number of input sets that are to be performed (when an input vector or group has more elements than the number of parallel logic blocks for example), or the locations of the external and internal temporary buffers to provide the pointers on the layer descriptors. Many other examples exist as listed on the layer descriptor 800 above.

Next, process 900 may include "quantize weight matrix from floating point to integer (given input dynamic range)" 932. This sub-process is described below.

Process 900 may include "quantize bias vector from floating point to integer (given input and weight dynamic range)" 934. This sub process also is described below.

Sub-process 908 also may include establishment of activation function segmentation data. Thus, process 900 may include check "activation function required?" 936. If so, process 900 may include "find best piecewise linear segment boundaries given input dynamic range and desired output dynamic range" 938. Specifically, the activation function may be a piece wise linear function that, by one example, is operating on the 32-bit signed sum and returns a 16-bit signed result. In the NN domain, various functions are being used depending on the behaviors that the network developer believes will provide the best result and thus use it as part of the network training as mentioned herein such as sigmoid, tan h, reLU, and so forth. The hardware accelerator implements the PwL as an integer (fix point) function that may approximate most of the known functions by allowing the use of up to 128 segments each with a linear behavior. Example conversion of a number of complex activation functions into a linear segments is provided by Gad et al., *A New Algorithm for Learning in Piecewise-linear Neural Networks*, Neural Networks 13, pp. 485-505, Elsevier Science Ltd. (March 2000); and Imamoto et al., *Optimal Piecewise Linear Approximation of Convex Functions*", Proceedings of the World Congress on Engineering and Computer Science (WCECS), San Francisco, Calif., International Association of Engineers (Oct. 22-24, 2008).

Referring to FIG. 17, a chart 1700 shows a PwL function 1702 with established segments. Once the segments are established, the developer may set the number of segments for the PwL to be used for a function (NActivationFSegments) in the layer descriptor and an activation function section definition array may be set in the memory that lists a base sum value (potential input value that is a sum from the MAC), the corresponding output value for the base point and the slope of the segment, and for each segment.

Specifically, each segment may be considered a section on the input which is closed on its left side and open on its right side. Each segment (i) is defined using three parameters:

$B_i$—A base (left most point) on its input (x-axis) wherein the input is a range of values of the final sum output from the MAC, $b_i$—A base (left most point) on the output (y-axis) which corresponds to the base on the x-axis, s—The segments slope, scale—scale factor of 8 ($2^8$), 16 ($2^{16}$), 24 ($2^{24}$) or 32 ($2^{32}$). Segments are placed as an array with each entry having these three parameters. The array is sorted in an increasing order of $B_i$ to ease the search in it. The calculation of y=f(x) is performed using the following algorithm:

<a> Find the largest $I$ for which $Bi<=x$, where $I$ is input,     (7)

<b> Calculate $Y=((X-B_i)*s_i)>>$scale$+b_i$     (8)

where <a> refers to a search to determine which segment an input belongs, and is described in detail below. <b> is the linear equation used once the segment of an input is found and to calculate a corresponding output from the PwL function.

Accordingly, once the segments are established, process 900 continues with "find slope and best slope scale factor for each segment" 940, where the scale factor may be determined by experimentation. Also, process 900 may include "find segment height for each segment" 942, which is the $B_i$, which also determines the $b_i$ value for that point. The process 900 then may store these parameters and include "store in activation segment description list" 944. This list initially may be stored in external memory and then placed in the activation function buffer on internal NNA memory during NN operations of the relevant layer.

With this arrangement, and while typical activation functions are usually monotonic and continuous, the present system and method allows use of non-monotonic or non-continuous functions. The details for performing the search and computing the output are described with the operation of the data path in processes 1020 and 1080 below (FIGS. 10A-10C).

These activation function parameter operations are skipped when no activation function exists for a layer.

Continuing with process 900, for CNN layers, the process 900 then continues with "if pooling is required, specify pooling parameters" 946.

For the active list feature, process 900 may include "for affine layers, specify active output list if required" 948, and this may be determined using the processes mentioned above. Thereafter, process 900 may include "append primitive layer to end of chain" 950, and the layer descriptor is added to the input buffer created for storing the layer descriptor chain.

Process 900 also may include "for affine layers, append de-interleave layer if next layer is not affine" 952. Thus, a de-interleave layer is added after the affine layer so that each row of an input array for example is the input vectors of a single layer. This is needed, by one example, for recurrent layers that should have the previous layers analyzed before starting the analysis of the recurrent layer since it looks back to the earlier layers.

Turning now to the weight quantization sub-process 932, process 900 may include "8-bit or 16-bit weights specified?" 954. When the layer is using 8-bit weights, process 900 may include operations to determine the scale factor (row multiplier) to be inputted to the parallel logic blocks of the MAC for example. Thus, process 900 may include "find maximum absolute weight value in floating point weight array" 956 which is max_weight, and then "set weight_scale_factor to desired_max divided by max_weight" 958. The desired max may be determined by experimentation by running commonly used applications and measuring the dynamic range of the inputs. Then scale factors can be set to manage the dynamic range. This can be performed during runtime if desired. Otherwise, the scale factor is determined by design to obtain a target dynamic range.

Then process 900 may include "multiply weight_scale_factor by 255 (maximum unsigned 8-bit number) to increase dynamic range of entire matrix" 960. This applies an initial scaling to the entire weight matrix (for all outputs of a layer). Now, "for each weight matrix row:" 962, process 900 may include "find maximum scaled weight for the row" 964, and "find a row multiplier such that dividing by multiplier brings column back within 8-bit dynamic range" 966. By one form:

$$\text{multiplier} = \text{max\_scaled\_weight}/255 \qquad (9)$$

Then, process 900 may include "store the row multiplier" 968. The row multiplier is the scale factor to be applied to the 8-bit weight at the parallel logic blocks of the MAC, and therefore, may be different for each output within the same layer.

Next, process 900 may include "quantize and store the scaled row of weights, multiplying each weight by the (weight_scale_factor/row_multiplier), rounding, and converting to integer" 970. Thus, the integer weight values in the form of vectors from an integer weight matrix are then the values provided to the MAC.

For 16-bit weights, operations 972 to 976 are the same as operations 956 to 960 for the 8-bit weights to increase the dynamic range of the entire matrix. Thereafter, process 900 may include "for each weight matrix entry: quantize and store the scaled weights, multiplying each weight by the weight_scale_factor, rounding and converting to integer" 978, to form a weight matrix of integer values that can then be inputted to the parallel logic blocks of the MAC a vector at a time.

The process then loops back to operation 926 to obtain the next layer of the network or end.

Turning to the bias quantization sub-process 934, process 900 may include "define the output_scale_factor as the input_scale_factor multiplied by the weight_scale_factor (determined during weight quantization)" 980. Then "for each bias element of layer, quantize and store the scaled bias term, multiplying the bias term by the output_scale_factor, rounding, and converting to integer" 982. This becomes the bias value that is added to the weighted input sum before the sum is provided to the activation function or as a final output.

Figure 10:
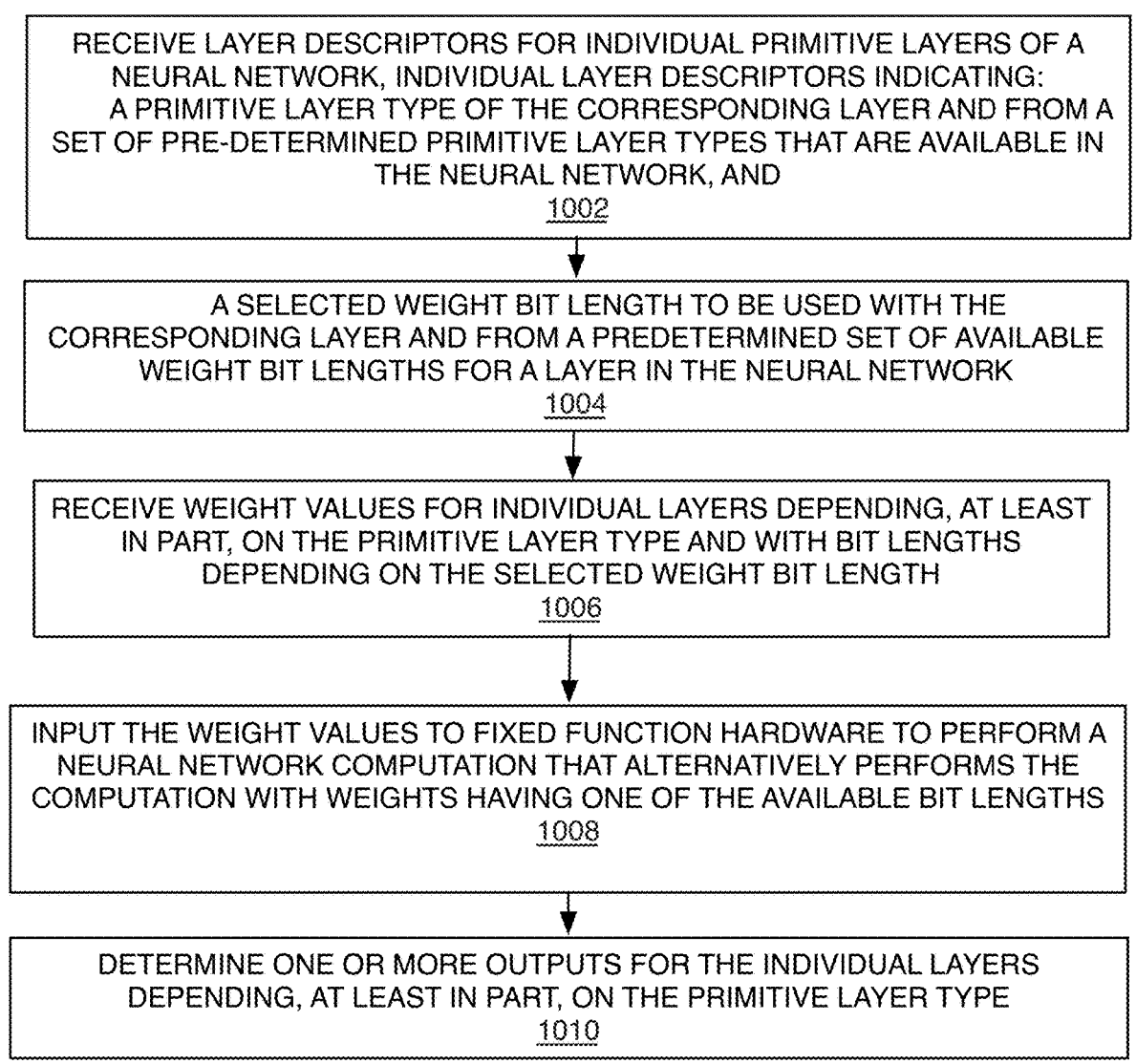
FIG. 10 is another flow chart of an example method of neural network propagation according to the implementations herein.
Figure 10A:
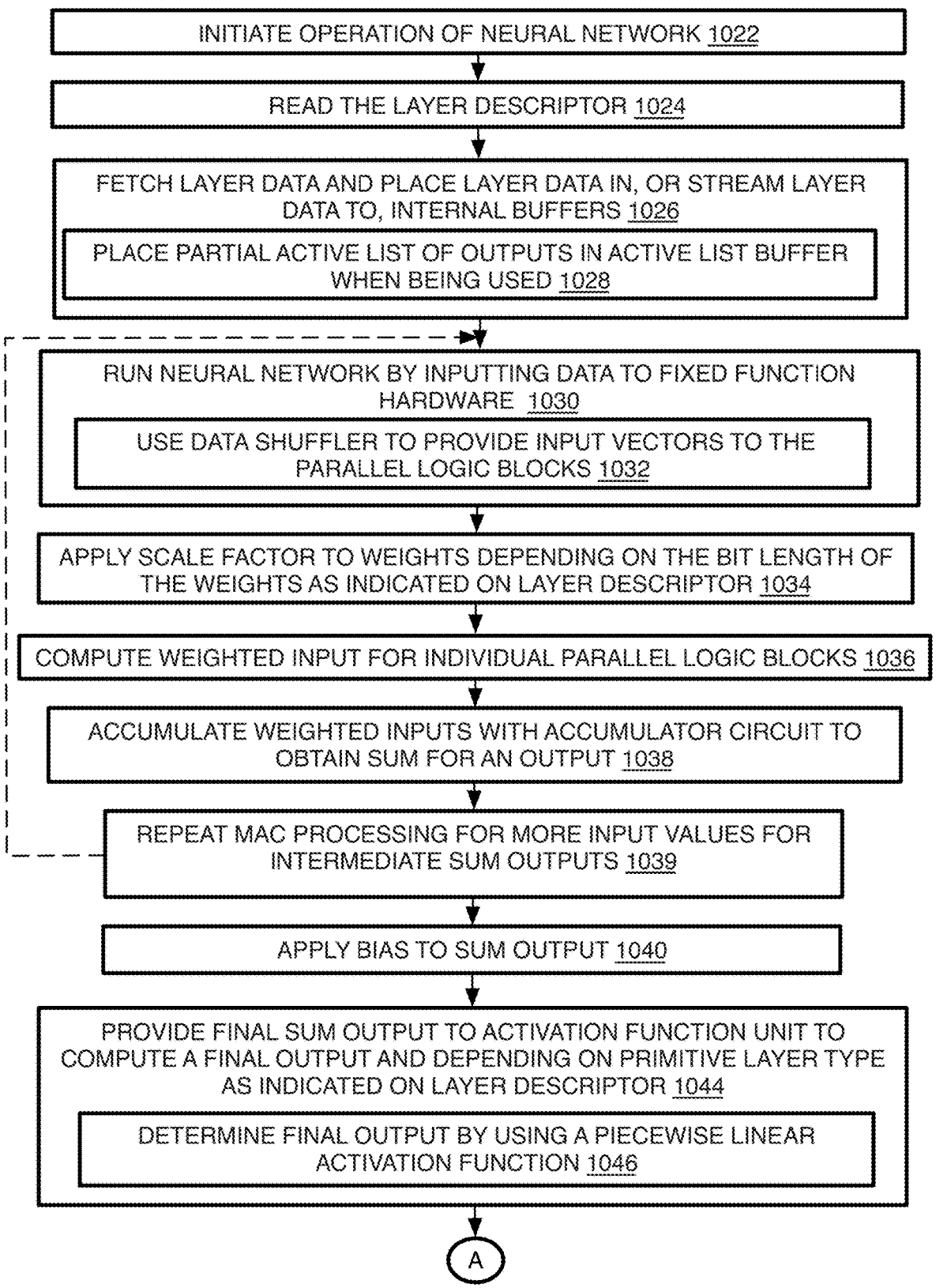

Referring to FIG. 10, a process 1000 is provided for a method of neural network propagation. In the illustrated implementation, process 1000 may include one or more operations, functions or actions 1002 to 1010 numbered evenly. By way of non-limiting example, process 1000 may be described herein with reference to example neural network processing system, data paths, or circuits 100 to 500 (FIGS. 1-5) or system 1300 of FIG. 13, and where relevant.

The process 1000 may include "receive layer descriptors for individual primitive layers of a neural network, individual layer descriptors indicating: a primitive layer type of the primitive layer and from a set of pre-determined primitive layer types that are available in the neural network" 1002. As explained above, the layer descriptors may be received in a register on the NNA where it can be read by the sequencer, and the layer descriptor will indicate which type of primitive layer it is associated with (whether affine, CNN, and so forth) as already described above.

The layer descriptor also may include "a selected weight bit length to be used with the primitive layer and from a predetermined set of available weight bit lengths for a layer in the neural network" 1004. As described above, the layer descriptor also indicates the weight bit-size to be used for the layer. By one example, the choices are between 8 and 16 bit weights although other or more weight sizes can be used, and in order to reduce delay with the shorter weights or increase accuracy with the longer weights.

The process 1000 may include "receive weight values for individual layers depending, at least in part, on the primitive layer type and with bit lengths depending on the selected weight bit length" 1006. Thus, the layers provide different types or arrangements of weights in the form of a weight matrix for example and depending on the layer type such as recurrent or convolutional.

The process 1000 may include "input the weight values to fixed function hardware to perform a neural network computation that alternatively performs the computations with weights having one of the available bit lengths" 1008. As mentioned, by one example, this may include parallel logic blocks that feed into an accumulator circuit to form the MAC. Also as described herein, the logic components of the parallel logic blocks may be arranged to scale the smaller weight but omit the scaling of the larger weight. Thus, the operation of the logic blocks can be said to be affected by the selection of the weight size on the layer descriptor.

The process 1000 may include "determine one or more outputs for the individual primitive layers depending, at least in part, on the primitive layer type" 1010. Thus, a primitive layer with an activation function uses a PwL function to approximate the supported activation function as described above, and provides a function formed of a number of segments, up to 128 segments. The sum output from the MAC is now the input provided to the activation function unit to determine which segment of the PwL function the input falls upon. Once determined, a leaner equation is used to compute the final output. Many other details of the process are provided below.

Referring to FIGS. 10A-10B, a process 1020 of neural network propagation. In the illustrated implementation, process 1020 may include one or more operations, functions or actions 1022 to 1050 numbered evenly. By way of non-limiting example, process 1020 may be described herein with reference to example neural network processing system, data paths, or circuits 100 to 500 (FIGS. 1-5) where many of the details of the operations mentioned here are already explained above, or with system 1300 of FIG. 13, and where relevant.

As a preliminary matter, it will be understood that the MAC used here may be the same or similar to that already described, and therefore may alternatively be used for GMM operations, whether used for individual layers within an NN or separately as a GMM. The following, however, is a description of NN operation.

The process 1020 may include "initiate operation of neural network" 1022, and this may include having a processor request that the first layer descriptor from memory external to the NNA be placed in registers on the NNA. Thereafter, the process 1020 may include "read the layer descriptor" 1024, and by a sequencer discussed above. As mentioned, the sequencer reads the instructions and parameters on the layer descriptor to operate the layer, and the layer descriptor sets the state of the layer and neural network. By one form, once layer processing is complete on one layer, the system fetches the next layer descriptor if the number of processed layers didn't reach the maximum layer count pre-set to the NNA as a saved layer descriptor list or index for example. By another alternative, the layer descriptor also may have an indicator to inform the sequencer to obtain the next layer descriptor from external memory once the current layer descriptor is finished. The sequencer also reads the pointers to the other layer data in the NN buffers of external memory. An address generator unit may be used to determine addresses from the pointers and the sequencer provides the DMA with an instruction to fetch the layer data from the external memory and to place the layer data in internal buffers on the NNA and accessible to the NN data path. Also, it will be understood that the sequencer may be continuously reading, or reading at intervals, the layer descriptor, control, and/or status registers to constantly monitor the state of the layer being processed to timely request the movement of data among the memories and buffers.

Accordingly, the process 1020 may include "fetch layer data and place layer data in, or stream layer data to, internal buffers" 1026, and by the DMA as instructed by the sequencer. Also as mentioned above then, the sequencer and DMA may have the ability to monitor the fullness of the internal buffers, and fetch layer data to place into the internal buffers as space becomes available. Also as mentioned particularly with the internal input buffer, that chunks or portions of an input array may be placed in the internal buffer when the entire input array will not fit in the internal buffer. As described above, the input array may include up to eight groups of input vector(s) where each group may be data for a different output of a layer. Thus, the input array may be held in the internal buffer for the processing of a number of layers. When streaming is considered, the input array may simply be constantly re-filled with new layer data and may never be completely empty until the NN processing is finished. This operation also may include placing or streaming a weight matrix to the weight buffer, and the scale factor and bias value to the constant/bias buffer.

The fetching of layer data also may include "place partial active list of outputs in active list buffer when being used" 1028. When a layer is indicated for non-sequential mode, then a partial active list may be used. This refers to an active list that may provide a non-sequential ordering of the inputs of the layer. More specifically, an active list at an active list buffer may hold a list of outputs to compute that is less than all of the outputs in a layer in order to reduce computational, processor, and power loads as already explained above. The active list holds a list of outputs where each output is computed by using a row of inputs in the input array corresponding to the listed outputs. The rows of inputs that correspond to outputs not on the active list are skipped, and are not processed by the MAC. The NN may be executed from the set of inputs as pointed to by the NN Active list. This array may not be used during sequential mode.

The pointer ability of the active list also may assist with reducing memory transactions. Multiple scatter/gather instructions are typically required to un-pack the memory and set it for the compute phase. For example, when the active list indicates the scattered location of data that may need to be processed is sparse, data may be badly scattered. The active list by itself may operate as a pointer/index to scattered locations in memory that may need to be processed. The determination that all outputs of a layer are not needed, and the selection of exactly which outputs of a layer are needed and which are not, may depend on the application that is being used. For automatic speech recognition, it is possible to determine which sounds are at least somewhat close to a desired recognized word output and which are not ahead of time. Such techniques that may be used to determine which outputs are to be computed and which are not is disclosed by Ma and Deisher, *Novel CI-Backoff Scheme for Real-time Embedded Speech Recognition*, Acoustics Speech and Signal Processing (ICASSP), 2010 IEEE International Conference (Mar. 14, 2010).

The process 1020 then may include "run neural network by inputting data to fixed function hardware" 1030. As described above, the fixed function hardware may include parallel logic blocks, and by one example 48 of the blocks. Thus, each or individual parallel logic block of the MAC receives a scale factor (depending on the bit size of the weight value), a weight value, and an input value. The scale factor is the same for all of the logic blocks for the same input vector received at the MAC. Specifically, each or individual ones of the logic blocks provide the alternative to use weights of different bit-lengths, in this example 8 or 16 bits, where 8-bits weights provide more efficiency (lower computational load) but the 16-bit weights provide more accuracy. This provides the NN developer with more flexibility for obtaining desired outcomes.

Also, the logic blocks individually may receive the weight value from a weight vector of the weight matrix at the weight buffer, and receive the input value from the same input vector from the input array. This operation may include "use data shuffler to provide input vectors to the parallel logic blocks" 1032. The data shuffler selects the correct input vector from the input array from the input buffer in the internal buffers, and places the input values of the vector at each parallel logic block. This may be used when the input array is in the interleaved form as described above with input array 1602 (FIG. 16-A) so that the shuffler retrieves input vectors across a row of the array across layers rather than finishing one layer before starting with the next layer. The data shuffler also may be tasked with retrieving only those inputs to be used for an output on the active list when provided and as already mentioned above.

The process 1020 may include "apply scale factor to weights depending on the bit length of the weights as indicated on layer descriptor" 1034, and again as explained above, by applying a scale factor at the parallel logic blocks to the smaller weight, here the 8-bit weights when used, in order to compensate for the loss of dynamic range at least during computation of the affine transform (e.g., the computation of the weighted input sum or sum output of the MAC).

The process 1020 may include "compute weighted input for individual parallel logic block" 1036, and as described above in detail for MAC 400. Then, the process 1020 may include "accumulate weighted inputs with accumulator circuit to obtain sum for an output" 1038, and as explained above, by a tree structure of adders to obtain a single sum (or dot-product) of weighted inputs for a single output referred to as a sum output herein. When the input vector has a number of input values that is the same or less than the number of parallel logic blocks, the sum output is a final sum output. However, when more input values are in an input vector than the number of logic blocks available, the sum outputs are then intermediate or temporary sum outputs that are placed in the sum buffer at the internal buffers. In this case, process 1020 may include "repeat MAC processing for more input values until for intermediate sum outputs" 1039. The intermediate sum outputs are accumulated as they are collected in the sum buffer after each iteration until a final sum output is achieved, and may be provided to the activation function unit.

The process 1020 also may include "apply bias to sum output" 1040, and this may refer to applying the bias to only a final sum output, or applying the bias proportionally to the intermediate sum outputs as they are accumulated in the sum buffer. Otherwise, the full bias may be applied to the first input or other alternatives may be used as discussed herein.

The process 1020 then may include "provide final sum output to activation function to compute a final output and depending on primitive layer type as indicated on layer descriptor" 1044, and therefore, the CNN, affine, and recurrent layers may have an activation function such as sigmoid or tan h, and so forth that is approximated by a piecewise linear function. This provides tremendous flexibility so that many different activation functions can be approximated with the same hardware. Also, by having the iterations performed on the MAC side of the data path and waiting for a final sum output to be provided to the activation function unit, the activation function unit can be performing on one sum output simultaneously to the MAC computing data for another sum output, saving a significant amount of time such as 5-9 cycles per sum output. Thus, this operation may include "determine final output by using a piecewise linear activation function" 1046, which is shown in detail with process 1080. Such a determination may apply to a fully connected layer (and other layers).

Referring to FIGS. 10C and 17, a process 1080 of using a piecewise linear activation function, or more specifically, a process applying a PwL function to the sum output from the MAC may comprise, as mentioned above, performing operations, $$<a> \text{ Find the largest } I \text{ for which } B_i <= x, \quad (7)$$

$$<b> \text{ Calculate } Y = ((X-B_i)*s_i) >> \text{scale} + b_i \quad (8)$$

where I is the segment of segments i=0 to NActivationFSegments (as stored on the layer descriptor), x is the sum output value from the MAC (or input to the activation function), $B_i$ is the base (left most) input value of the segment, bi is the base output value, Y is the final output, X is also the sum output as located on a segment (but the same value), $s_i$ is the slope and scale is the scale factor as described above. The right bit shift >> divides the segment part by two.

Process 1080 may include "perform binary search to place sum output on segment. Thus, equation <a> is a binary-type search of the input on the PwL function as shown on PwL function 1700 (FIG. 17). It is performed in a very fast and efficient manner by finding the base point of the middle segment point of whatever segments are still available, and eliminating the half of the remaining segments that are on the opposite of the a threshold base relative to the input. During the calculations, the math applied is signed integer math. The scaling factor is applied to allow better adjustment to output range. Saturation is applied on the multiplication and the addition operations to avoid overflow of the result beyond the range of the output value.

Process 1080 may include "obtain segment array of layer" 1084, and as mentioned above, the segments are predetermined for a layer with an activation function, and the segment data including the base input, base output, slope, and scale factor are placed in the activation function buffer when the layer is being processed.

Process 1080 then may include "set output of left most base as final output when input is out of range" 1086. Thus, if x<$B_0$, the return value is Y=bo. When a slope is required to extend from the left most x value, $B_0$=Min-Int (saturation value) should be used.

Process 1080 may include "determine base input of middle segment within a range of available segments" 1088. Initially, the end segments, segment 0 on the left and the farthest right segment with the highest numbering are set as the lowest and highest possible segments. The middle segment i=no of segments/2.

Process 1080 then may include "compare base input to sum output (actual input)" 1090, and "if base input is greater than sum output, set highest possible segment at middle segment, and determine new middle segment of new range" 1092. Thus, when the base input is greater than the sum output, the right half (larger segment numbers) are all eliminated (hence binary), and the middle segment of the lower half is not determined. The base value of the new middle segment is then used for the comparison on the next iteration.

Process 1080 may include "if base input is less than sum output, set lowest possible segment at middle segment, and determine new middle segment of new range" 1094. Here this is the same as the last operation except opposite because the sum output is in the greater half, so the half of the segments with the lower numbers are now eliminated.

Process 1080 may include a check if "high segment>low segment+1" 1096. Thus, the process repeats and returns to operation 1088 until the highest possible segment is equal to our lower than the low segment plus one. The remaining segment is the final or selected segment that includes the input value of the actual input.

To perform the process 1080, the function may be performed by using the following example binary-type search operation provided in example pseudo code.

```
short DoActFunct(int SumOutput)
{
    int i = LD.NActivationFSegments / 2;
    int LastHigh = LD.ActivationF_NoOfElements;
    int LastLow = 0;
    if (ActFunct[0].SegmentValue < SumOutput)
        return (short) ActFunct[0].SegmentBase;
    while (LastHigh > LastLow+1)
    {
        if (ActFunct[i].SegmentValue > SumOutput)
        // handling of each section as closed on the low bound
        // and open at high bound
        {
            LastHigh = i;
            i = (i + LastLow)/2
        }
        else {
            LastLow = i;
            i = (LastHigh + i)/2;
        }
    }
    return (short)(((SumOutput - ActFunct[i].SegmentValue)*
            ActFunct[i].SegmentSlope) )>> ActFunc[i].Shift
            + ActFunct[i].SegmentBase
    // a 33-bit is required for SegmentValue subtract.
    // Multiply operations is 33 × 16 signed with a 48 bit result
    // The 48-bit are scaled according to shift amount with a
    // 16-bit output and the result is saturated.
    // Shift amount may be 8, 16, 32 or 48.
    // Saturation is required in multiply result and second
    // add operation
    // Math use saturation to avoid roll over of output value.
    // i.g., use 0x7fff or 0x8000 according to rollover direction)
}
```

Once the segment of the input is located, process 1080 may include compute final output using selected segment and linear equation" 1098, and by plugging in the final segment data and the input into equation (8) above to compute the final output.

Returning to the process 1020, the process 1020 may include "store the final output in the output buffer" 1048. As mentioned above, the final outputs may be held in the output buffer while the input buffer is being managed, and when the outputs in the output buffer are to be used as inputs for the next layer, the process 1020 may include "send final outputs to the input buffer once capacity exists" 1050. This may continue until the last (output) layer of the NN was processed 1052.

The process repeats until all iterations for a single are performed to determine a final sum output to provide to the activation function unit to determine a final output. Otherwise, the process then repeats until all layers of the layer descriptor chain have been analyzed, and all layers have their desired output values computed. The outputs may represent different things depending on the application and where along the applications process the NN processing is used as already explained above for ASR (FIG. 1).

Figure 11:
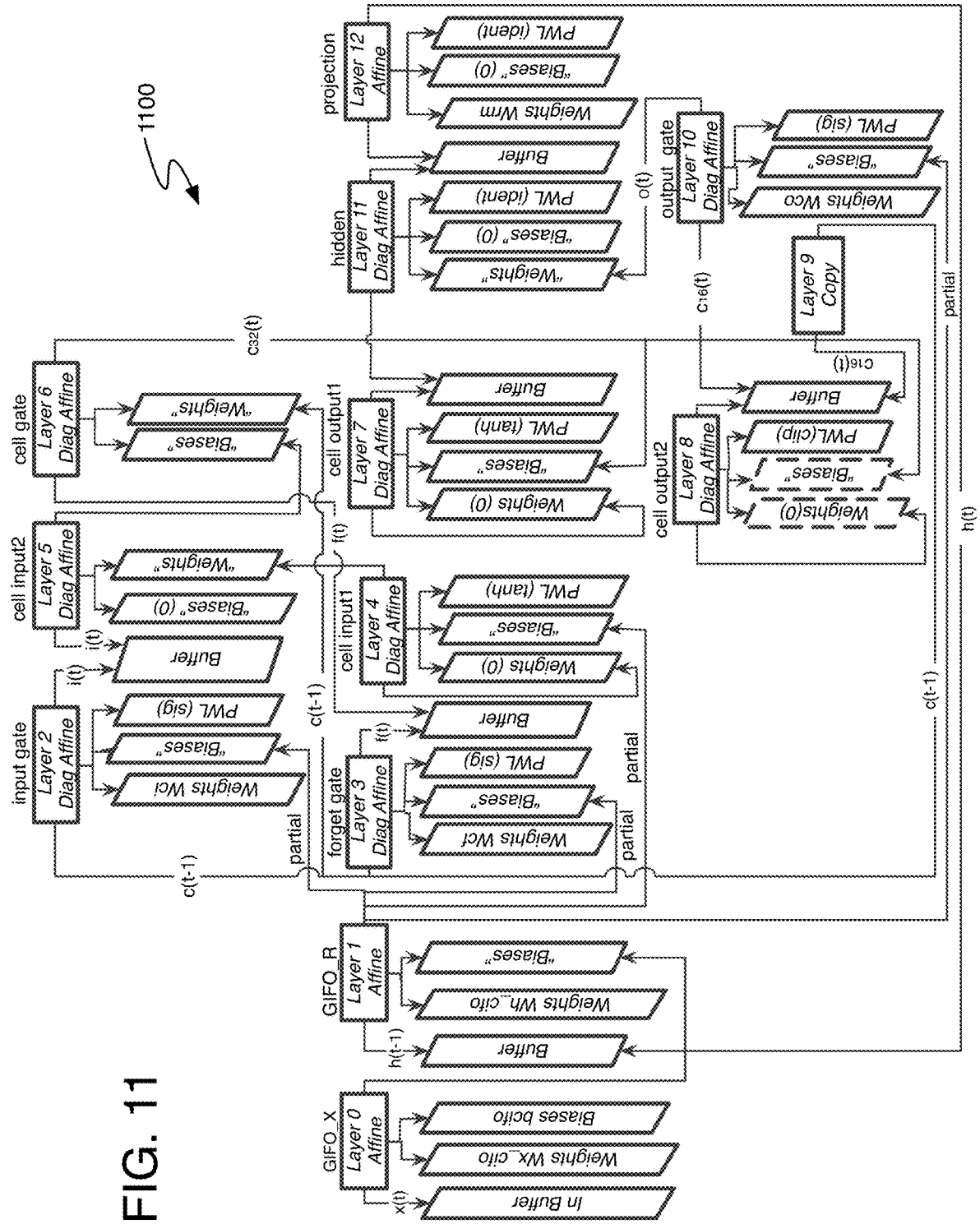
FIG. 11 is a diagram of an example layer descriptor chain used by the implementations disclosed herein.

Referring now to FIG. 11, one possible example layer descriptor chain 1100 is shown and is a sub-chain of primitive layers numbered 0 to 12 used to expand (or break up) a single initial long short-term memory (LSTM) layer. LSTM is a form of recurrent layer and has many different variations. The variation here is associated with Graves et al., *Speech Recognition with Deep Recurrent Neural Networks*, Dept. of Computer Science, Univ. of Toronto (Mar. 22, 2013) and Povey et al., *The Kaldi Speech recognition Toolkit*, ResearchGate (Sep. 24, 2015). While not necessarily placed in the layer descriptor array by an NN developer, the LSTM functions of the layers are shown for clarity. For example, Layer 0 is a GIFO_x input layer saving inputs x(t) to an input buffer for the LSTM NN where GIFO refers to Kaldi feature notations (G=squashing neuron near input, I=input gate, F=forget gate, and 0=output gate). Layer 1 is a GIFO_r layer which refers to a layer of recurrent projection neurons that look back to previous or old layer outputs h(t−1) where h refers to an old or previous output of an earlier layer (a node or neuron output). Layer 2 is an input gate layer, layer 3 is a forget gate layer, layers 4 and 5 are cell input layers 1 and 2 respectively, layer 6 is a cell gate, layers 7 and 8 are cell output layers 1 and 2 respectively, layer 00 is an output gate, layer 11 is a hidden layer, and layer 12 is a projection layer that loops back to layer 1. The other notations used include c( ) for cell state, x( ) for input as mentioned, o( ) for output gate, f( ) for forget gate, (t) refers to a current or new value, (t−1) refers to the old or previous value, and subscript 16 or 32 refers to bit size.

Each representation of the layer indicates features of the layer that may be listed on that layer's descriptor. The layer descriptor chain shows the primitive layer type where layers 0, 1, and 12 are affine layers, layers 2-8 and 10-11 are diagonal affine layers, and layer 9 is a copy layer that copies data from layers 6 and 8. The layer descriptors also may indicate that activation function, weights, biases, and buffers are used and/or the type of use for a layer may depend on the NN (or here LSTM NN) function of the layer. Thus, layers 0-1 and 5-6 have no activation function, input, forget, and output gate layers 2-3 and 10 use piecewise linear (PWL)-based sigmoid activation function, while cell input layers 4 and 7 use piecewise linear-based tan h activation function. Cell output layer 8 uses a piecewise linear clip function which indicates large values are saturated, while piecewise linear-based identity (ident) function of layers 11 and 12 is an identity transform used to perform scaling both from output to output since the scale factor can be different from output to output, but also provided in the integer domain to scale all of the outputs of a layer to be compatible with the next layer where outputs of one layer become the inputs of the next layer. This is particularly true when feeding a layer without an activation function (that may have 32 bit outputs) directly to another layer that may be expecting 16 bit inputs for example.

As shown on layer descriptor chain 1100, the parameters of the biases and weights for each layer with weights and biases also may be indicated in the layer descriptors such as the bit length for the weights as described above. Further, the layers that have a partial active list as indicated by "partial" are shown for layers 2, 3, 4, and 10. The order of the layers also may be provided or indicated by the layer descriptors, either by a field in the layer descriptor array or simply by the order in a layer descriptor index. As mentioned, layer descriptor chain 1100 is merely one example and many varieties may be created by an NN developer.

Referring to Table 1 below, successful DNN, CNN, RNN, LSTM proof of concept experiments were performed and the results are shown. The experiments indicate that the present parallel logic of the NNA provided with flexible descriptor layers and partial active list capability can contribute to achieving results where no loss of classification accuracy existed compared to known full floating point large network implementations.

TABLE 1

| Task | Test Set | Model | Kaldi | NNA 2B int | NNA 1B int |
|---|---|---|---|---|---|
| | | | | Mean WER | |
| Resource Management | test-1460 | 3x375 | 1.95% | 1.95% | 1.93% |
| Resource Management | test-1460 | 2x1024+6x2048 | 1.86% | 1.87% | 1.83% |
| Resource Management | test-1460 | 2xLSTM+1x Affine | 2.23% | 2.18% | — |
| Switchboard | eval2000-4447 | 5x1536 | 14.90% | 14.90% | 15.00% |
| Wall Street Journal | dev93-503 | 7x2048 | 6.40% | 6.45% | 6.44% |
| Wall Street Journal | dev93-503 | 2x1920+7x2048 | 7.01% | 6.98% | 7.12% |
| Wall Street Journal | eval92-333 | 2x1920+7x2048 | 4.20% | 4.20% | 4.27% |
| Ted Talks | test-1155 | 7x2048 | 13.40% | | — |
| Ted Talks | test-1155 | 5x1024 | 13.80% | | — |
| Ted Talks | test-1155 | 2xLSTM+1x Affine | 16.40% | 16.50% | — |
| Short Message | test-849 | 5x1024 | 16.30% | 16.40% | 16.50% |
| Short Message | mensa-18dB-849 | 5x1024 | 22.50% | 22.50% | 22.40% |
| Short Message | mensa-15dB-849 | 5x1024 | 28.20% | 28.00% | 28.20% |
| Short Message | mensa-9dB-849 | 5x1024 | 50.40% | 50.40% | 50.40% |
| Short Message | i213tst (8663 words) | 2xCNN+4x512 | 23.54% | 23.50% | 23.23% |
| Command | i213tst (8663 words) | 4x192 | 22.15% | — | 21.82% |
| Command | itp40_hvphr_clean (5313 words) | 4x192 | 0.88% | — | 0.88% |
| Command | itp40_hvphr_pool 5dB (5213 words) | 4x192 | 4.31% | — | 4.54% | where two NNAs as described herein were compared to a conventional Kaldi neural network (as an open source ASR NN as described, for example, by Povey et al., The Kaldi Speech Recognition Toolkit, ResearchGate (2011)). The two NNA networks were 1B int (one byte integer weights) and 2B int (two byte integer weights) based. The results are provided as a percentage of word error rate (WER) for comparison.

Figure 12:
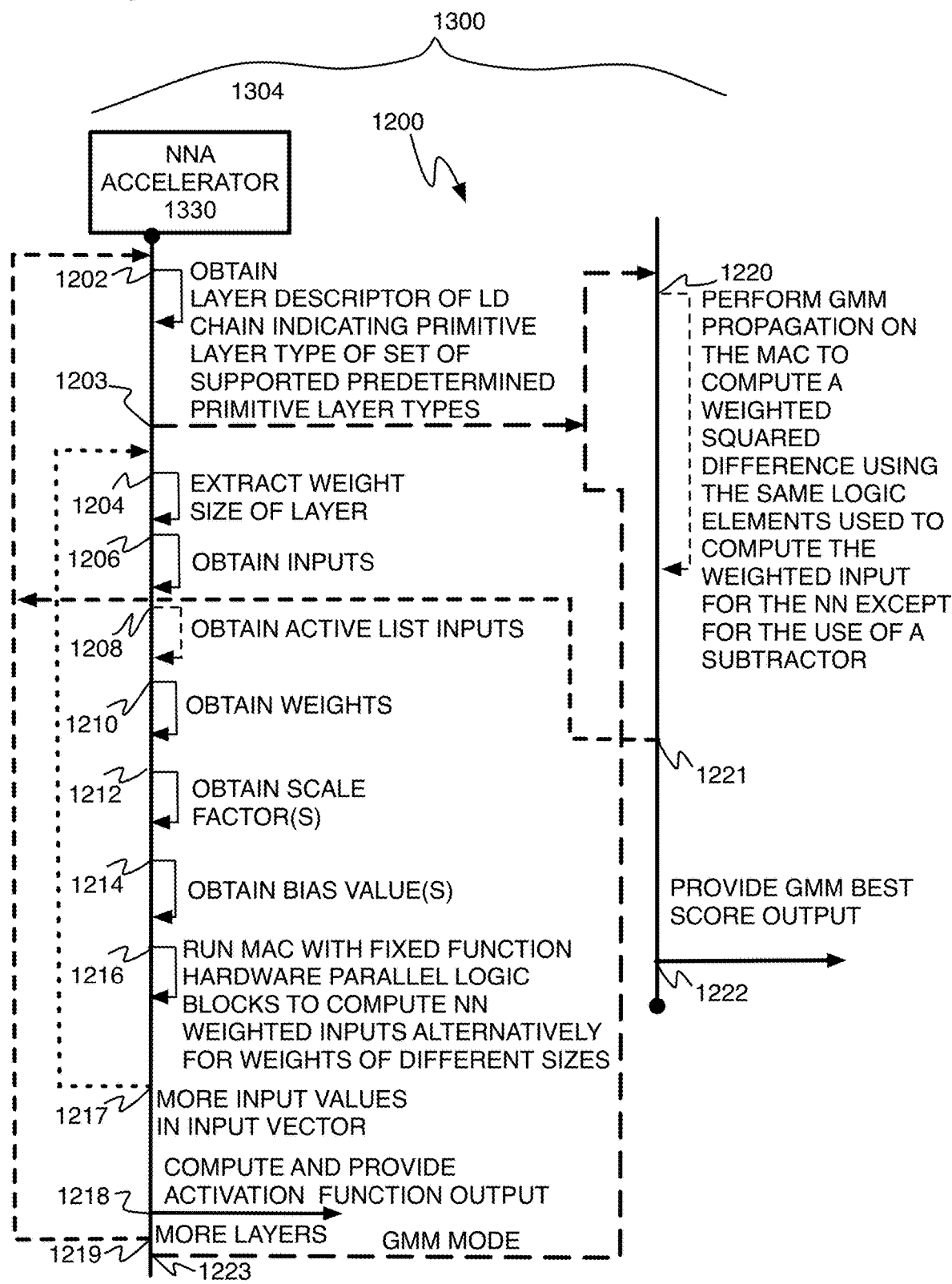
FIG. 12 is a diagram of the neural network processing method in operation of an example system described herein.

Referring to FIG. 12, a method 1200 of neural network propagation illustrates one example operation of a speech recognition system 1300 that performs neural network propagation using the MAC circuit with fixed function hardware parallel logic blocks, PwL activation function in the same pipeline, and by using flexible layer descriptors in accordance with at least some implementations of the present disclosure. In more detail, in the illustrated form, process 1200 may include one or more operations, functions, or actions as illustrated by one or more of actions 1202 to 1223 generally numbered evenly. By way of non-limiting example, process 1200 will be described herein with reference to FIG. 13. Specifically, system or device 1300 includes an NNA accelerator 1330 with an NNA (GMM) data path or circuit 1332 that may include both the MAC and activation function unit, sequencer and buffer control 1334, internal buffers 1337, and layer descriptor registers 1338. Many of the details for the operations of these components are already explained above with other implementations and may apply the same or similarly here depending on the context.

Process 1200 may include "obtain layer descriptor of LD chain indicating primitive layer type of set of supported predetermined primitive layer types" 1202. As explained above, the layer descriptor for each or individual layers may have a field such as NNop by one example name to indicate which primitive layer type is being used for the layer including at least an affine layer where at least most, or substantially all, of the elements in the weight matrix are non-zero, convolutional, and recurrent. By another form, an AL (active-list) affine layer and diagonal affine layer are provided as well, and by other forms transpose and copy layers are provided too. This operation also includes receiving a layer descriptor in the order the alyer descriptors are placed in an external memory so that the layer descriptors can be brought to the NNA MMIO registers for example and a layer descriptor at a time.

It is possible that a single layer in the NN may be a GMM layer to be computed to find a best score. In this case, the operation 1203 turns immediately to the GMM operation 1220 when such a layer is in the NN, and then returns 1221 to obtain the next layer for the NN. The GMM operation 1220 is explained below for GMM operation that is separate from the NN operation.

Otherwise, when a layer descriptor is read by a sequencer for example, process 1200 may include "extract weight size of layer" 1204, which may be indicated in the layer descriptor arrays as well, and may indicate one or more available bit-sizes for the weights (weightelementsize NNflag for example). By one example, this includes 8-bits and 16-bits.

Process 1200 may include "obtain inputs" 1206, and as explained above the input values may be obtain from an input array placed in an input buffer wherein the input array may be for a single layer or may be a grouped matrix where each row (de-interleaved) or column (interleaved) is a group of input vectors for a single output of a layer up to eight groups by one example. Also, when the entire input array does fit into internal input buffer, chunks or portions of the array may be streamed to the internal buffer in iterations so that the internal buffer is filled as capacity becomes available. This is explained in detail above.

Optionally, process 1200 may include "obtain active list inputs" 1208, and as explained above, when a layer has a non-sequential mode, it can have less than all outputs of a layer computed in order to reduce computation load and time. In this case, just a list of outputs to compute are placed in an active list buffer. Each output indicates a row of inputs in the input matrix as explained above. The active list may have pointers to retrieve scattered inputs to increase the efficiency of the memory transactions even further.

Process 1200 may include "obtain weights" 1210, and as described above, to obtain a weight matrix from a weight buffer so that a vector of weights for a single output can be retrieved from the matrix and placed in the MAC for computations.

Process 1200 may include "obtain scale factor(s)" 1212, and also as mentioned above, from either internal memory or from a constant/bias array in a constant/bias buffer. The scale factor may be computed for single outputs or an entire layer as explained above.

Process 1200 may include "obtain bias value(s)" 1214, also explained above and may be retrieved from the constant/bias array at a constant/bias buffer to be added to a sum output of the MAC.

Process 1200 may include "run MAC with fixed function hardware parallel logic blocks to compute NN weighted inputs alternatively for weights of different sizes" 1216. Thus, the multiplication accumulation circuit (MAC), such as that described with NN circuit 400, receives the layer data including the inputs and weights for one output or node at a time. The logic blocks receive weights of alternative sizes, here either 8-bits or 16-bits as indicated by the layer descriptor array and as provided by the weight matrix for the layer. For the weights of a smaller size, the logic blocks also receive the scale factor to apply to the weights to compensate for lost dynamic range, thereby increasing the accuracy of the weights at least for the weighted input summation and output computation. The weights with a larger size are not scaled at the parallel logic blocks. The weights are then multiplied by the input value to provide a weighted input for each logic block. The accumulation section then sums the weighted inputs by using an adder tree. When the resulting sum output is an intermediate sum, such as when more input values are in an input vector than the number of parallel logic blocks, the intermediate sum is stored and the process loops 1217 back to operation 1204 to obtain another intermediate sum output on each run until all input values are processed by the MAC.

The final sum output of the MAC is then provided to an activation function so that process 1200 may include "compute and provide activation function output" 1218. As mentioned above, this may include a PwL activation function approximation of a variety of activation function layer types such as sigmoid, tan h, ReLU or other activation functions that provides for great flexibility, and may provide a fast algorithm to determine the final output as described above. The final output of the activation function then may be stored in the output buffer and used as an input to the next layer or for other further computations. Otherwise, when a layer does not have an activation function, the final sum output may be the final result of the NN data path and is passed on as an output for that layer. By one form, for ASR, the output provides a likelihood that a certain phoneme or word is the correct recognized sound or word thereby transforming an input audio signal into recognized language with understood meaning that can be responded to or that can initiate other automatic actions by a computer for example.

The process 1200 then may loop 1219 back to operation 1202 to obtain and read the next layer descriptor when more layers are present in the layer descriptor chain.

Otherwise, the MAC also optionally and alternatively may be used to perform GMM computations. Thus, process 1200 may include "perform GMM propagation on the MAC to compute a weighted squared difference using the same logic elements used to compute the weighted input for the NN except for the use of a subtractor for GMM propagation" 1220. As described above then, the individual logic blocks of the MAC may alternatively receive a mean value, an input value, and a variance (or weight) value. The mean and input are subtracted to determine a difference. Then, the same OR gates used to forward the scale factor and smaller weight for NN propagation may forward two copies of the difference values instead. The difference values are then multiplied by a multiplier by each other to obtain a GMM squared difference but alternatively may multiply the smaller weight by the scale factor to obtain the NN weighted input. The squared difference is then provided through another OR gate that alternatively provides the NN scaled weight or NN larger non-scaled weight. A multiplier than either multiplies the GMM squared difference by the variance or the NN weight by the NN input. Thus, each or individual logic blocks either provide a GMM weighted difference squared or an NN weighted input. Both are then accumulated to a single sum by the accumulator portion of the MAC.

Process 1200 may include "provide GMM best score" 1222, and as explained above may be provided by an activation function unit by one example that alternatively provides an NN activation function output or a GMM best score from a mix/max unit. Otherwise, the sum from the accumulator may be provided to an output buffer omitting both of these operations. The details are explained above.

For ASR applications, the output of the GMM may be an acoustic score that indicates the probability that a phoneme(s) or word should be identified by a decoder, or the likelihood a decoder should identify the word or phoneme(s) in a hypothesis word or word sequence to provide to an interpretation engine by some examples.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated. Additionally, although one particular set of blocks or actions is illustrated as being associated with particular modules, these blocks or actions may be associated with different modules than the particular modules illustrated here.

It will be appreciated that processes 600, 700, 900, 1000, 1020, 1080, and/or 1200 may be provided by sample systems or circuits 100 to 500, 1300, 1400, and/or 1500 to operate at least some implementations of the present disclosure. This may include operation of an NNA 1330 with an NNA (GMM) data path or circuit 1332, sequencer and buffer control 1334, DMA/MMU unit 1336, internal buffers 1337, and layer descriptor registers 1338 (FIG. 13) and similarly for the other systems or circuits described herein.

In addition, any one or more of the operations of FIGS. 6-7B, 9A-10C, and 12 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se in at least one form. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry unless described otherwise above. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. Where not specified herein, such as with the NN circuit and hardware logic blocks described above, operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" when referring to computer components may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality. The term component as used as part of a neural network layer is defined as mentioned above.

Figure 13:
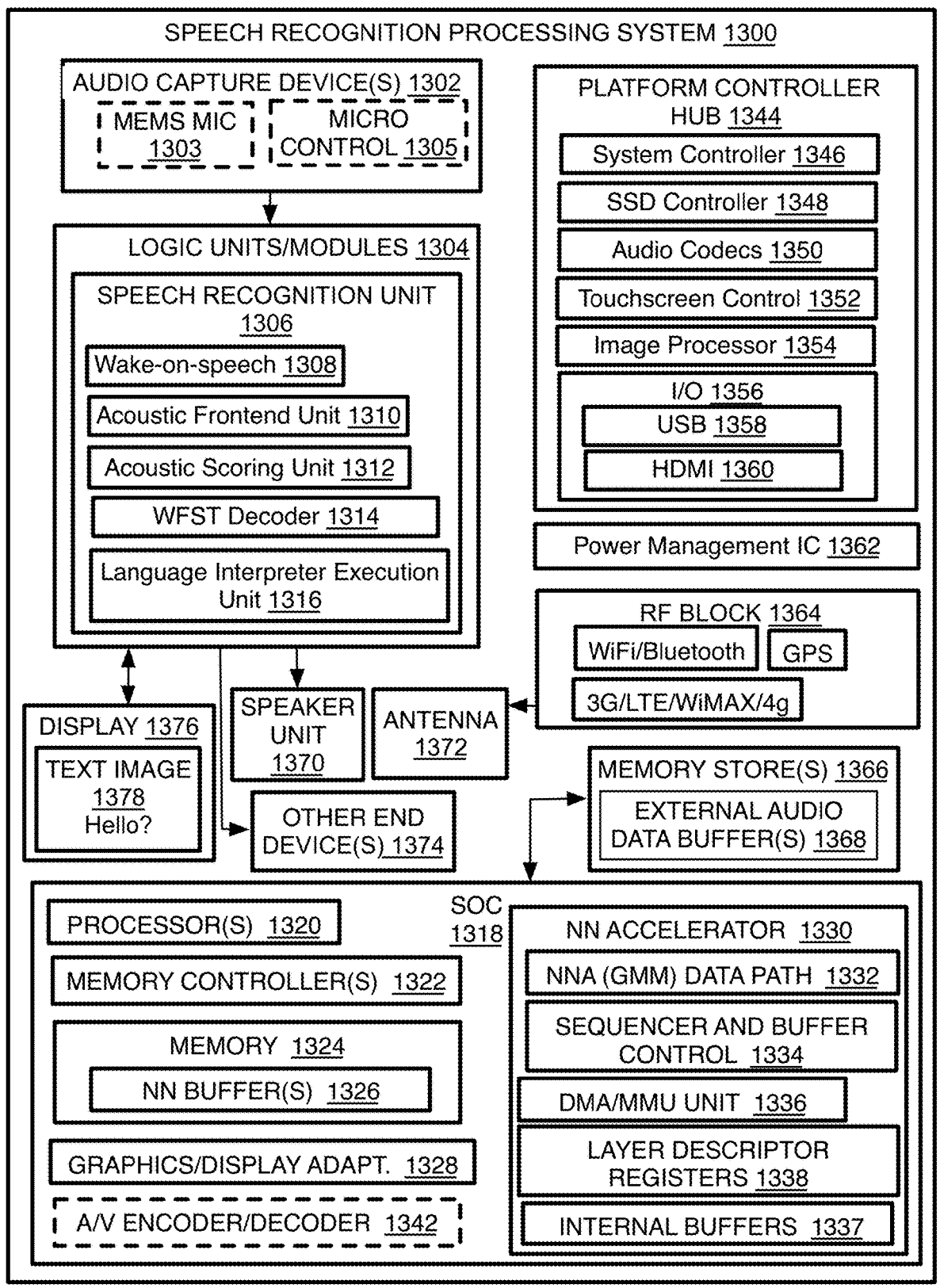
FIG. 13 is an illustrative diagram of an example speech recognition system using the methods described herein.

Referring to FIG. 13, an example speech recognition processing system 1300 is arranged in accordance with at least some implementations of the present disclosure. In various implementations, the example speech recognition processing system 1300 may have an audio capture device(s) 1302 to form or receive acoustical signal data. This can be implemented in various ways. Thus, in one form, the speech recognition processing system 1300 may be an audio capture device such as a microphone, and audio capture device 1302, in this case, may be the microphone hardware and sensor software, module, or component. In other examples, speech recognition processing system 1300 may have an audio capture device 1302 that includes or may be a microphone, and logic modules 1304 may communicate remotely with, or otherwise may be communicatively coupled to, the audio capture device 1302 for further processing of the acoustic data.

In either case, such technology may include a telephone, a smart phone, a dictation machine, other sound recording machine, a mobile device or an on-board device, wearables such as a smart watch, smart glasses, smart headphones, or exercise band, or any combination of these. Thus, in one form, audio capture device 1302 may include audio capture hardware including one or more sensors as well as actuator controls. These controls may be part of a sensor module or component for operating the sensor. The sensor component may be part of the audio capture device 1302, or may be part of the logical modules 1304 or both. Such sensor component can be used to convert sound waves into an electrical acoustic signal. The audio capture device 1302 also may have an A/D converter, other filters, and so forth to provide a digital signal for speech recognition processing. By one form, the microphone 1303 is a micro electrical mechanical (MEM) microphone connected, by one example, to a microcontroller 1305 via a serial bus such as a USB bus supported by a USB host controller 1332.

In the illustrated example, the logic modules 1304 may include a speech recognition unit 1306 that has a wake-on-speech unit 1308, an acoustic frontend unit 1310 that provides pre-processing as described with unit 18 (FIG. 1) and that identifies acoustic features, an acoustic score unit 1312 that provides acoustic scores for the acoustic features, a WFST decoder 1314 to provide hypothetical word sequences, and a language interpreter execution unit 1316 that determines the user intent based on the output of the WFST decoder. One or more of these units may be operated by, or even entirely or partially located at, SoC 1318 and/or processor(s) 1320, and which may use the neural network accelerator (NNA) 1330 to at least perform NN and GMM related tasks. The logic modules may be communicatively coupled to the components of the audio capture device 1302 in order to receive raw acoustic data. The logic modules 1304 may or may not be considered to be part of the audio capture device.

In the present implementation, system 1300 may have a system on chip (SoC) (or integrated circuit) device 1318, a platform controller hub 1344, and a radio frequency block 1364 which may be an integrated circuit as well. While one or more processors could be provided on the system 1300 external to the system on chip device 1318, the system on chip device 1318 may include one or more processor(s) 1320, which may include one or more processor cores. The processor(s) 1320 may include dedicated L1 instruction and data caches, a shared L2 cache, and dual instances of function-centric execution clusters to support execution of two threads by one example. In at least one form, suitable for mobile and other battery based platforms, processor(s) 1320 may include any one or more of a number of power conservation features.

The system on chip device 1318 may include NNA 1330 which may have an NNA(GMM) data path 1332 the same or similar to NN data path 240, 318, or 400 described above, a sequencer and buffer control 1334 to hold instructions for operating the NN circuit, an internal buffer 1337 to hold the layer data of a current layer being processed local to the data path 1332, and registers that include a layer descriptor register 1338 to hold layer descriptor data used to operate the NN data path on corresponding layer data as described in detail above. The NN accelerator also may have a DMA/MMU unit 1336 to move data back and forth between the NN circuit and buffers holding data to be placed in the circuit. The layer data NN buffers (and other audio buffers) 1326 may be held in memory 1324 that is external to the NNA 1330 or as buffer 1368 on external memory mentioned below.

While the system on chip device 1318 is shown as the only accelerator on the system on chip, it will be understood that the NNA 1330 could have additional circuitry to be used for other purposes such as circuitry dedicated to graphics processing. Otherwise, the system on chip or integrated circuit could have more than one accelerator, such as an Intel® Atom®.

The system on chip device 1318 also may include other integrated features including a graphics/display adapter 1328, a memory controller 1322, and optionally an audio or video or both (A/V) encoder 1340, and an A/V decoder 1342.

The system 1300 may have one or more external memory stores 1364 that are external to the SoC device 1318, and which may or may not hold the audio data buffers 1368 including any buffer related to the NN or GMM processing, at least one speaker unit 1370 to provide auditory responses to the input acoustic signals, one or more displays 1376 (which may be touchscreens) to provide images 1378 of text as a visual response to the acoustic signals, and other end device(s) 1374 to perform actions in response to the acoustic signal.

The platform controller hub 1344 includes a system controller 1346, and various feature I/O interfaces including an image processor 1354 suitable for use with a digital camera (not depicted), a touchscreen controller 1352, audio codecs 1350, and a general purpose I/O block 1356. The I/O block 1330 may include the USB controller 1358 and an HDMI controller 1360. An SSD controller 1348 is operable to interface with persistent storage at memory store(s) 1366.

Radio frequency block or integrated circuits 1364 as depicted include support for various wireless interfaces may include a Wi-Fi interface and one or more cellular interfaces that provide support for various wireless cellular interfaces including, as examples, 3G, LTE, WiMAX, and 4G. Radio frequency integrated circuit 1364 as shown further includes Bluetooth support and a global positioning system (GPS) capable receiver. The radio frequency block 1364 also may have or communicate through an antenna 1372.

A power management integrated circuit 1362 may interface with processor(s) 1320 and system controller 1346 to reduce power consumption in device 1300.

By one approach, the wake-on-speech feature employs microcontroller 1305 and MEMs microphone 1303. The microcontroller 1305 may be implemented as a configurable/extensible core that uses a subset of a more general purpose instruction set (e.g., a subset of an x86 instruction set). The core of microcontroller 1305, in one form, can be customized with new instructions for accelerating a target workload since it is flexible. Microcontroller 1305 may be configured for efficient operation that can be used in ultra-low power devices and system-on-chip subsystems.

As mentioned above, the NN (GMM) data path may be used for NN operations for ASR and by one approach, by the language interpreter execution unit 1316 that receives hypothesis phoneme, word, or word sequences and their scores from a decoder to finalize the recognized language. It will be understood, however, the other units may use NN operations as well whether related to ASR or not.

In one example implementation, the system 1300 may have the display 1330, at least one IC or SoC device 1318 with an NNA 1330 and one or more processors 1320 communicatively coupled to the display, at least one memory 1324 or 1366 communicatively coupled to the processor and having buffered layer data by one example as explained above. The antenna 1372 may be provided for transmission of the best word sequence matched or the input acoustic signal or other relevant commands to other devices that may act upon such a determination. Otherwise, the results of the speech recognition process may be stored in memory 1324 or 1366. As illustrated, any of these components may be capable of communication with one another and/or communication with portions of logic modules 1304 and/or audio capture device 1302. Thus, processors 1320 and NNA 1330 may be communicatively coupled to both the audio capture device 1302 and the logic modules 1304 for operating those components. By one approach, although speech processing system 1300, as shown in FIG. 13, may include one particular set of blocks or actions associated with particular components or modules, these blocks or actions may be associated with different components or modules than the particular component or module illustrated here.

Figure 14:
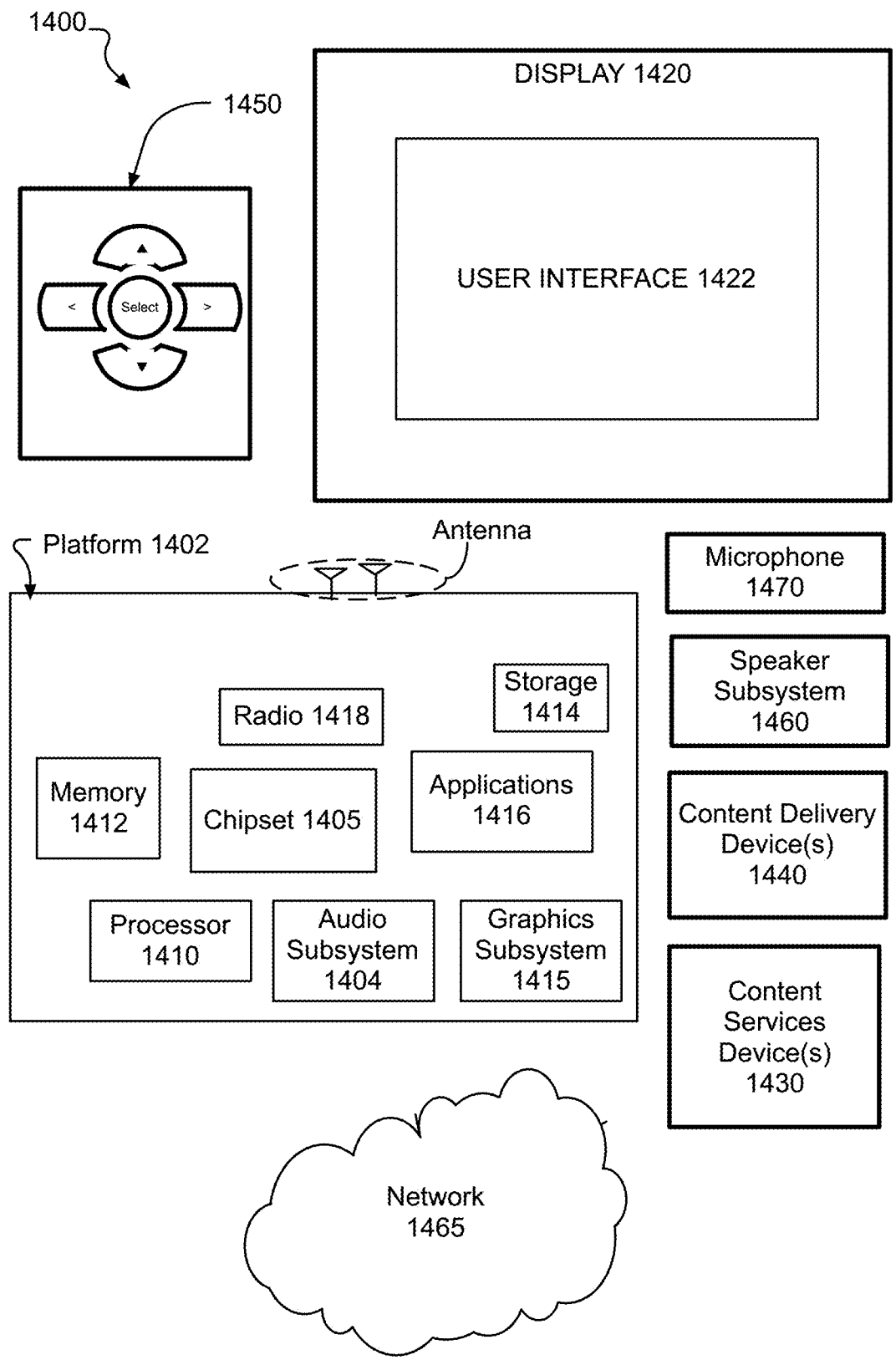
FIG. 14 is an illustrative diagram of another example system.

Referring to FIG. 14, an example system 1400 in accordance with the present disclosure operates one or more aspects of the speech processing system described herein. It will be understood from the nature of the system components described below that such components may be associated with, or used to operate, certain part or parts of the speech processing system described above. In various implementations, system 1400 may be a media system although system 1400 is not limited to this context. For example, system 1400 may be incorporated into a microphone, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device (smart watch, smart glasses, exercise band), mobile internet device (MID), messaging device, data communication device, and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402, speaker 1460, microphone 1470, and/or display 1420. Each of these components is described in greater detail below.

In various implementations, platform 1402 may include any combination of a chipset 1405, processor 1410, memory 1412, storage 1414, audio subsystem 1404, graphics subsystem 1415, applications 1416 and/or radio 1418. Chipset 1405 may provide intercommunication among processor 1410, memory 1412, storage 1414, audio subsystem 1404, graphics subsystem 1415, applications 1416 and/or radio

1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Audio subsystem 1404 may perform processing of audio such as acoustic signals for speech recognition as described herein and/or voice recognition. The audio subsystem 1404 may comprise one or more processing units and accelerators. Such an audio subsystem may be integrated into processor 1410 or chipset 1405. In some implementations, the audio subsystem 1404 may be a stand-alone card communicatively coupled to chipset 1405. An interface may be used to communicatively couple the audio subsystem 1404 to a speaker 1460, microphone 1470, and/or display 1420.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, Display Port, wireless HDMI, and/or wireless HD compliant techniques. Graphics subsystem 1415 may be integrated into processor 1410 or chipset 1405. In some implementations, graphics subsystem 1415 may be a stand-alone card communicatively coupled to chipset 1405.

The audio processing techniques described herein may be implemented in various hardware architectures in addition to the NNA described above. For example, audio functionality otherwise may be integrated within a chipset. Alternatively, a discrete audio processor may be used. As still another implementation, the audio functions may be provided by a general purpose processor, including a multi-core processor. In further implementations, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display, or any smartphone type display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420, speaker 1460, and microphone 1470. Platform 1402 and/or content services device(s) 1430 may be coupled to a network 1465 to communicate (e.g., send and/or receive) media information to and from network 1465. Content delivery device(s) 1440 also may be coupled to platform 1402, speaker 1460, microphone 1470, and/or to display 1420.

In various implementations, content services device(s) 1430 may include a microphone, a cable television box, personal computer, network, telephone, Internet enabled devices or appliance capable of delivering digital information and/or content, and any other similar device capable of unidirectionally or bidirectionally communicating content between content providers and platform 1402 and speaker subsystem 1460, microphone 1470, and/or display 1420, via network 1465 or directly. It will be appreciated that the content may be communicated unidirectionally and/or bidirectionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of controller 1450 may be used to interact with user interface 1422, for example. In implementations, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1404 also may be used to control the motion of articles or selection of commands on the interface 1422.

Movements of the navigation features of controller 1450 may be replicated on a display (e.g., display 1420) by movements of a pointer, cursor, focus ring, or other visual indicators displayed on the display or by audio commands. For example, under the control of software applications 1416, the navigation features located on navigation controller 1450 may be mapped to virtual navigation features displayed on user interface 1422, for example. In implementations, controller 1450 may not be a separate component but may be integrated into platform 1402, speaker subsystem 1460, microphone 1470, and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example, or by auditory command Program logic may allow platform 1402 to stream content to media adaptors or other content services device(s) 1430 or content delivery device(s) 1440 even when the platform is turned "off." In addition, chipset 1405 may include hardware and/or software support for 8.1 surround sound audio and/or high definition (7.1) surround sound audio, for example. Drivers may include an auditory or graphics driver for integrated auditory or graphics platforms. In implementations, the auditory or graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various implementations, platform 1402, speaker 1460, microphone 1470, and/or display 1420 may be an integrated unit. Display 1420, speaker 1460, and/or microphone 1470 and content service device(s) 1430 may be integrated, or display 1420, speaker 1460, and/or microphone 1470 and content delivery device(s) 1440 may be integrated, for example. These examples are not meant to limit the present disclosure.

In various implementations, system 1400 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 14.

Figure 15:
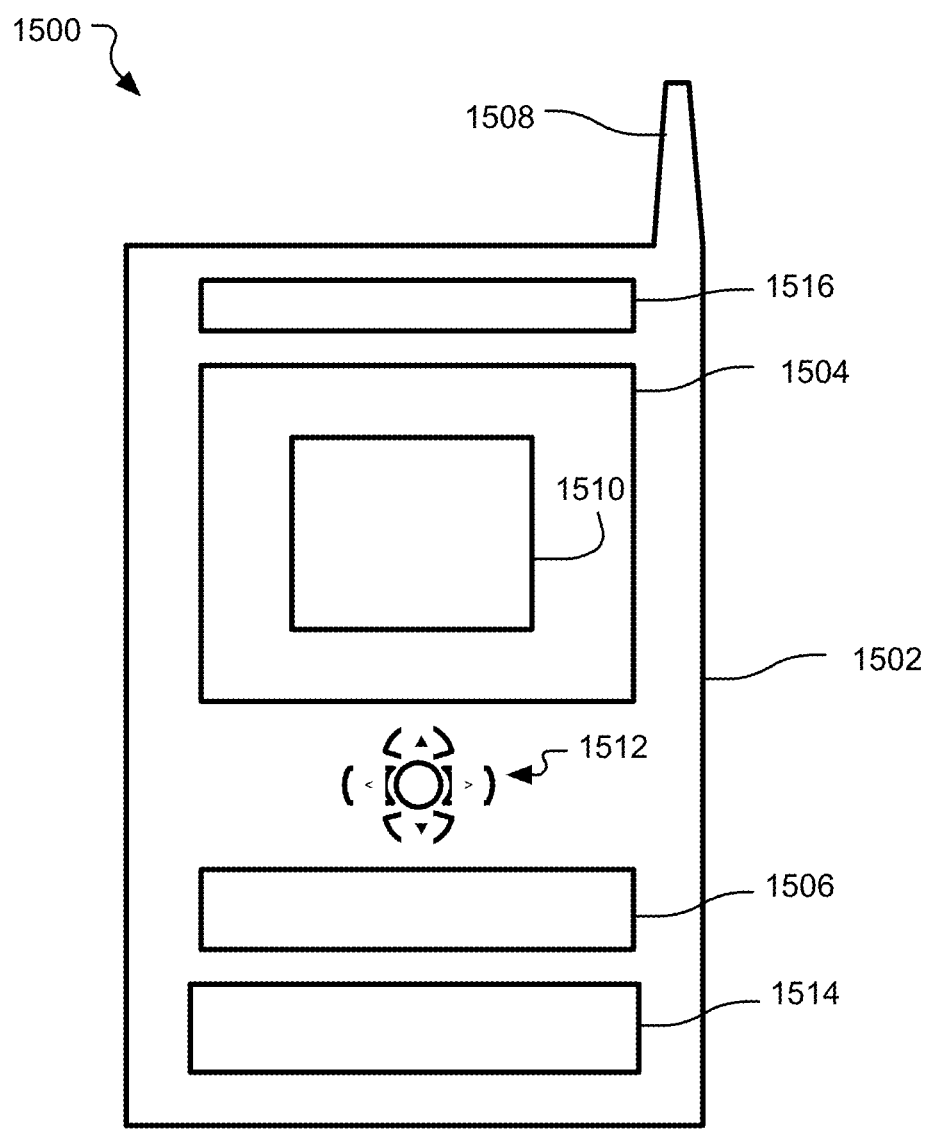
FIG. 15 is an illustrative diagram of an example system, all arranged in accordance with at least some implementations of the present disclosure.

Referring to FIG. 15, a small form factor device 1500 is one example of the varying physical styles or form factors in which system 1300 or 1400 may be embodied. By this approach, device 1500 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, and any other on-board (such as on a vehicle) computer that may accept audio commands.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 15, device 1000 may include a housing 1502, a display 1504 including a screen 1510, an input/output (I/O) device 1506, and an antenna 1508. Device 1500 also may include navigation features 1512. Display 1504 may include any suitable display unit for displaying information appropriate for a mobile computing device. I/O device 1506 may include any suitable I/O device for entering information into a mobile computing device. Examples for I/O device 1506 may include an alphanumeric keyboard, a numeric keypad, a touch pad, input keys, buttons, switches, rocker switches, software and so forth. Information also may be entered into device 1500 by way of microphone 1514. Such information may be digitized by a speech recognition device as described herein as well as a voice recognition devices and as part of the device 1500, and may provide audio responses via a speaker 1516 or visual responses via screen 1510. The implementations are not limited in this context.

Various forms of the devices and processes described herein other than the fixed function hardware described above may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware, other than the fixed function hardware that is described above, elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

By one example, a neural network accelerator comprises a plurality of fixed function hardware logic blocks that are logically parallel so that multiple ones of the logic blocks have substantially the same arrangement of logic elements to compute a value associated with a layer of a neural network; wherein the logic elements of multiple logic blocks of the plurality of logic blocks are to provide the option to alternatively use weights of at least two different bit lengths comprising weights of a first bit length as inputted to the logic block and weights of a second bit length as inputted to the logic block, and to apply a scale factor to weights provided in at least the first bit length, and to omit the scale factor when weights are provided in at least the second bit length.

By another implementation, the neural network accelerator may have wherein the logic blocks are each arranged to multiply a scaled or non-scaled weight by an input value to compute a weighted input, the neural network accelerator comprising an accumulator portion that sums the weighted inputs; and an activation function unit that uses the sum of the weighted input to compute an output for a node of the layer of the neural network; wherein alternative application of the scale factor controls a dynamic range of a resulting sum from the logic blocks; wherein the logic blocks are arranged to provide the option to apply no scale factor to a layer or to apply a scale factor individually to one or more layers; wherein each logic block receives an input value to modify and to provide to accumulate with modified input values of other ones of the logic blocks to be used to compute a single output of a single node of the neural network, and wherein the scale factor value applied to the input value at each logic block for the single output is the same; and the neural network accelerator comprising an activation function unit to compute an output associated with the value of the neural network and using a piecewise linear function supported by more than one activation function layer type, wherein the logic blocks are arranged to alternatively be re-used to provide weighted inputs of the variety of neural network layer types in a variety of layer sequences, and while using the same logic elements of the logic blocks, wherein the neural network layer types comprises at least two of: a recurrent layer, a convolutional layer, and an affine layer; wherein the logic elements of multiple individual logic blocks are arranged to alternatively provide a value of a Gaussian mixture model (GMM); wherein the logic elements of multiple individual logic blocks are arranged to alternatively (1) multiply the scale factor by a neural network weight and (2) square a mean-input value difference of a GMM; and wherein the logic elements of multiple individual logic blocks are arranged to alternatively (1) multiply a GMM variance by a squared difference of a mean and input value and (2) multiply a node input of a layer of the neural network by a weight.

The neural network accelerator comprising an active list buffer having an index indicating which subset of outputs to compute that is less than all outputs in a single layer of the neural network; a layer descriptor register to hold at least one layer descriptor and that indicates a layer is at least one of a set of pre-defined primitive layers available from the neural network, the neural network accelerator being arranged to process the primitive layers using data indicated by the layer descriptors; wherein a state machine is provided to read the data of the layer descriptor in the layer descriptor register to direct layer data to the logic blocks; and the neural network accelerator comprising a pipeline comprising a multiplication addition circuit (MAC) unit comprising the fixed function hardware logic blocks arranged to provide weighted inputs and an accumulator to accumulate the weighted inputs into a sum, and an activation function unit arranged to receive the sum from the MAC and to compute an output, wherein the MAC generates a sum for one set of inputs simultaneously to the activation function unit generating an output associated with another set of inputs; wherein the device performs neural network operations as part of automatic speech recognition, wherein the output of the neural network indicates one or more recognized words or sounds from an input audio signal.

By other approaches, a computer-implemented system comprises at least one internal buffer to hold layer data associated with at least one layer to be processed; and a plurality of fixed function logic blocks that are logically parallel so that multiple ones of the logic blocks have substantially the same arrangement of logic elements to compute a value associated with the layer of the neural network and by receiving the layer data of the at least one internal buffer, wherein the internal buffer is disposed locally to the fixed function logic blocks; wherein the logic elements of multiple logic blocks of the plurality of logic blocks are to provide the option to alternatively use weights of at least two different bit lengths comprising weights of a first bit length as inputted to the logic block and weights of a second bit length as inputted to the logic block, and to apply a scale factor to weights provided in at least the first bit length, and to omit the scale factor when weights are provided in at least the second bit length.

By other approaches, the system may comprise wherein the logic elements of each block comprise a multiplier to alternatively (1) multiply the scale factor by a neural network weight and (2) square a difference between a mean and an input value of a GMM; wherein the logic elements of each block comprise a multiplier to alternatively (1) multiply a GMM variance by a squared difference of a mean and input value and (2) multiply a node input of a layer of the neural network by a weight; wherein the weights are either 16 bit or 8 bit integer weights, and wherein the 8 bit weights are scaled; the system comprising an active list buffer having an index of selected outputs of a layer to be determined that is a subset of outputs of the layer; at least one first state machine to store one layer descriptor at a time indicating the parameters and state of a layer of a neural network to be processed, wherein the at least one internal buffer holds layer data associated with the current layer descriptor at the first state machine; at least one sequencer that is a state machine to read the layer descriptor and direct the placement of the layer data into the at least one internal buffer depending on the data of the layer descriptor; an input buffer at the internal buffer and receiving input values of an input array in a memory comprising receiving a portion of the input values less than the entire input array, and portion by portion, when the input array is larger than the capacity of the input buffer, wherein the portion is sized to fit within the input buffer, wherein the fixed function logic blocks receiving the input values in the input buffer; an accumulator to compute at least one intermediate sum output for each portion and to operate by: saving and accumulating the intermediate sum outputs to form a single complete sum output; and providing the complete sum output to be input to an activation function to determine a final output. The system also wherein the input buffer receives data from an interleaved input array having rows or columns of groups of input sets of input elements, wherein each group in the input array is used to form a different final output of a single neural network layer, and provides input elements from multiple groups in the input buffer to the fixed function logic blocks rather than all of the input elements of one group after another group in the input array.

By one approach, a computer implemented method of neural network propagation, comprises computing a value of a layer of a neural network by using a plurality of fixed function hardware logic blocks that are substantially logically parallel so that multiple ones of the logic blocks have substantially the same arrangement of logic elements; inputting a weight having a bit length from at least two alternative bit lengths available to input weights to the plurality of logic blocks wherein the available bit lengths comprise at least a first bit length and a second bit length; and applying a scale factor to weights provided in at least the first bit length, and to omit the scale factor when weights are provided in at least the second bit length.

By a further approach, the method comprising multiplying, by the logic blocks, a scaled or non-scaled weight by an input value to compute a weighted input, summing the weighted inputs by an accumulator portion; and using the sum of the weighted input to compute an output for a node of the layer of the neural network and by an activation function unit; wherein alternative application of the scale factor controls a dynamic range of a resulting sum from the logic blocks; wherein the logic blocks are arranged to provide the option to apply no scale factor to a layer or to apply a scale factor individually to one or more layers; wherein each logic block receives an input value to modify and to provide to accumulate with modified input values of other ones of the logic blocks to be used to compute a single output of a single node of the neural network, and wherein the scale factor value applied to the input value at each logic block for the single output is the same; and the method comprising computing, by the activation function unit, an output associated with the value of the neural network and using a piecewise linear function supported by more than one activation function layer type, wherein the logic blocks are arranged to alternatively be re-used to provide weighted inputs of the variety of neural network layer types in a variety of layer sequences, and while using the same logic elements of the logic blocks, wherein the neural network layer types comprises at least two of: a recurrent layer, a convolutional layer, and an affine layer; wherein the logic elements of multiple individual logic blocks are arranged to alternatively provide a value of a Gaussian mixture model (GMM); wherein the logic elements of multiple individual logic blocks are arranged to alternatively (1) multiply the scale factor by a neural network weight and (2) square a mean-input value difference of a GMM; and wherein the logic elements of multiple individual logic blocks are arranged to alternatively (1) multiply a GMM variance by a squared difference of a mean and input value and (2) multiply a node input of a layer of the neural network by a weight.

The method including wherein an active list buffer has an index indicating which computing a subset of outputs to compute that is less than all outputs in a single layer of the neural network; a layer descriptor register to hold at least one layer descriptor and that indicates a layer is at least one of a set of pre-defined primitive layers available from the neural network, wherein the neural network accelerator being arranged to process the primitive layers using data indicated by the layer descriptors; wherein a state machine is provided to read the data of the layer descriptor in the layer descriptor register to direct layer data to the logic blocks; and the neural network accelerator comprising a pipeline comprising a multiplication addition circuit (MAC) unit comprising the fixed function hardware logic blocks arranged to provide weighted inputs and an accumulator to accumulate the weighted inputs into a sum, and an activation function unit arranged to receive the sum from the MAC and to compute an output, wherein the MAC generates a sum for one set of inputs simultaneously to the activation function unit generating an output associated with another set of inputs; wherein the device performs neural network operations as part of automatic speech recognition, wherein the output of the neural network indicates one or more recognized words or sounds from an input audio signal.

By yet another approach, a computer-implemented method of neural network propagation comprises receiving layer descriptors for individual primitive layers of a neural network, the individual layer descriptors indicating: a primitive layer type of the primitive layer and from a set of pre-determined primitive layer types that are available in a neural network, and a selected weight bit length to be used with the primitive layer and from a predetermined set of a plurality of available weight bit lengths for a layer in the neural network; receiving weight values for individual layers depending, at least in part, on the primitive layer type and with bit lengths depending on the selected weight bit length; inputting the weight values to fixed function hardware to perform a neural network computation that alternatively performs the computation with weights having one of the available bit lengths; and determining one or more outputs for the individual primitive layers depending, at least in part, on the primitive layer type.

By yet another approach, the computer-implemented method of neural network propagation further comprises comprising performing automatic speech recognition using the neural network, wherein inputs and outputs of the layers are associated with sounds or words, and wherein the outputs of an output layer of the neural network are associated with one or more recognized sounds or words; wherein the available primitive layer types comprises at least a recurrent layer, a convolutional layer, and an affine layer; wherein the available primitive layer types comprises at least one of an active list (AL) affine layer wherein less than all outputs of a layer are to be processed, and a diagonal affine layer where a diagonal matrix is used as the weight matrix; wherein the available primitive layer types comprises a transpose layer comprising at least one of an interleave layer that provides groups of input elements that each form a single final output of a layer, and formed in the opposite direction of the row or column major storage of an input array so that input elements in corresponding positions on multiple groups are provided to an input buffer, or a de-interleave layer that holds the groups of input elements in the same direction as the row or column major storage and arranged to be processed group by group; wherein the primitive layer types comprises: an recurrent layer; a convolutional layer; an affine layer; an active list affine layer that processes less than all outputs on a layer; a diagonal affine layer where a diagonal matrix is used as the weight matrix; an interleave layer that groups input elements into multiple groups that each form a final output of a single layer and to be processed across the multiple groups; a de-interleave layer that holds the groups of input elements arranged to be processed group by group; and a copy layer to concatenate input or output data of one group with that of another group.

The method also comprising, by a fixed function hardware state machine: reading data of a layer descriptor of a current layer to be processed; and depending on the data of the layer descriptor, directing layer data of the current layer to and from the fixed function hardware performing the neural network computations; processing sequences of layers wherein an activation function on any one primitive layer of the sequence is not required to be the same as an activation function on another primitive layer of the sequence in order to use the fixed function hardware and to use the activation function to compute the one or more outputs of the primitive layer; performing a piecewise linear function to approximate a supported activation function to compute individual outputs of a layer and comprising performing a binary-type of search to locate a sum output computed by using the fixed function hardware and on a range of sum output values as potential inputs of a segmented piecewise linear function comprising comparing an input to threshold sum output values along the range of sum output values wherein each threshold is associated with a different segment of the segmented piecewise linear function and over a number of iterations eliminating half of the available sum output values of the range at individual iterations depending on whether the input is larger or smaller than the threshold sum output value of a segment. The method also comprising: receiving an array of sum output values each corresponding to an end of a different segment of a piecewise linear function having a plurality of segments, an activation function output associated with the individual ends, and a slope of the individual segments; determining which segment an input value belongs wherein the input is a sum output computed by using the fixed function hardware and comprising: in a plurality of iterations, comparing the input to a sum output value of the segment end and from the array, and comprising determining whether the input is larger or smaller than the sum output value; on individual iterations, eliminating the half of the remaining segments that are on the opposite side of the sum output value just compared to relative to the input; performing the iterations until the input is placed on a single segment; and determining the activation function output using an equation of the piecewise linear function at the single segment, and the determined sum output value; wherein the piecewise linear activation function alternatively supports at least two of tan h, sigmoid, and rectifier linear unit (reLU) activation functions along the same sequence of layers; the method comprising performing the neural network computations on fixed function hardware that forms a plurality of parallel logic blocks, wherein each block has substantially the same logic elements to multiply a weight value by an input value, and wherein the logic elements are to alternatively perform Gaussian mixture model (GMM) propagation.

By yet a further approach, a computer implemented system of neural network propagation comprising: fixed function hardware with logic elements to perform neural network computations; a sequencer state machine to direct layer data to and from the fixed function hardware, and operated by: receiving data of layer descriptors for individual primitive layers of a neural network, the individual layer descriptors indicating: a primitive layer type of the corresponding layer and from a set of pre-determined primitive layer types that are available in the neural network, and a selected weight bit length to be used with the corresponding layer and from a predetermined set of available weight bit lengths for a layer in the neural network; directing the placement of weight values for individual layers and into an internal buffer depending, at least in part, on the primitive layer type and with bit lengths depending on the selected weight bit length; input the weight values to the neural network circuit to perform a neural network computation that alternatively performs the computation with weights having one of the available bit lengths; and determine one or more outputs for the individual layers depending, at least in part, on the primitive layer type.

By yet another approach, the computer-readable implemented system further includes wherein the primitive layer types comprises at least two of: a recurrent layer, a convolutional layer, and an affine layer; wherein the primitive layer types comprise: an active list affine layer that processes less than all outputs on a layer; a diagonal affine layer wherein a diagonal matrix is used as the weight matrix; an interleave layer that groups input elements into multiple groups that each form a final output of a single layer and to be processed across the multiple groups; a de-interleave layer that holds the groups of input elements arranged to be processed group by group; wherein a single artificial macro neural network layer is to be divided into a plurality of the primitive layers each with a layer descriptor received by the neural network accelerator; the system comprising a register state machine that holds one layer descriptor at a time and associated with a current layer being processed, and wherein the sequencer state machine reads the layer descriptor at the register state machine to direct layer data to and from the internal buffer; an activation function unit to compute an output associated with the value of the neural network and using a piecewise linear function supported by more than one activation function layer type; wherein the neural network circuit comprises a plurality of parallel logic blocks to compute a weighted input, each logic block to alternatively use weights of the available bit lengths; and wherein the logic elements of the neural network circuit are arranged to alternatively compute values for a Gaussian mixture model (GMM); wherein comprising performing automatic speech recognition using the neural network, wherein inputs and outputs of the layers are associated with sounds or words, and wherein the outputs of an output layer of the neural network are associated with one or more recognized sounds or words.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A neural network accelerator, comprising:
a plurality of fixed function hardware logic blocks that are logically parallel so that multiple ones of the logic blocks have substantially the same arrangement of logic elements to compute a value associated with a layer of a neural network,
wherein the logic blocks cooperatively form a multiplication portion of a multiplication-addition circuit (MAC) so that each logic block provides a weighted input to a same accumulator portion of the MAC, and
wherein parallel logic elements of multiple logic blocks of the plurality of logic blocks are to provide the option to alternatively use weights of at least two different bit lengths comprising weights of a first bit length as inputted to the logic block and weights of a second bit length as inputted to the logic block, and to apply a scale factor to weights provided in at least the first bit length, and to omit the scale factor when weights are provided in at least the second bit length, and wherein the parallel logic elements of an individual logic block comprise multiple weight branches to receive weight input wherein each branch handles weights of a different bit length than the bit length of the other branches.

2. The neural network accelerator of claim 1, wherein the logic blocks are each arranged to multiply a scaled or non-scaled weight by an input value to compute the weighted input, the neural network accelerator comprising the accumulator portion that sums the weighted inputs; and an activation function unit that uses the sum of the weighted input to compute an output for a node of the layer of the neural network.

3. The neural network accelerator of claim 1, wherein alternative application of the scale factor controls a dynamic range of a resulting sum from the logic blocks.

4. The neural network accelerator of claim 1, wherein the logic blocks are arranged to provide the option to apply no scale factor to a layer and alternatively to apply a scale factor individually to one or more layers.

5. The neural network accelerator of claim 1, wherein each logic block receives an input value to modify and to accumulate with modified input values of other ones of the logic blocks to be used to compute a single output of a single node of the neural network, and wherein the scale factor value applied to the input value at each logic block for the single output is the same.

6. The neural network accelerator of claim 1, comprising an activation function unit to compute an output associated with the value of the neural network and using a piecewise linear function supported by more than one activation function layer type, wherein the logic blocks are arranged to alternatively be re-used to provide weighted inputs of the variety of neural network layer types in a variety of layer sequences, and while using the same logic elements of the logic blocks.

7. The neural network accelerator of claim 6, wherein the neural network layer types comprises at least two of: a recurrent layer, a convolutional layer, and an affine layer.

8. The neural network accelerator of claim 1, wherein the logic elements of multiple individual logic blocks are arranged to alternatively provide a value of a Gaussian mixture model (GMM).

9. The neural network accelerator of claim 1, wherein the logic elements of multiple individual logic blocks are arranged to alternatively (1) multiply the scale factor by a neural network weight and (2) square a mean-input value difference of a GMM.

10. The neural network accelerator of claim 1, wherein the logic elements of multiple individual logic blocks are arranged to alternatively (1) multiply a GMM variance by a squared difference of a mean and input value and (2) multiply a node input of a layer of the neural network by a weight.

11. The neural network accelerator of claim 1, comprising an active list buffer having an index indicating which subset of outputs to compute that is less than all outputs in a single layer of the neural network.

12. The neural network accelerator of claim 1, comprising a layer descriptor register to hold at least one layer descriptor and that indicates a layer is at least one of a set of pre-defined primitive layers available from the neural network, the neural network accelerator being arranged to process the primitive layers using data indicated by the layer descriptors.

13. The neural network accelerator of claim 12, wherein a state machine is provided to read the data of the layer descriptor in the layer descriptor register to direct layer data to the logic blocks.

14. The neural network accelerator of claim 1, comprising a pipeline comprising the multiplication addition circuit (MAC) unit comprising the fixed function hardware logic blocks arranged to provide weighted inputs and an accumulator to accumulate the weighted inputs into a sum, and an activation function unit arranged to receive the sum from the MAC and to compute an output, wherein the MAC generates a sum for one set of inputs simultaneously to the activation function unit generating an output associated with another set of inputs.

15. The neural network accelerator of claim 1, wherein the device performs neural network operations as part of automatic speech recognition, wherein the output of the neural network indicates one or more recognized words or sounds from an input audio signal.

16. The neural network accelerator of claim 1 wherein one of the branches has at least one scaling logic element and another of the branches does not have the scaling logic element(s).

17. A computer-implemented system, comprising:
at least one internal buffer to hold layer data associated with at least one layer to be processed; and
a plurality of fixed function logic blocks that are logically parallel so that multiple ones of the logic blocks have substantially the same arrangement of logic elements to compute a value associated with the layer of the neural network and by receiving the layer data of the at least one internal buffer, wherein the internal buffer is disposed locally to the fixed function logic blocks,
wherein the logic blocks cooperatively form a multiplication portion of a multiplication-addition circuit (MAC) so that each logic block provides a weighted input to a same accumulator portion of the MAC, and
wherein parallel logic elements of multiple logic blocks of the plurality of logic blocks are to provide the option to alternatively use weights of at least two different bit lengths comprising weights of a first bit length as inputted to the logic block and weights of a second bit length as inputted to the logic block, and to apply a scale factor to weights provided in at least the first bit length, and to omit the scale factor when weights are provided in at least the second bit length, and wherein the parallel logic elements of an individual logic block comprise multiple weight branches to receive weight input wherein each branch handles weights of a different bit length than the bit length of the other branches.

18. The system of claim 17, wherein the logic elements of each block comprise a multiplier to alternatively (1) multiply the scale factor by a neural network weight and (2) square a difference between a mean and an input value of a GMM.

19. The system of claim 17, wherein the logic elements of each block comprise a multiplier to alternatively (1) multiply a GMM variance by a squared difference of a mean and input value and (2) multiply a node input of a layer of the neural network by a weight.

20. The system of claim 17, wherein the weights are either 16 bit or 8 bit integer weights, and wherein the 8 bit weights are scaled.

21. The system of claim 17, comprising an active list buffer having an index of selected outputs of a layer to be determined that is a subset of outputs of the layer.

22. The system of claim 17, comprising at least one first state machine to store one layer descriptor at a time indicating the parameters and state of a layer of a neural network to be processed, wherein the at least one internal buffer holds layer data associated with the current layer descriptor at the first state machine.

23. The system of claim 22, comprising at least one sequencer that is a state machine to read the layer descriptor and direct the placement of the layer data into the at least one internal buffer depending on the data of the layer descriptor.

24. The system of claim 17, comprising an input buffer at the internal buffer and receiving input values of an input array in a memory comprising receiving a portion of the input values less than the entire input array, and portion by portion, when the input array is larger than the capacity of the input buffer, wherein the portion is sized to fit within the input buffer, wherein the fixed function logic blocks receiving the input values in the input buffer;
the system comprising: the accumulator to compute at least one intermediate sum output for each portion and to operate by:
saving and accumulating the intermediate sum outputs to form a single complete sum output; and
providing the complete sum output to be input to an activation function to determine a final output.

25. The system of claim 24, wherein the input buffer receives data from an interleaved input array having rows or columns of groups of input sets of input elements, wherein each group in the input array is used to form a different final output of a single neural network layer, and provides input elements from multiple groups in the input buffer to the fixed function logic blocks rather than all of the input elements of one group after another group in the input array.

26. The system of claim 17 wherein one of the branches has at least one scaling logic element and another of the branches does not have the scaling logic element(s).

27. A computer implemented method of neural network propagation, comprising:
computing a value of a layer of a neural network by using a plurality of fixed function hardware logic blocks that are substantially logically parallel so that multiple ones of the logic blocks have substantially the same arrangement of logic elements, wherein the logic blocks cooperatively form a multiplication portion of a multiplication-addition circuit (MAC) so that each logic block provides a weighted input to a same accumulator portion of the MAC;
inputting a weight having a bit length from at least two alternative bit lengths available to input weights to the plurality of logic blocks wherein the available bit lengths comprise at least a first bit length and a second bit length, and wherein the logic elements of an individual logic block comprise multiple weight branches to receive weight input wherein each branch handles weights of a different bit length than the bit length of the other branches; and
applying a scale factor by the logic blocks to weights provided in at least the first bit length, and to omit the scale factor when weights are provided in at least the second bit length.

28. The method of claim 27 wherein one of the branches has at least one scaling logic element and another of the branches does not have the scaling logic element(s).

* * * * *